United States Patent
Kozasa

(10) Patent No.: US 11,499,757 B2
(45) Date of Patent: Nov. 15, 2022

(54) VEHICULAR HEAT MANAGEMENT SYSTEM

(71) Applicant: DENSO CORPORATION, Kariya (JP)

(72) Inventor: Tetsuo Kozasa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/854,843

(22) Filed: Apr. 21, 2020

(65) Prior Publication Data

US 2020/0247215 A1   Aug. 6, 2020

Related U.S. Application Data

(63) Continuation of application No. PCT/JP2018/035238, filed on Sep. 24, 2018.

(30) Foreign Application Priority Data

Oct. 26, 2017 (JP) .............................. JP2017-207444

(51) Int. Cl.
  *F25B 1/10* (2006.01)
  *B60H 1/32* (2006.01)
  (Continued)

(52) U.S. Cl.
  CPC ........... *F25B 1/10* (2013.01); *B60H 1/00007* (2013.01); *B60H 1/00278* (2013.01);
  (Continued)

(58) Field of Classification Search
  CPC ............ B60H 1/00007; B60H 1/00878; B60H 1/00907; B60H 1/143; B60H 1/22;
  (Continued)

(56) References Cited

U.S. PATENT DOCUMENTS 6,904,766 B2 * 6/2005 Ito ..................... B60H 1/00328
                                                  62/324.1
9,506,683 B2 * 11/2016 Katoh ................ B60H 1/32281
                         (Continued)

FOREIGN PATENT DOCUMENTS

JP     H05162536 A    6/1993
JP     H0624279 A     2/1994
             (Continued)

*Primary Examiner* — Ljiljana V. Ciric
(74) *Attorney, Agent, or Firm* — Harness, Dickey & Pierce, P.L.C.

(57) ABSTRACT

A vehicular heat management system includes a heat pump cycle capable of heating a heat-exchanging-object fluid by using exhaust heat of an in-vehicle device as a heat source that radiates heat during operation, and an exhaust-heat refrigerant circuit that releases the exhaust heat to outside air through an exhaust-heat refrigerant. The heat pump cycle includes a recovery heat exchange portion that performs heat exchange between a heated air heated by the exhaust heat and a cycle refrigerant circulating in the heat pump cycle. The exhaust-heat refrigerant circuit includes an exhaust-heat exchange portion that performs heat exchange between the heated air and the exhaust-heat refrigerant. The recovery heat exchange portion and the exhaust-heat exchange portion are integrally formed as a combined heat exchanger capable of transferring heat between the cycle refrigerant and the exhaust-heat refrigerant.

14 Claims, 24 Drawing Sheets

(51) Int. Cl.
    *B60H 1/00*                 (2006.01)
    *B60H 1/14*                 (2006.01)
    *B60H 1/22*                 (2006.01)
    *B60H 1/18*                 (2006.01)
    *F28F 1/12*                  (2006.01)
    *F28D 1/04*                 (2006.01)
    *F25B 41/20*               (2021.01)
    *F28D 1/03*                 (2006.01)
    *F28F 1/40*                  (2006.01)
    *F25B 41/24*               (2021.01)

(52) U.S. Cl.
    CPC ..... *B60H 1/00392* (2013.01); *B60H 1/00878* (2013.01); *B60H 1/00907* (2013.01); *B60H 1/00921* (2013.01); *B60H 1/143* (2013.01); *B60H 1/18* (2013.01); *B60H 1/22* (2013.01); *B60H 1/3213* (2013.01); *B60H 1/3228* (2019.05); *B60H 1/3229* (2013.01); *F25B 41/20* (2021.01); *F25B 41/24* (2021.01); *F28D 1/0316* (2013.01); *F28D 1/0426* (2013.01); *F28D 1/0461* (2013.01); *F28F 1/128* (2013.01); *F28F 1/40* (2013.01); *B60H 2001/00928* (2013.01); *B60H 2001/00942* (2013.01); *B60H 2001/00949* (2013.01); *B60H 2001/00957* (2013.01); *F25B 2400/13* (2013.01)

(58) Field of Classification Search
    CPC ............... B60H 1/3213; B60H 1/3228; B60H 2001/00942; B60H 2001/00957; B60H 1/00278; B60H 1/00392; B60H 1/00921; B60H 1/18; B60H 1/3229; B60H 2001/00928; B60H 2001/00949; F25B 1/10; F25B 2400/13; F25B 41/20; F25B 41/24; F28D 1/0316; F28D 1/0426; F28D 1/0461; F28F 1/128; F28F 1/40
    See application file for complete search history.

(56) References Cited

U.S. PATENT DOCUMENTS

| | | | |
|---|---|---|---|
| 9,592,717 B2 * | 3/2017 | Katoh | F28F 9/0278 |
| 9,605,883 B2 * | 3/2017 | Katoh | F25B 47/025 |
| 9,925,845 B2 * | 3/2018 | Katoh | B60H 1/00921 |
| 9,995,534 B2 * | 6/2018 | Katoh | F28F 9/0278 |
| 2006/0080989 A1 | 4/2006 | Aoki et al. | |
| 2013/0081419 A1 * | 4/2013 | Katoh | B60H 1/004 |
| | | | 62/278 |
| 2013/0213071 A1 | 8/2013 | Takahashi et al. | |
| 2013/0240185 A1 * | 9/2013 | Katoh | F28F 9/0214 |
| | | | 165/140 |
| 2013/0283835 A1 * | 10/2013 | Katoh | F28D 1/0435 |
| | | | 165/300 |
| 2013/0306301 A1 * | 11/2013 | Tamaki | F24D 17/02 |
| | | | 165/287 |
| 2013/0312447 A1 | 11/2013 | Inaba et al. | |
| 2014/0075975 A1 * | 3/2014 | Graaf | B60H 1/00007 |
| | | | 62/119 |
| 2014/0305159 A1 * | 10/2014 | Katoh | F28F 9/0278 |
| | | | 165/157 |
| 2014/0318170 A1 | 10/2014 | Katoh et al. | |
| 2014/0345312 A1 * | 11/2014 | Katoh | F25B 47/00 |
| | | | 62/277 |
| 2015/0033782 A1 * | 2/2015 | Kondo | B60H 1/00921 |
| | | | 62/244 |
| 2015/0101789 A1 | 4/2015 | Enomoto et al. | |
| 2015/0292820 A1 | 10/2015 | Katoh et al. | |
| 2015/0295285 A1 | 10/2015 | Takeuchi et al. | |
| 2016/0129756 A1 | 5/2016 | Enomoto et al. | |
| 2016/0236539 A1 | 8/2016 | Suzuki et al. | |
| 2016/0297283 A1 | 10/2016 | Sakamoto et al. | |
| 2019/0232757 A1 | 8/2019 | Suzuki et al. | |
| 2022/0011006 A1 * | 1/2022 | Miura | B60H 1/143 |

FOREIGN PATENT DOCUMENTS

| | | |
|---|---|---|
| JP | 2000055573 A | 2/2000 |
| JP | 2009270822 A | 11/2009 |
| JP | 2011230648 A | 11/2011 |
| JP | 4906894 B2 | 3/2012 |
| JP | 2012181005 A | 9/2012 |
| JP | 5243281 B2 | 7/2013 |
| JP | 5423528 B2 | 2/2014 |
| JP | 2014029237 A | 2/2014 |
| JP | 5533207 B2 | 6/2014 |
| JP | 2015074274 A | 4/2015 |
| JP | 5741495 B2 | 7/2015 |
| JP | 2015127634 A | 7/2015 |
| JP | 5780166 B2 | 9/2015 |
| JP | 2015182487 A | 10/2015 |
| JP | 2015191703 A | 11/2015 |
| JP | 2015216723 A | 12/2015 |
| JP | 2015218911 A | 12/2015 |
| JP | 2016049915 A | 4/2016 |
| JP | 5920175 B2 | 5/2016 |
| JP | 5920178 B2 | 5/2016 |
| JP | 5983387 B2 | 8/2016 |
| JP | 6015636 B2 | 10/2016 |
| JP | 6052222 B2 | 12/2016 |
| JP | 6060797 B2 | 1/2017 |
| JP | 6097234 B2 | 3/2017 |
| JP | 2019074250 A | 5/2019 |
| WO | WO-2012073746 A1 | 6/2012 |
| WO | WO-2014073151 A1 | 5/2014 |
| WO | WO-2014076874 A1 | 5/2014 |

* cited by examiner

2ND HEATING MODE

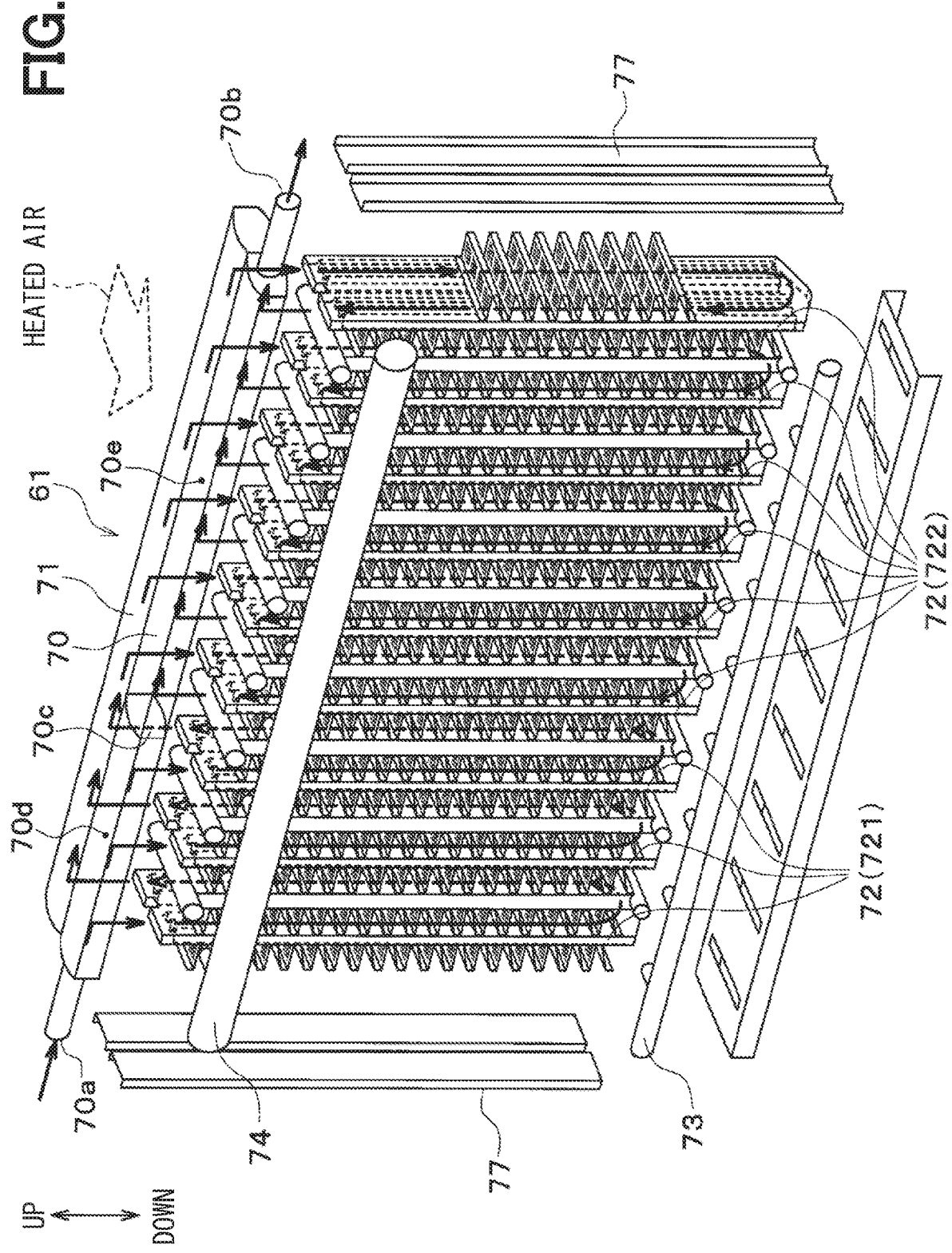

VEHICULAR HEAT MANAGEMENT SYSTEM

CROSS REFERENCE TO RELATED APPLICATIONS

The present application is a continuation application of International Patent Application No. PCT/JP2018/035238 filed on Sep. 24, 2018, which designated the U.S. and claims the benefit of priority from Japanese Patent Application No. 2017-207444 filed on Oct. 26, 2017. The entire disclosures of all of the above applications are incorporated herein by reference.

TECHNICAL FIELD

The present disclosure relates to a vehicular heat management system.

BACKGROUND

Conventionally, a vehicular air conditioner is applied to an electric vehicle which obtains a driving force for a vehicle travel from a vehicle-running electric motor. The vehicular air conditioner includes a refrigeration cycle that heats or cools vent air that is blown into a vehicle compartment. The refrigeration cycle is switched to a refrigerant circuit forming a so-called gas injection cycle in a heating mode in which the vent air is heated by heat absorbed from outside air as a heat source.

SUMMARY

According to at least one embodiment of the present disclosure, a vehicular heat management system includes a heat pump cycle capable of heating a heat-exchanging-object fluid by using exhaust heat of an in-vehicle device as a heat source that radiates heat during operation, and an exhaust-heat refrigerant circuit that releases the exhaust heat to outside air through an exhaust-heat refrigerant. The heat pump cycle includes a recovery heat exchange portion that performs heat exchange between a heated air heated by the exhaust heat and a cycle refrigerant circulating in the heat pump cycle. The exhaust-heat refrigerant circuit includes an exhaust-heat exchange portion that performs heat exchange between the heated air and the exhaust-heat refrigerant. The recovery heat exchange portion and the exhaust-heat exchange portion are integrally formed as a combined heat exchanger capable of transferring heat between the cycle refrigerant and the exhaust-heat refrigerant.

BRIEF DESCRIPTION OF DRAWINGS

The details of one or more embodiments are set forth in the accompanying drawings and the description below. Other features and advantages will be apparent from the description and drawings, and from the claims.

FIG. 24 is an exploded perspective view illustrating a combined heat exchanger according to at least one embodiment.

DETAILED DESCRIPTION

Figure 1:
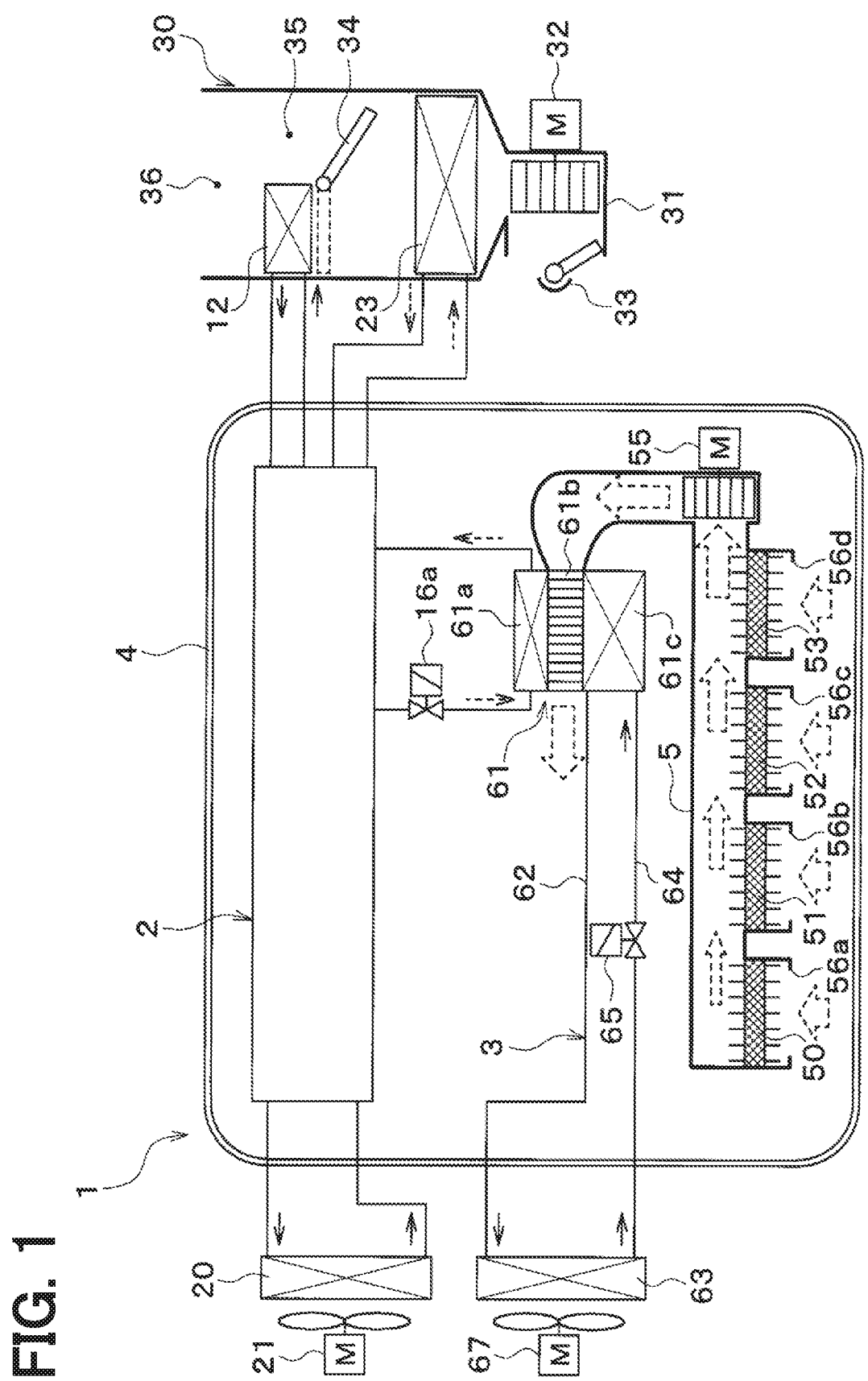
FIG. 1 is a diagram illustrating an entire configuration of a vehicular heat management system according to at least one embodiment.

First, a comparative example will be described. A vehicular air conditioner of the comparative example is applied to an electric vehicle which obtains a driving force for a vehicle travel from a vehicle-running electric motor.

The vehicular air conditioner of the comparative example includes a refrigeration cycle device that heats or cools vent air that is blown into a vehicle compartment. The refrigeration cycle device is configured to switch refrigerant circuits. The refrigeration cycle device is switched to a refrigerant circuit forming a so-called gas injection cycle in a heating mode in which the vent air is heated by heat absorbed from outside air as a heat source.

The gas injection cycle has a configuration in which an intermediate-pressure gas-phase refrigerant generated in the cycle is merged with a refrigerant in a process of compression by the compressor. Accordingly, in the gas injection cycle, a compression efficiency of the compressor can be improved, and coefficient of performance (COP) of the cycle can be improved.

That is, in the vehicular air conditioner of the comparative example, even in a heating mode requiring high heating capacity, for example, at a low outside air temperature, the refrigeration cycle device is switched to the gas injection cycle so as to reduce increase in electrical energy consumed for air conditioning. As a result, decrease in driving range of the electric vehicle per charge is reduced.

By the way, an electric vehicle is equipped with in-vehicle devices that radiate heat during operation, such as a battery, a charger, a power control unit, and a vehicle-running electric motor. However, in the comparative example, exhaust heat of these in-vehicle devices is not effectively used for, for example, heating a vehicle compartment. In other words, in the comparative example, a vehicular heat management system cannot effectively use the exhaust heat of the in-vehicle devices.

In contrast, the present disclosure provides a vehicular heat management system that can effectively use exhaust heat of an in-vehicle device that radiates heat during operation.

According to one aspect of the present disclosure, a vehicular heat management system includes a heat pump cycle capable of heating a heat-exchanging-object fluid by using exhaust heat of an in-vehicle device as a heat source that radiates heat during operation, and an exhaust-heat refrigerant circuit that releases the exhaust heat to outside air through an exhaust-heat refrigerant. The heat pump cycle includes a recovery heat exchange portion that performs heat exchange between a heated air heated by the exhaust heat and a cycle refrigerant circulating in the heat pump cycle. The exhaust-heat refrigerant circuit includes an exhaust-heat exchange portion that performs heat exchange between the heated air and the exhaust-heat refrigerant. The recovery heat exchange portion and the exhaust-heat exchange portion are integrally formed as a combined heat exchanger capable of transferring heat between the cycle refrigerant and the exhaust-heat refrigerant.

Since the heat pump cycle includes the recovery heat exchange portion, the exhaust heat of the in-vehicle device can be used as a heat source for heating the heat-exchanging-object fluid. Further, since the exhaust-heat refrigerant circuit includes the exhaust-heat exchange portion, the exhaust heat of the in-vehicle device can be released to the outside air in a case where the exhaust heat does not need to be used as the heat source for heating the heat-exchanging-object fluid.

The recovery heat exchange portion and the exhaust-heat exchange portion are integrally formed as the combined heat exchanger capable of transferring heat between the cycle refrigerant and the exhaust-heat refrigerant. Therefore, when heating the heat-exchanging-object fluid, the exhaust heat stored in the exhaust-heat refrigerant can also be used as a heat source.

According to the above aspect, it is possible to provide a vehicular heat management system that can effectively use exhaust heat of an in-vehicle device that radiates heat during operation.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. The present disclosure is not limited to combinations of embodiments which combine parts that are explicitly described as being combinable. As long as no problem is present, the various embodiments may be partially combined with each other even if not explicitly described.

First Embodiment

A first embodiment of the present disclosure will be described with reference to FIGS. 1 to 14. In the present embodiment, a vehicular heat management system 1 according to the present embodiment is applied an electric vehicle that gains driving power for vehicle running from a vehicle-running electric motor 53. The vehicular heat management system 1 performs a function of air-conditioning a vehicle compartment in the electric vehicle and a function of releasing exhaust heat to outside air from various in-vehicle devices that generate heat during operation.

The vehicular heat management system 1 can switch an air conditioning operation mode for performing air conditioning in the vehicle compartment between a cooling mode, a dehumidifying heating mode, a first heating mode, and a second heating mode.

The cooling mode is an operation mode in which vent air is cooled and blown into the vehicle compartment. The dehumidifying heating mode is an operation mode in which vent air which has been cooled and dehumidified is reheated and blown into the vehicle compartment. The first heating mode is an operation mode in which vent air is heated and blown into the vehicle compartment. The second heating mode is an operation mode in which vent air is heated by a higher heating capacity than the first heating mode and blown into the vehicle compartment.

As shown in FIG. 1, the vehicular heat management system 1 includes a heat pump cycle 2, an exhaust-heat refrigerant circuit 3, a heat insulating housing 4, a duct 5, and an indoor air conditioning unit 30. In FIG. 1, some components of the heat pump cycle 2 are not shown for clarity.

The heat pump cycle 2 is a vapor-compression refrigeration cycle device that adjusts a temperature of vent air that is blown into the vehicle compartment, which is a space to be air conditioned. Therefore, a heat-exchange fluid in the vehicular heat management system 1 of the present embodiment is the vent air. The heat pump cycle 2 can switch a refrigerant circuit in accordance with the air-conditioning operation mode of the vehicular heat management system 1 described above.

The heat pump cycle 2 employs an HFC refrigerant (specifically, R134a) as a refrigerant and forms a vapor compression subcritical refrigeration cycle in which a higher-pressure refrigerant pressure does not exceed a critical pressure of the refrigerant. In the following descriptions, the refrigerant circulating in the heat pump cycle 2 is referred to as a cycle refrigerant for clarification of the descriptions.

Further, the cycle refrigerant is mixed with a refrigeration oil for lubricating a compressor 11, and a part of the refrigeration oil circulates in the cycle together with the refrigerant.

Figure 2:
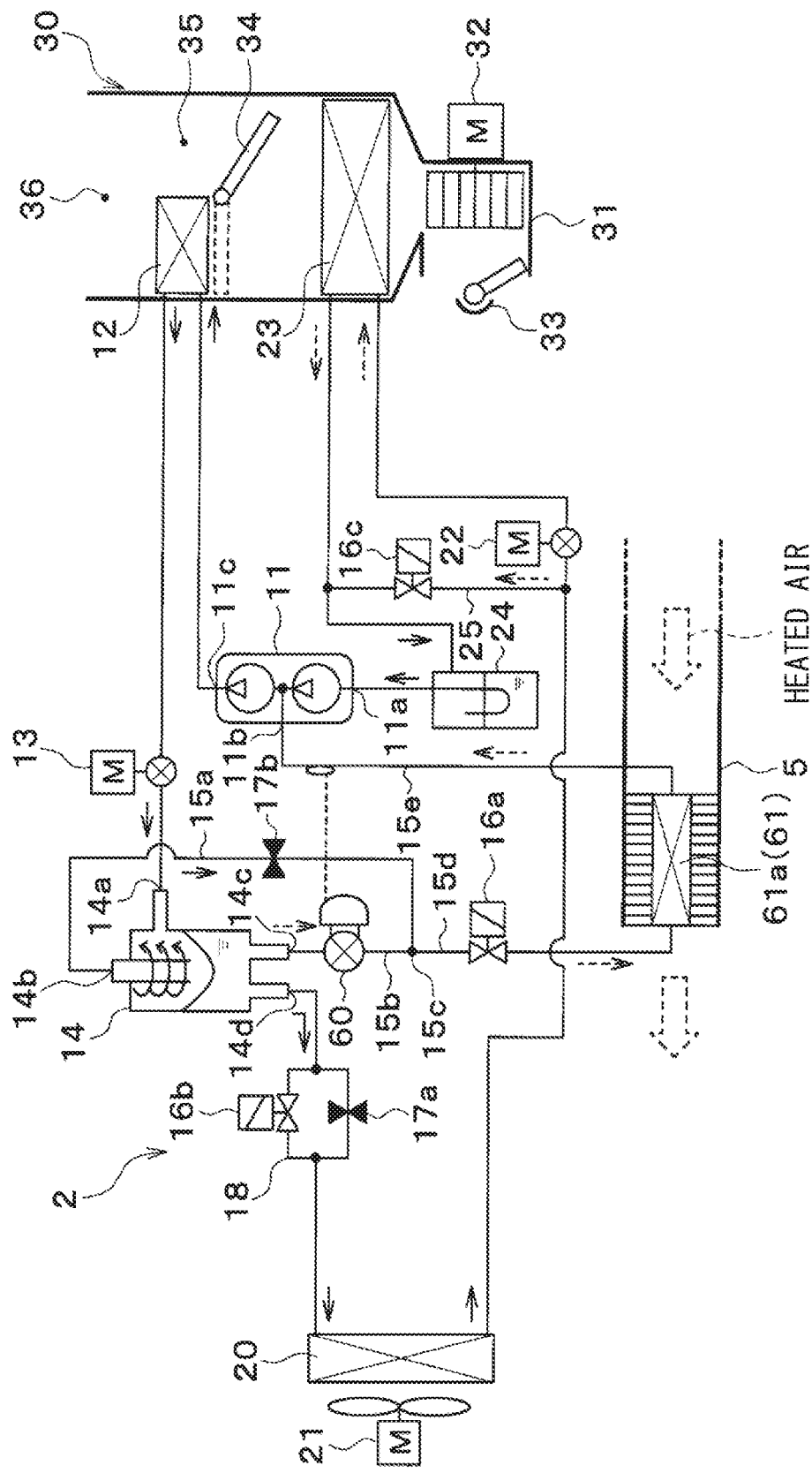
FIG. 2 is a diagram illustrating an entire configuration of a heat pump cycle according to at least one embodiment.

Next, a detailed configuration of the heat pump cycle 2 will be described with reference to FIG. 2. The compressor 11 is a two-stage electric compressor that compresses and discharges the cycle refrigerant in the heat pump cycle 2. The compressor 11 houses, in a housing constituting an outer case of the compressor 11, two compression mechanisms, i.e., a lower-stage compression mechanism and a higher-stage compression mechanism, and an electric motor which rotates both of the compression mechanisms. An operation of the compressor 11 is controlled in accordance with a control signal outputted from a controller 90 described later.

The compressor 11 includes a suction port 11a, an intermediate pressure port 11b, and a discharge port 11c. The suction port 11a is a suction opening through which a low-pressure cycle refrigerant is sucked from an outside of the housing into the lower-stage compression mechanism. The discharge port 11c is a discharge opening through which a high-pressure cycle refrigerant discharged from the higher-stage compression mechanism is discharged to the outside of the housing.

The intermediate pressure port 11b is an intermediate-pressure suction opening through which an intermediate-pressure cycle refrigerant flows into the housing from the outside of the housing and joins with a cycle refrigerant in a compressing process from low pressure to high pressure. Accordingly, the intermediate pressure port 11b is connected, through an inside of the housing, to the discharge opening side of the lower-stage compression mechanism and the suction opening side of the higher-stage compression mechanism.

The discharge port 11c of the compressor 11 is connected to a refrigerant inlet side of an indoor condenser 12. The indoor condenser 12 is disposed inside a casing 31 of the indoor air conditioning unit 30 described below. The indoor condenser 12 is a heating heat exchanger that heats the vent air at least in the heating mode and the dehumidifying heating mode via heat exchange between the cycle refrigerant at high pressure flowing through the indoor condenser 12 and the vent air that has passed through an indoor evaporator 23 described later.

A refrigerant outlet side of the indoor condenser 12 is connected to an inlet side of a higher-stage expansion valve 13. The higher-stage expansion valve 13 decompresses the cycle refrigerant at high pressure flowing out of the indoor condenser 12 until the cycle refrigerant has intermediate pressure. More specifically, the higher-stage expansion valve 13 is an electric and variable throttle mechanism and includes a valve element that is displaced to change a throttled passage area, and an electric actuator (e.g., stepper motor) that displaces the valve element.

Further, the heat pump cycle 2 includes a cooling expansion valve 22 as described later. The cooling expansion valve 22 is similar in basic structure to the higher-stage expansion valve 13. The higher-stage expansion valve 13 and the cooling expansion valve 22 has a full-opening function of fully opening a valve port to function as just a refrigerant path almost without performing flow rate control and refrigerant decompression, and a full-closing function of fully closing the valve port to obstruct a refrigerant path.

The higher-stage expansion valve 13 and the cooling expansion valve 22 switch the refrigerant circuit according to the above-described respective operation modes by the fully-opening function and the fully-closing function. That is, the higher-stage expansion valve 13 and the cooling expansion valve 22 also have a function as a refrigerant circuit switch of the heat pump cycle 2. Operations of the higher-stage expansion valve 13 and the cooling expansion valve 22 are controlled by a control signal (e.g., control pulse) output from the controller 90.

A refrigerant outlet of the higher-stage expansion valve 13 is connected to an inflow port 14a of a gas-liquid separator 14. The gas-liquid separator 14 is a gas-liquid separating device that separates gas and liquid of the cycle refrigerant flowing out of the higher-stage expansion valve 13. In the present embodiment, the gas-liquid separator 14 is of a centrifugal separator that separates gas and liquid of refrigerant by an action of centrifugal force. The gas-liquid separator 14 has a relatively small internal volume that allows the separated refrigerant to flow to the outside almost without being stored inside.

The gas-liquid separator 14 is provided with a gas-phase outflow port 14b through which the separated gas-phase refrigerant flows out, and a first liquid-phase outflow port 14c and a second liquid-phase outflow port 14d through which the separated liquid-phase refrigerant flows out.

The gas-phase outflow port 14b is connected to an intermediate-pressure gas-phase refrigerant passage 15a. An intermediate-pressure fixed throttle 17b is disposed in the intermediate-pressure gas-phase refrigerant passage 15a. The intermediate-pressure fixed throttle 17b is a decompressor that decompresses the cycle refrigerant flowing in the intermediate-pressure gas-phase refrigerant passage 15a, and is also a flow rate regulator that regulates a flow rate of the refrigerant. As the intermediate-pressure fixed throttle 17b, an orifice, a capillary tube, or the like can be used.

The first liquid-phase outflow port 14c is connected to an intermediate-pressure liquid-phase refrigerant passage 15b. A recovery expansion valve 60 is disposed in the intermediate-pressure liquid-phase refrigerant passage 15b.

The recovery expansion valve 60 is a variable throttle mechanism that changes its degree of throttling such that a superheat degree of the cycle refrigerant approaches a predetermined reference superheat degree on an outlet side of a recovery heat exchange portion 61a of a combined heat exchanger 61 described later (i.e., such that the superheat degree of the cycle refrigerant flowing into the intermediate pressure port 11b of the compressor 11 approaches the predetermined reference superheat degree).

The recovery expansion valve 60 may be a temperature-sensitive expansion valve that includes a thermosensitive portion having a deformable member (e.g., diaphragm) deformable depending on temperature and pressure of the cycle refrigerant on the outlet side of the recovery heat exchange portion 61a, and a mechanical mechanism that changes the degree of throttling according to the deformation of the deformable member.

In the second heating mode, the recovery heat exchange portion 61a of the combined heat exchanger 61 performs heat exchange between the cycle refrigerant flowing therethrough and heated air heated by exhaust heat of the in-vehicle devices 50 to 53. The detailed configuration of the combined heat exchanger 61 will be described later.

An outlet side of the intermediate-pressure gas-phase refrigerant passage 15a and an outlet side of the intermediate-pressure liquid-phase refrigerant passage 15b are connected to a junction 15c. At the junction 15c, a flow of the cycle refrigerant flowing out of the intermediate-pressure gas-phase refrigerant passage 15a and a flow of the cycle refrigerant flowing out of the intermediate-pressure liquid-phase refrigerant passage 15b join together.

The junction 15c has a three-way joint structure having three inflow/outflow ports that communicate with each other. In the junction 15c, two of the three inflow/outflow ports is used as a refrigerant inflow port, and the other one is used as a refrigerant outflow port.

The refrigerant outflow port of the junction 15c is connected to an inlet-side intermediate-pressure refrigerant passage 15d. A recovery open-close valve 16a is disposed in the inlet-side intermediate-pressure refrigerant passage 15d. The recovery open-close valve 16a is an electromagnetic valve that is disposed in the inlet-side intermediate-pressure refrigerant passage 15d and opens and closes the inlet-side intermediate-pressure refrigerant passage 15d. An operation of the recovery open-close valve 16a is controlled by a control voltage output from the controller 90.

As described above, in the recovery expansion valve 60, the degree of throttling is changed such that the superheat degree of the cycle refrigerant on the outlet side of the recovery heat exchange portion 61a approaches the reference superheat degree. Therefore, the cycle refrigerant flowing through the inlet-side intermediate-pressure refrigerant passage 15d is in a liquid phase state or a gas-liquid two-phase state having a relatively low vapor quality. Accordingly, the recovery open-close valve 16a is disposed in the refrigerant passage through which the cycle refrigerant flows in liquid phase or gas-liquid two-phase.

Further, the heat pump cycle 2 includes a lower-pressure open-close valve 16b and a cooling open-close valve 16c, as described later. The lower-pressure open-close valve 16b and the cooling open-close valve 16c are similar in basic configuration to the recovery open-close valve 16a.

Opening and closing of the refrigerant passages by the recovery open-close valve 16a, the lower-pressure open-close valve 16b and the cooling open-close valve 16c switch the refrigerant circuit according to the above-described respective operation modes. That is, the recovery open-close valve 16a, the lower-pressure open-close valve 16b, and the cooling open-close valve 16c have the function as the refrigerant circuit switch of the heat pump cycle 2 together with the higher-stage expansion valve 13 and the cooling expansion valve 22.

Among these refrigerant circuit switches, the recovery open-close valve 16a is a refrigerant circuit switch that switches between a refrigerant circuit through which the cycle refrigerant flows into the recovery heat exchange portion 61a and a refrigerant circuit through which the cycle refrigerant does not flow into the recovery heat exchange portion 61a.

An outlet side of the inlet-side intermediate-pressure refrigerant passage 15d is connected to a refrigerant inlet side of the recovery heat exchange portion 61a. Further, a refrigerant outlet of the recovery heat exchange portion 61a is connected to the intermediate pressure port 11b of the compressor 11 through an outlet-side intermediate-pressure refrigerant passage 15e.

The second liquid-phase outflow port 14d of the gas-liquid separator 14 is connected to a refrigerant inlet side of an air-conditioning outdoor heat exchanger 20 through a lower-stage fixed throttle 17a. The lower-stage fixed throttle 17a is a decompressor that decompresses the cycle refrigerant flowing out of the second liquid-phase outflow port 14d, and is also a flow rate regulator that regulates a flow rate of the refrigerant. The lower-stage fixed throttle 17a is similar in basic configuration to the intermediate-pressure fixed throttle 17b.

Further, the second liquid-phase outflow port 14d is connected to a fixed throttle bypass passage 18 in which the cycle refrigerant in liquid phase separated by the gas-liquid separator 14 bypasses the lower-stage fixed throttle 17a and flows to the refrigerant inlet side of the air-conditioning outdoor heat exchanger 20. The lower-pressure open-close valve 16b is disposed in the fixed throttle bypass passage 18 and opens and closes the fixed throttle bypass passage 18.

A pressure loss generated when the cycle refrigerant flowing out of the second liquid-phase outflow port 14d passes through the lower-pressure open-close valve 16b is extremely smaller than a pressure loss generated when the refrigerant passes through the lower-stage fixed throttle 17.

Therefore, when the controller 90 opens the lower-pressure open-close valve 16b, almost all of the cycle refrigerant flowing out of the second liquid-phase outflow port 14d flows into the air-conditioning outdoor heat exchanger 20 through the fixed throttle bypass passage 18. On the other hand, when the controller 90 closes the lower-pressure open-close valve 16b, the cycle refrigerant flowing out of the second liquid-phase outflow port 14d is decompressed by the lower-stage fixed throttle 17a and flows into the air-conditioning outdoor heat exchanger 20.

The air-conditioning outdoor heat exchanger 20 is a heat exchanger that performs heat exchange between the cycle refrigerant flowing therein and outside air supplied from an outside-air fan 21. The air-conditioning outdoor heat exchanger 20 functions as a radiator that allows the cycle refrigerant at high pressure to radiate heat at least in the cooling mode, and functions as an evaporator that allows the cycle refrigerant at low pressure to evaporate at least in the first heating mode and the second heating mode.

The outside-air fan 21 is an electric blower configured to send the outside air toward the air-conditioning outdoor heat exchanger 20. The number of revolutions (i.e., blowing capacity) of the outside-air fan 21 is controlled by a control voltage output from the controller 90. The outside-air fan 21 may be of a suction type or a blowing type as long as it can supply the outside air to the air-conditioning outdoor heat exchanger 20.

A refrigerant outlet side of the air-conditioning outdoor heat exchanger 20 is connected to a refrigerant inlet side of the indoor evaporator 23 through the cooling expansion valve 22. The cooling expansion valve 22 is an electric variable throttle mechanism that decompresses the pressure of the cycle refrigerant flowing out of the air-conditioning outdoor heat exchanger 20 to a low pressure at least in the cooling mode.

The indoor evaporator 23 is disposed upstream of the indoor condenser 12 in flow of the vent air in the casing 31 of the indoor air conditioning unit 30. The indoor evaporator 23 is a cooling heat exchanger that performs, at least in the cooling mode and the dehumidifying heating mode, heat exchange between the cycle refrigerant at low pressure flowing therein and the vent air supplied from an air-conditioning blower 32 such that the cycle refrigerant evaporates and exhibits a heat absorbing action to cool the vent air.

A refrigerant outlet side of the indoor evaporator 23 is connected to an inlet side of an accumulator 24. The accumulator 24 is a lower-pressure refrigerant gas-liquid separator that separates gas and liquid of the cycle refrigerant flowing thereinto and accumulates surplus refrigerant as liquid-phase refrigerant in the cycle. A gas-phase refrigerant outlet of the accumulator 24 is connected to the suction port 11a of the compressor 11.

The refrigerant outlet side of the air-conditioning outdoor heat exchanger 20 is connected to an evaporator bypass passage 25 through which the cycle refrigerant flowing out of the air-conditioning outdoor heat exchanger 20 bypasses the cooling expansion valve 22 and the indoor evaporator 23 and flows toward the inlet side of the accumulator 24. The cooling open-close valve 16c is disposed in the evaporator bypass passage 25 and opens and closes the evaporator bypass passage 25.

Next, the exhaust-heat refrigerant circuit 3 will be described. The exhaust-heat refrigerant circuit 3 is a thermosiphon for releasing exhaust heat of the in-vehicle devices 50 to 53 to the outside air. Refrigerant In the exhaust-heat refrigerant circuit 3 is the same type of refrigerant (R134a in the present embodiment) as the refrigerant circulating in the heat pump cycle 2. In the following descriptions, the refrigerant circulating in the exhaust-heat refrigerant circuit 3 is referred to as an exhaust-heat refrigerant for clarification of the descriptions.

The thermosiphon includes an evaporating heat exchange portion that is disposed in high-temperature air for evaporation of the refrigerant, and a condensing heat exchange portion that is disposed in low-temperature air for condensation of the refrigerant. These heat exchange portions are connected each other in a closed loop (that is, circularly). The thermosiphon is a heat transfer circuit that generates a difference in specific gravity in the refrigerant in the circuit due to a temperature difference between the high-temperature air and the low-temperature air. Hence, the refrigerant naturally circulates and transfers heat by the action of gravity.

As shown in FIG. 1, the exhaust-heat refrigerant circuit 3 includes an exhaust-heat exchange portion 61c of the combined heat exchanger 61, a waste-heat outdoor heat exchanger 63, and an exhaust-heat open-close valve 65.

The exhaust-heat exchange portion 61c is the evaporating heat exchange portion in which the exhaust-heat refrigerant evaporates via heat exchange between the exhaust-heat refrigerant in liquid phase or gas-liquid two-phase flowing therethrough and the heated air heated by the exhaust heat of the in-vehicle devices 50 to 53. That is, the exhaust-heat exchange portion 61c is a heat exchange portion in which the exhaust-heat refrigerant absorbs the exhaust heat of the in-vehicle devices 50 to 53 via the heated air.

The waste-heat outdoor heat exchanger 63 is the condensing heat exchange portion in which the exhaust-heat refrigerant condenses via heat exchange between the exhaust-heat refrigerant in gas phase flowing therethrough and the outside air blown from an outside-air fan 67. That is, the waste-heat outdoor heat exchanger 63 is a heat exchange portion in which the exhaust-heat refrigerant releases the absorbed exhaust heat of the in-vehicle devices 50 to 53 to the outside air.

The outside-air fan 67 is an electric blower configured to send the outside air toward the waste-heat outdoor heat exchanger 63. The number of revolutions (i.e., blowing capacity) of the outside-air fan 67 is controlled by a control voltage output from the controller 90. The outside-air fan 67 is similar in basic configuration to the outside-air fan 21 that sends the outside air toward the air-conditioning outdoor heat exchanger 20.

The exhaust-heat exchange portion 61c and the waste-heat outdoor heat exchanger 63 are connected by a gas-phase refrigerant pipe 62 and a liquid-phase refrigerant pipe 64. The gas-phase refrigerant pipe 62 is a refrigerant pipe that connects a refrigerant outlet side of the exhaust-heat exchange portion 61c and a refrigerant inlet side of the waste-heat outdoor heat exchanger 63. The liquid-phase refrigerant pipe 64 is a refrigerant pipe that connects a refrigerant outlet side of the waste-heat outdoor heat exchanger 63 and a refrigerant inlet side of the exhaust-heat exchange portion 61c.

The liquid-phase refrigerant pipe 64 is disposed below the gas-phase refrigerant pipe 62. Therefore, the exhaust-heat refrigerant in liquid phase condensed in the waste-heat outdoor heat exchanger 63 flows out downward to the liquid-phase refrigerant pipe 64 by the action of gravity.

The exhaust-heat open-close valve 65 is a refrigerant circulation shutter that opens and closes the liquid-phase refrigerant pipe 64 and thereby shuts off circulation of the exhaust-heat refrigerant. Accordingly, the exhaust-heat open-close valve 65 is disposed in the refrigerant passage through which the refrigerant flows in liquid phase or gas-liquid two-phase. The operation of the exhaust-heat open-close valve 65 is controlled by a control voltage from the controller 90.

Next, a detailed configuration of the combined heat exchanger 61 will be described with reference to FIGS. 3 to 10. Upward and downward arrows in these drawings indicate up and down directions when the vehicular heat management system 1 is mounted on the electric vehicle.

The combined heat exchanger 61 is a heat exchanger that integrally includes the recovery heat exchange portion 61a that performs heat exchange between the cycle refrigerant and the heated air in the heat pump cycle 2, and the exhaust-heat exchange portion 61c that performs heat exchange between the exhaust-heat refrigerant and the heated air in the exhaust-heat refrigerant circuit 3. The combined heat exchanger 61 has a configuration capable of transferring heat between the cycle refrigerant and the exhaust-heat refrigerant.

The recovery heat exchange portion 61a and the exhaust-heat exchange portion 61c in the combined heat exchanger 61 have a so-called tank-and-tube heat exchanger structure.

The tank-and-tube heat exchanger for heat exchange between refrigerant and air includes refrigerant tubes through which the refrigerant flows, and a refrigerant tank having a space for distributing or collecting the refrigerant flowing through the refrigerant tubes. In this structure, heat exchange is performed between the refrigerant flowing through the refrigerant tubes stacked and arranged at intervals in a certain direction and the air flowing through air passages formed between adjacent refrigerant tubes.

Figure 3:
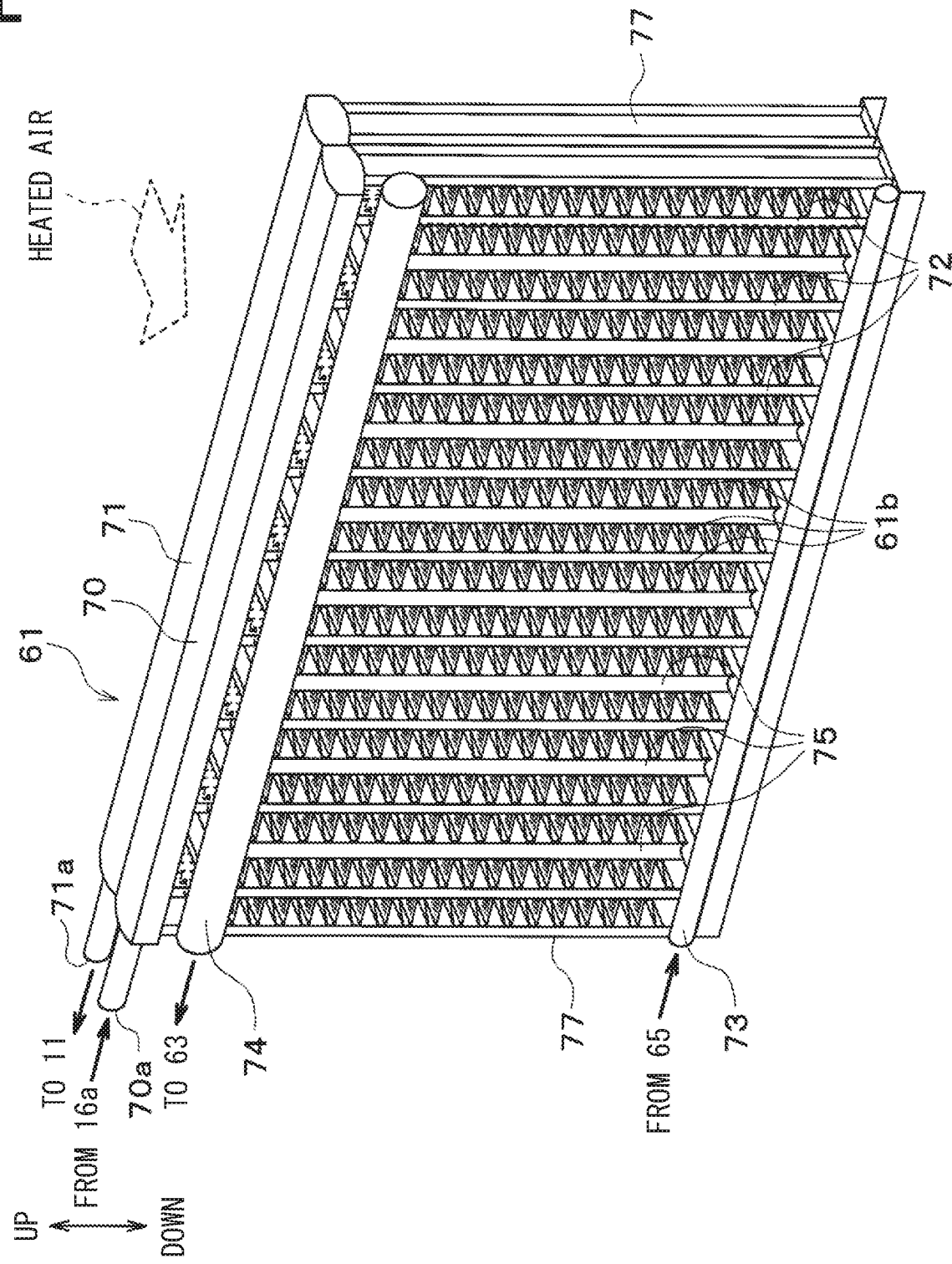
FIG. 3 is an external perspective view illustrating a combined heat exchanger according to at least one embodiment.
Figure 4:
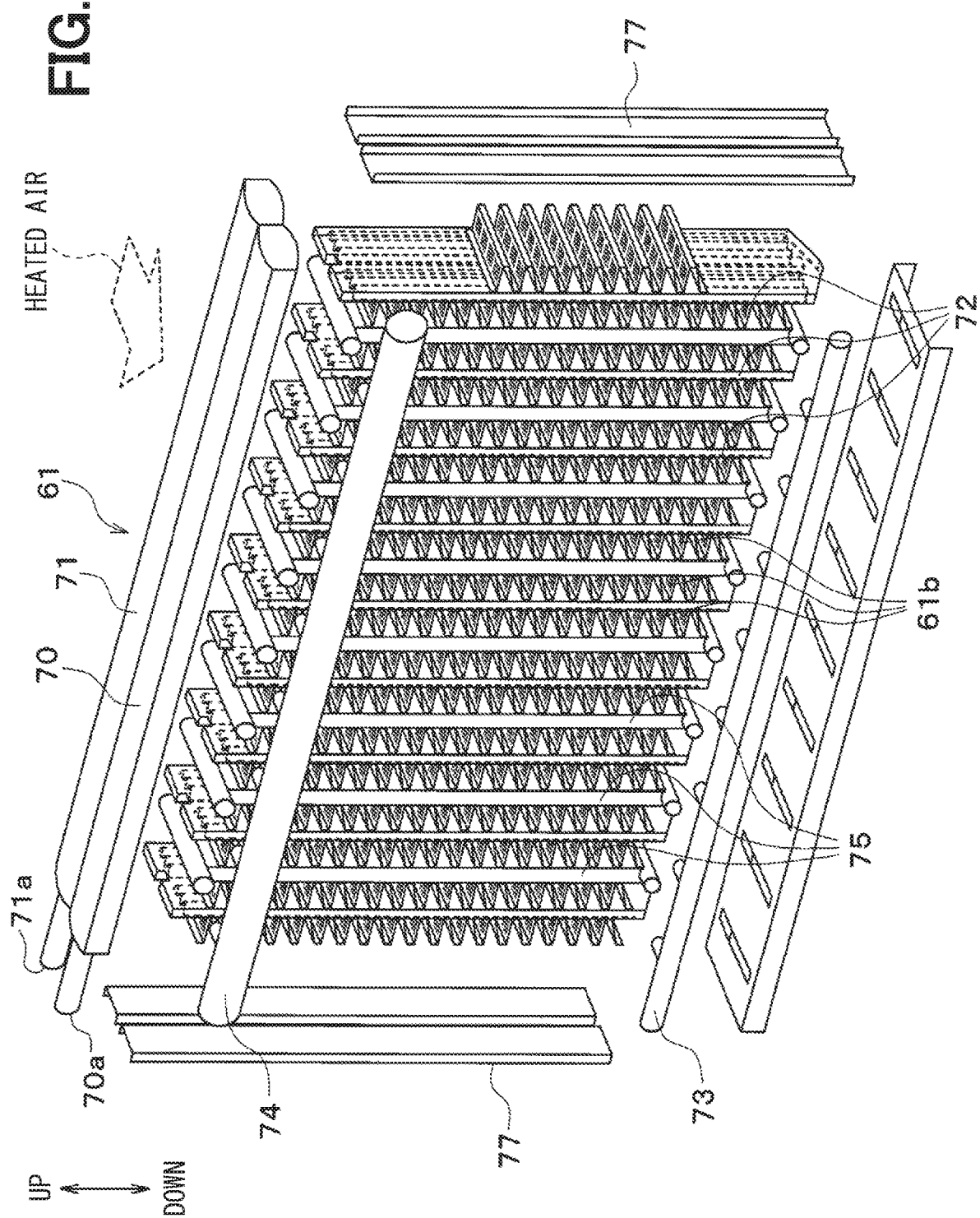
FIG. 4 is an exploded perspective view illustrating the combined heat exchanger according to at least one embodiment.

Thus, as shown in FIGS. 3 and 4, the recovery heat exchange portion 61a includes a leeward cycle refrigerant tank 70, a windward cycle refrigerant tank 71, and multiple cycle refrigerant tubes 72.

The cycle refrigerant tubes 72 are refrigerant tubes that form a refrigerant passages through which the cycle refrigerant flows. The cycle refrigerant tubes 72 are stacked and arranged at intervals in a certain direction.

Figure 5:
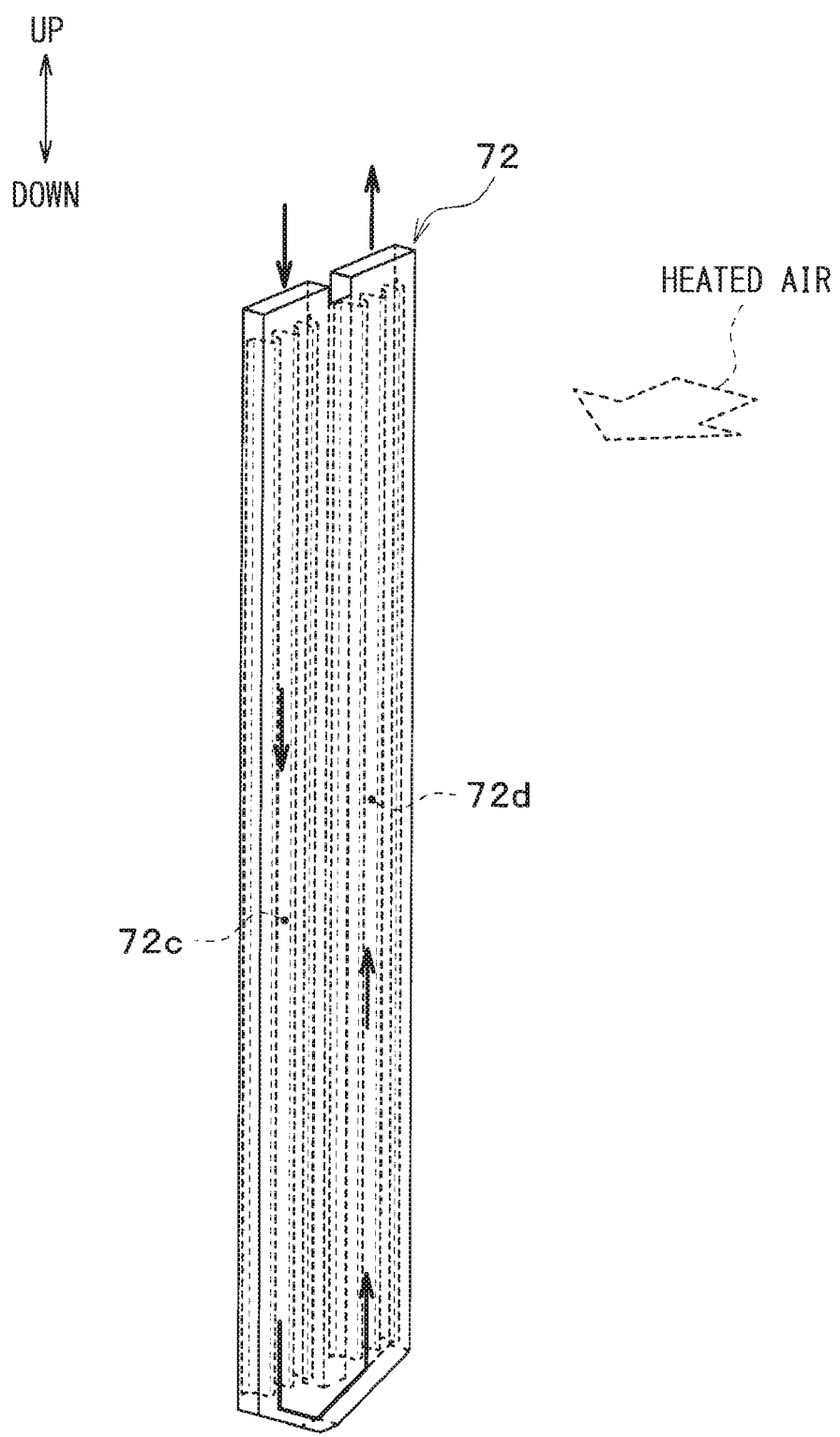
FIG. 5 is an enlarged external perspective view illustrating a cycle refrigerant tube of the combined heat exchanger according to at least one embodiment.
Figure 6:
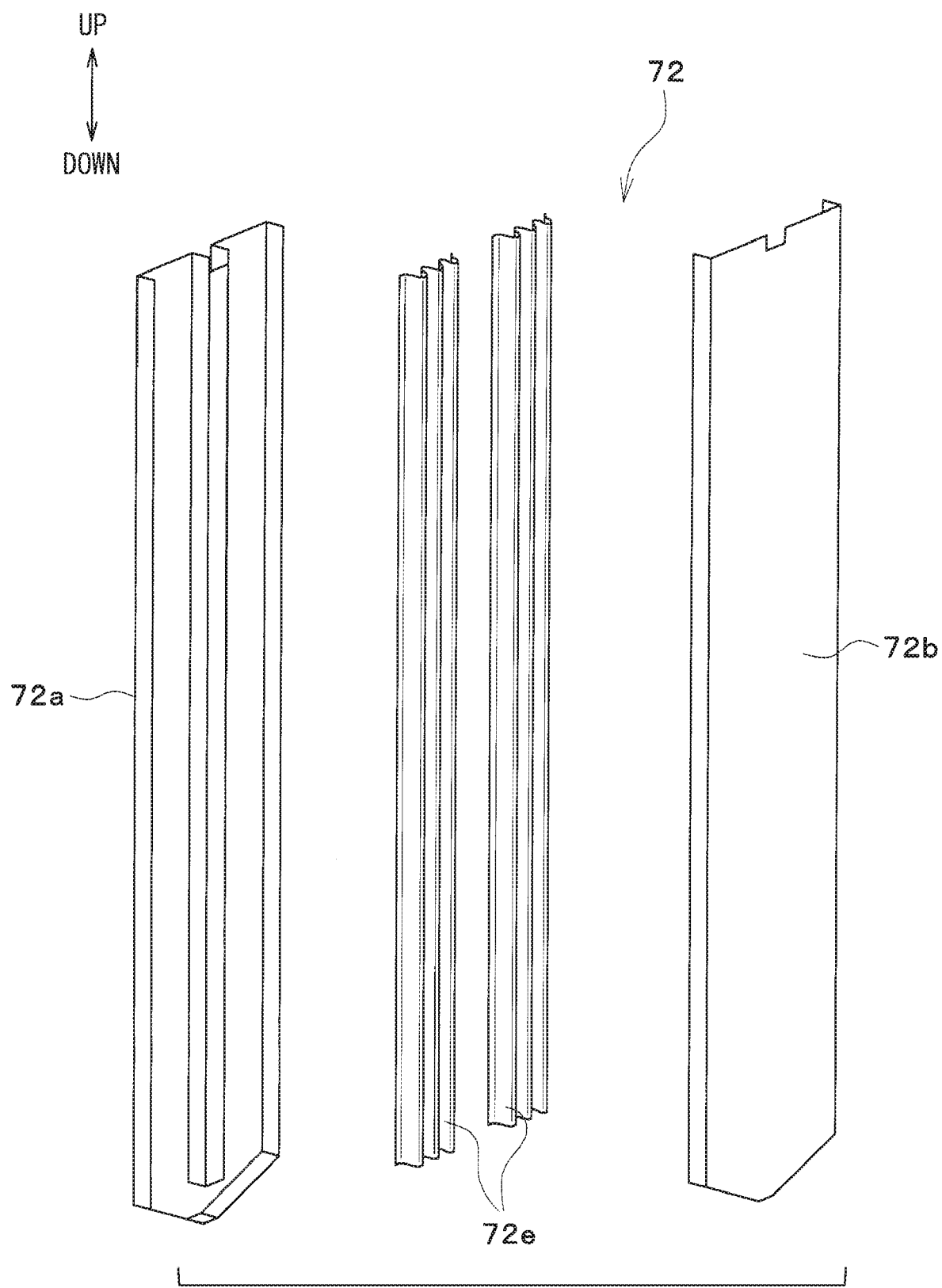
FIG. 6 is an enlarged exploded perspective view illustrating the cycle refrigerant tube of the combined heat exchanger according to at least one embodiment.

As shown in FIGS. 5 and 6, a cycle refrigerant tube 72 is a so-called plate tube including a pair of metal plate members (in the present embodiment, a first plate member 72a and a second plate member 72b) which have a ridge-and-groove portion on their surfaces and are joined each other. The cycle refrigerant tube 72 has therein refrigerant passages extending in an up-down direction and having a flat cross-section. The refrigerant passages are arranged in two rows with respect to the flow direction of the heated air.

In the present embodiment, as shown in FIG. 5, a most upstream portion of the refrigerant passage formed inside the cycle refrigerant tube 72 in which the cycle refrigerant flows from an upper side to a lower side is referred to as an upstream passage portion 72c. On the other hand, a most downstream portion of the refrigerant passage formed inside the cycle refrigerant tube 72 in which the cycle refrigerant flows from the lower side to the upper side is referred to as a downstream passage portion 72d.

The upstream passage portion 72c and the downstream passage portion 72d communicate on the lower side. The downstream passage portion 72d is disposed upstream of the upstream passage portion 72c in the flow direction of the heated air.

An inner plate 72e is disposed inside the upstream passage portion 72c and the downstream passage portion 72d. The inner plate 72e is a metal plate member having a square wave cross-section. The inner plate 72e divides the refrigerant passage into multiple narrow passages so that the cycle refrigerant flows evenly in the upstream passage portion 72c and the downstream passage portion 72d. The inner plate 72e functions to improve strength of the cycle refrigerant tube 72.

The leeward cycle refrigerant tank 70 shown in FIGS. 3 and 4 is a metal bottomed cylindrical member that forms a distribution space for distributing the refrigerant to the cycle refrigerant tubes 72. The leeward cycle refrigerant tank 70 has a shape extending in a stacking direction of the cycle refrigerant tubes 72.

A refrigerant inlet 70a at one longitudinal end of the leeward cycle refrigerant tank 70 is connected to an outlet side of the recovery open-close valve 16a. Further, the leeward cycle refrigerant tank 70 is connected to refrigerant inlet portions formed on the upper side of the upstream passage portions 72c of the cycle refrigerant tubes 72.

The windward cycle refrigerant tank 71 is a metal bottomed cylindrical member that forms a collecting space for collecting the refrigerant flowing out of the cycle refrigerant tubes 72. The windward cycle refrigerant tank 71 has a shape extending in the stacking direction of the cycle refrigerant tubes 72.

The windward cycle refrigerant tank 71 is connected to refrigerant outlet portions formed on the upper side of the downstream passage portions 72d of the cycle refrigerant tubes 72. A refrigerant outlet 71a at one longitudinal end of the windward cycle refrigerant tank 71 is connected to the intermediate pressure port 11b of the compressor 11.

Therefore, in the recovery heat exchange portion 61a, the cycle refrigerant distributed from the leeward cycle refrigerant tank 70 flows into the upstream passage portion 72c of each cycle refrigerant tube 72. The cycle refrigerant flowing into the upstream passage portion 72c flows from the upper side to the lower side.

The cycle refrigerant that has flowed through the upstream passage portion 72c changes its flow direction on the lower side of the cycle refrigerant tube 72 (that is, makes a U-turn), and flows into the downstream passage portion 72i d.

The cycle refrigerant flowing into the downstream passage portion 72d flows from the lower side to the upper side in the downstream passage portion 72d. The cycle refrigerant flowing out of the downstream passage portion 72d is collected in the windward cycle refrigerant tank 71. In the recovery heat exchange portion 61a, the cycle refrigerant exchanges heat with the heated air flowing outside the cycle refrigerant tube 72 when passing through the upstream passage portion 72c and the downstream passage portion 72d.

On the other hand, as shown in FIGS. 3 and 4, the exhaust-heat exchange portion 61c includes an inlet exhaust-heat refrigerant tank 73, an outlet exhaust-heat refrigerant tank 74, and multiple exhaust-heat refrigerant tubes 75.

The exhaust-heat refrigerant tubes 75 are refrigerant tubes that form a refrigerant passages through which the exhaust-heat refrigerant flows. The exhaust-heat refrigerant tubes 75 are stacked and arranged at intervals in a direction same as the stacking direction of the cycle refrigerant tubes 72.

More specifically, the cycle refrigerant tubes 72 and the exhaust-heat refrigerant tubes 75 are alternately stacked and arranged. Therefore, an air passage of the heated air in the combined heat exchanger 61 is formed between a cycle refrigerant tube 72 and an exhaust-heat refrigerant tube 75 which are adjacent to each other.

Figure 7:
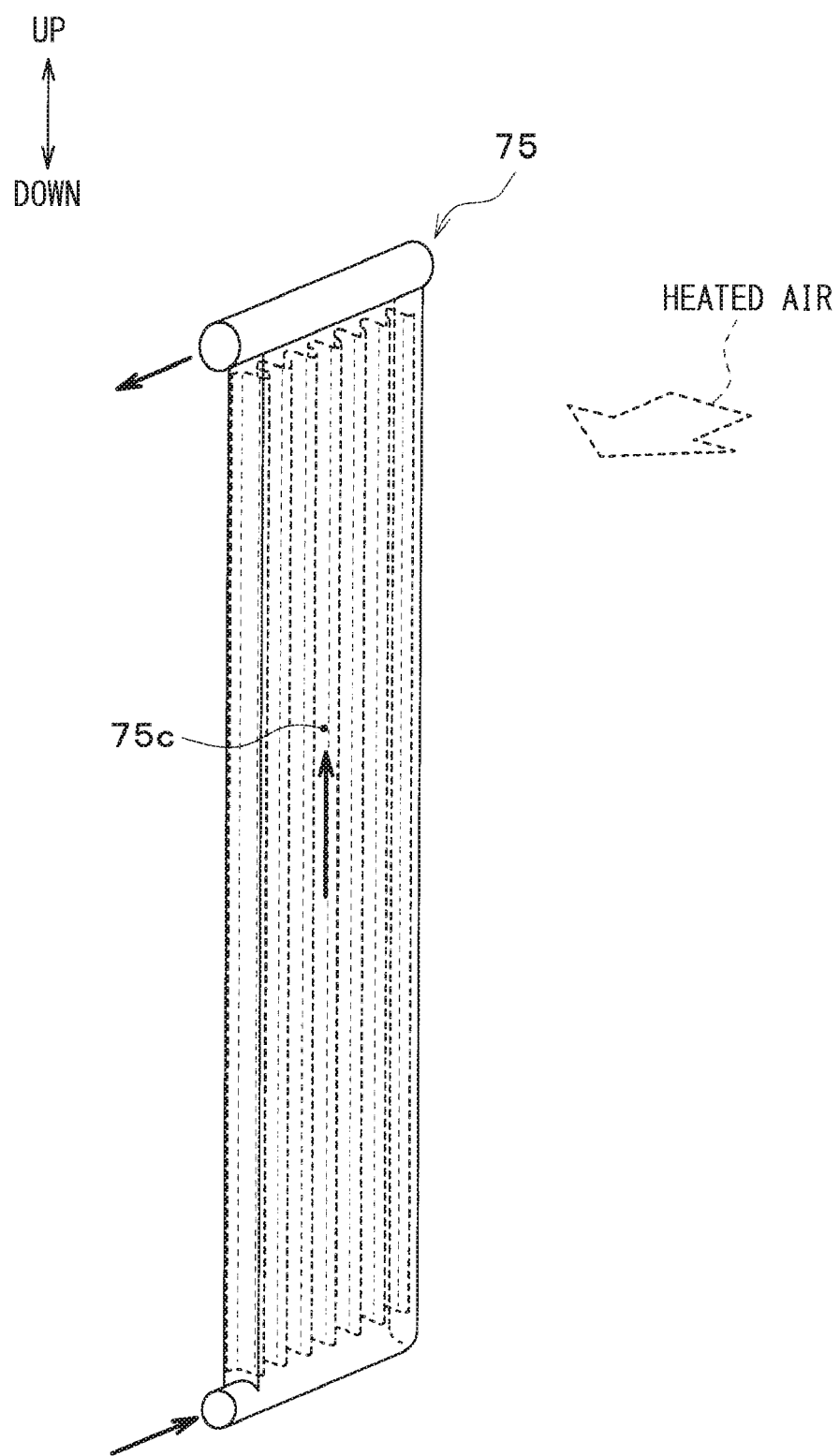
FIG. 7 is an enlarged external perspective view illustrating an exhaust-heat refrigerant tube of the combined heat exchanger according to at least one embodiment.
Figure 8:
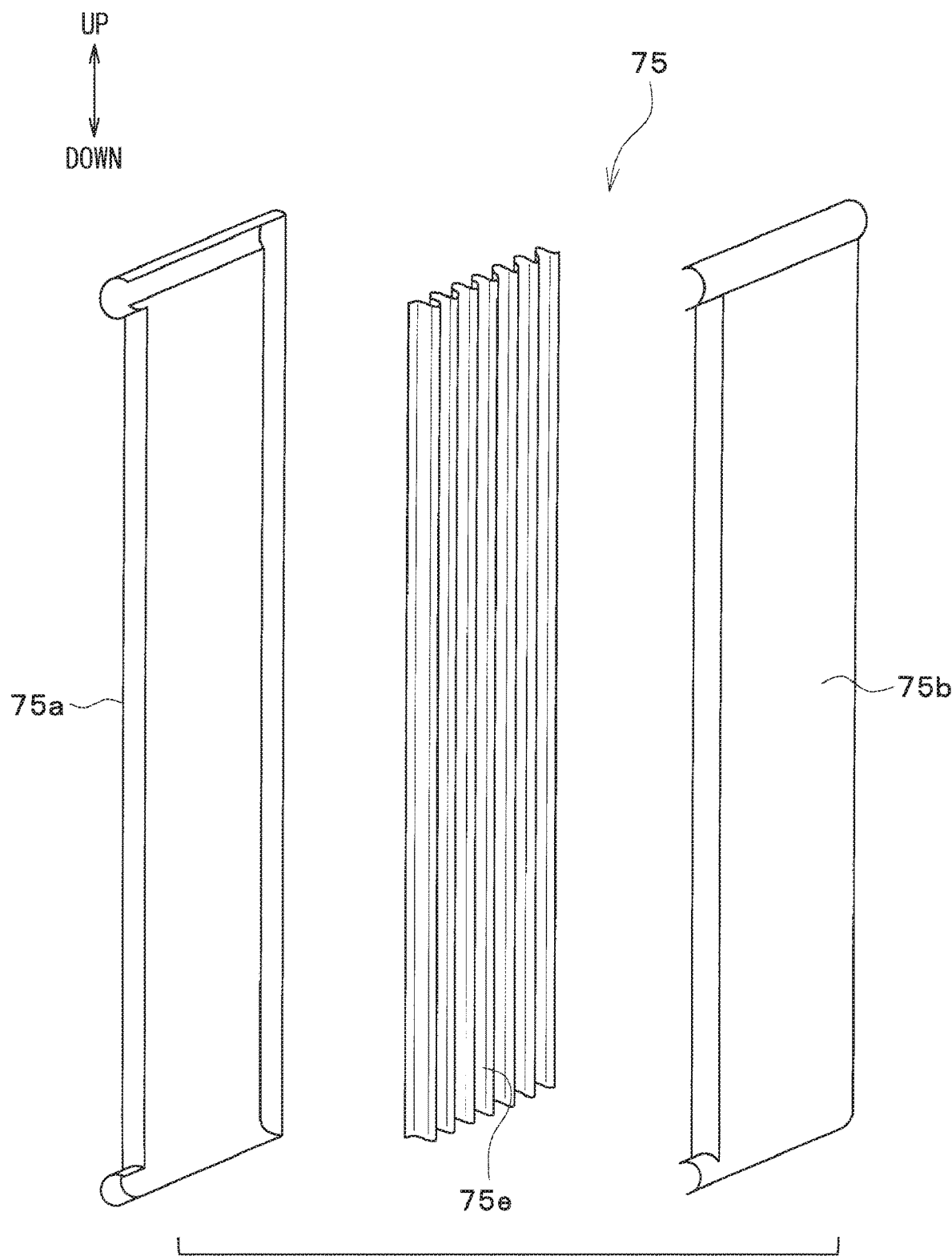
FIG. 8 is an enlarged exploded perspective view illustrating the exhaust-heat refrigerant tube of the combined heat exchanger according to at least one embodiment.

The exhaust-heat refrigerant tube 75 is a plate tube similar to the cycle refrigerant tube 72. As shown in FIGS. 7 and 8, an exhaust-heat refrigerant tube 75 includes a pair of metal plate members (in the present embodiment, a first plate member 75a and a second plate member 75b) which have a ridge-and-groove portion on their surfaces and are joined each other.

As shown in FIG. 7, the exhaust-heat refrigerant tube 75 having therein a refrigerant passage 75c extending in the up-down direction and having a flat cross-section. The refrigerant passage 75c is formed so that the exhaust-heat refrigerant flows from a lower side to an upper side of the exhaust-heat refrigerant tube 75. An inner plate 75e is disposed in the refrigerant passage formed inside the exhaust-heat refrigerant tube 75, similar to the cycle refrigerant tube 72.

The inlet exhaust-heat refrigerant tank 73 shown in FIGS. 3 and 4 is a metal bottomed cylindrical member that forms a distribution space for distributing the refrigerant to the exhaust-heat refrigerant tubes 75. The inlet exhaust-heat refrigerant tank 73 has a shape extending in the stacking direction of the cycle refrigerant tubes 72 and the exhaust-heat refrigerant tubes 75.

A refrigerant inlet at one longitudinal end of the inlet exhaust-heat refrigerant tank 73 is connected to an outlet side of the exhaust-heat open-close valve 65. Further, the inlet exhaust-heat refrigerant tank 73 is connected to refrigerant inlet portions formed on the lower side of the exhaust-heat refrigerant tubes 75.

The outlet exhaust-heat refrigerant tank 74 is a metal bottomed cylindrical member that forms a collecting space for collecting the refrigerant flowing out of the exhaust-heat refrigerant tubes 75. The outlet exhaust-heat refrigerant tank 74 has a shape extending in the stacking direction of the cycle refrigerant tubes 72 and the exhaust-heat refrigerant tubes 75.

The outlet exhaust-heat refrigerant tank 74 is connected to refrigerant outlet portions formed on the upper side of the exhaust-heat refrigerant tubes 75. A refrigerant outlet at one longitudinal end of the outlet exhaust-heat refrigerant tank 74 is connected to an inlet side of the waste-heat outdoor heat exchanger 63.

Therefore, in the exhaust-heat exchange portion 61c, the exhaust-heat refrigerant distributed by the inlet exhaust-heat refrigerant tank 73 flows into the refrigerant passage 75c of each exhaust-heat refrigerant tube 75, and flows from the lower side to the upper side. The exhaust-heat refrigerant that has flowed out of the refrigerant passage 75c is collected in the outlet exhaust-heat refrigerant tank 74. In the exhaust-heat exchange portion 61c, the exhaust-heat refrigerant exchanges heat with the heated air flowing outside the exhaust-heat refrigerant tube 75 when passing through the refrigerant passage 75c.

Figure 9:
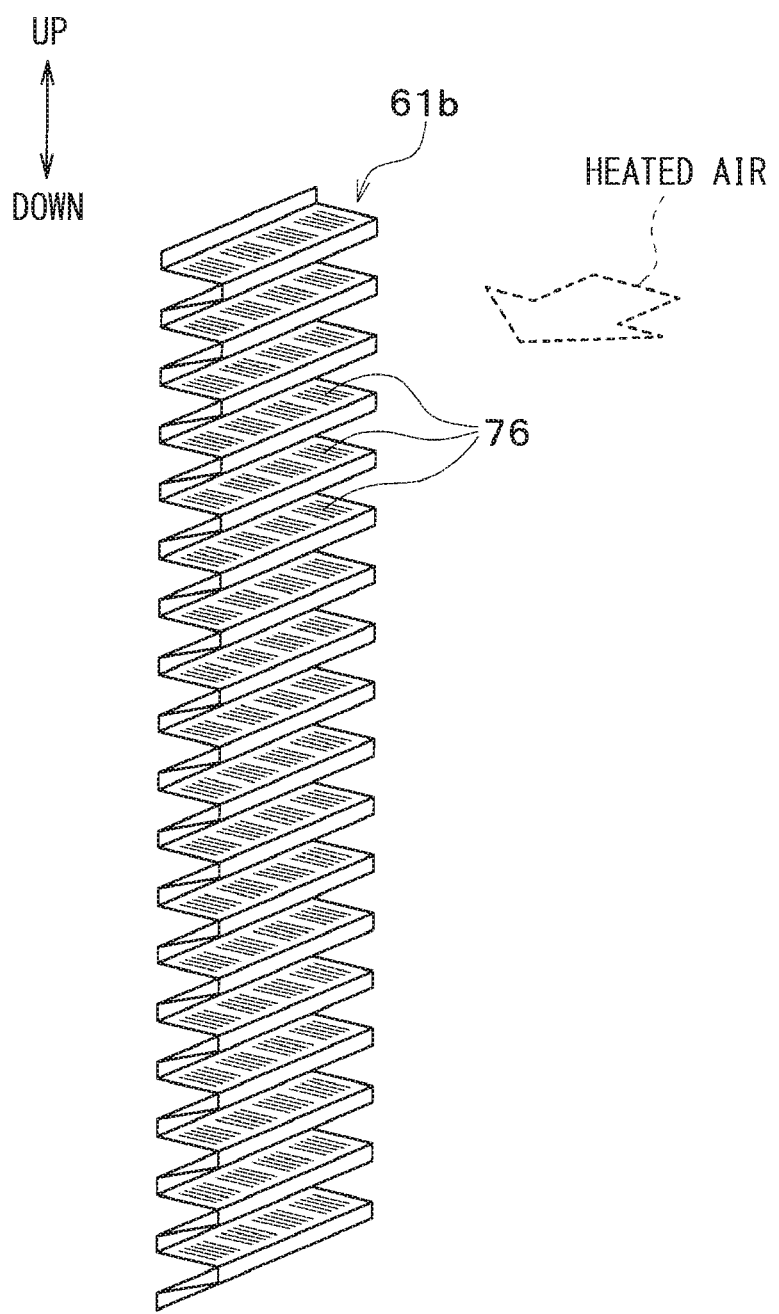
FIG. 9 is an enlarged external perspective view illustrating a heat-exchange fin of the combined heat exchanger according to at least one embodiment.

Further, the combined heat exchanger 61 includes heat-exchange fins 61b shown in FIG. 9, which are disposed in the air passages formed between the cycle refrigerant tubes 72 and the exhaust-heat refrigerant tubes 75. The heat-exchange fins 61b promote heat exchange between the cycle refrigerant and the heated air in the recovery heat exchange portion 61a, and promote heat exchange between the exhaust-heat refrigerant and the heated air in the exhaust-heat exchange portion 61c.

Each heat-exchange fin 61b is a corrugated fin formed by bending a sheet metal into a wave shape. The heat-exchange fin 61b has louvers 76 in the shape of a louvered window. Each louver 76 is formed by cutting and raising a part of a flat portion of the heat-exchange fin 61b. The louvers 76 improve a heat transfer coefficient by generating a meandering flow of the heated air passing through the air passages and reducing growth of a thermal boundary layer.

In the combined heat exchanger 61, the heat-exchange fins 61b are brazed to and in contact with both the cycle refrigerant tubes 72 and the exhaust-heat refrigerant tubes 75. Thus, heat can be transferred between the cycle refrigerant and the exhaust-heat refrigerant through the heat-exchange fins 61b.

Figure 10:
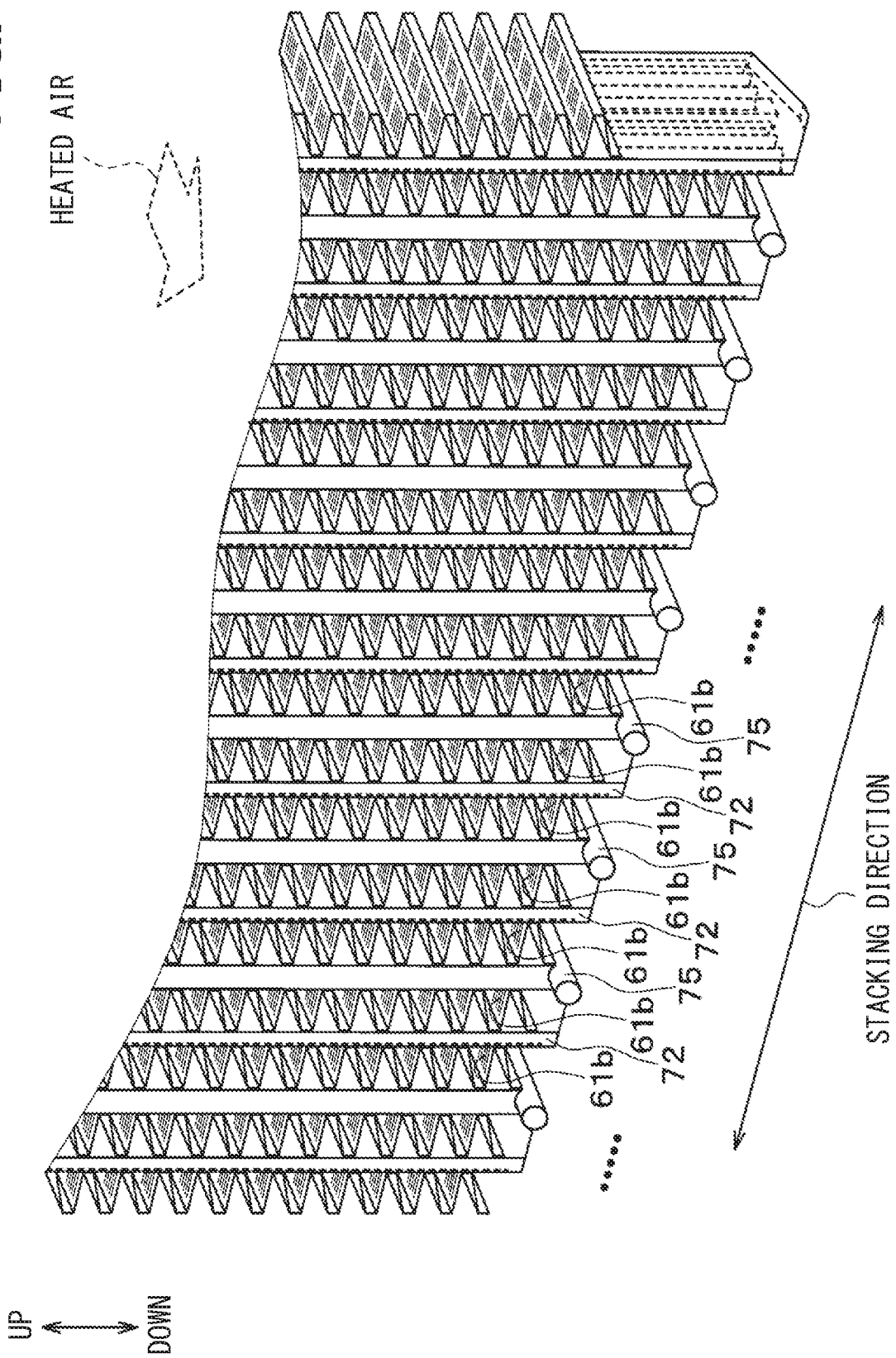
FIG. 10 is an explanatory diagram illustrating a stacking structure of the combined heat exchanger according to at least one embodiment.

Further, in the combined heat exchanger 61 of the present embodiment, as shown in FIG. 10, the cycle refrigerant tubes 72, the exhaust-heat refrigerant tubes 75, and the heat-exchange fins 61b are regularly and periodically stacked and arranged in an order: . . . the heat-exchange fin 61b→the cycle refrigerant tube 72→the heat-exchange fin 61b→the exhaust-heat refrigerant tube 75 . . . , except for both ends in the stacking direction.

In other words, in the combined heat exchanger 61 of the present embodiment, the cycle refrigerant tubes 72, the exhaust-heat refrigerant tubes 75, and the heat-exchange fins 61b are regularly stacked and arranged such that the cycle refrigerant tube 72 is between the heat-exchange fins 61b in the stacking direction except for both end ones of the cycle refrigerant tubes 72 in the stacking direction, and the exhaust-heat refrigerant tube 75 is between the heat-exchange fins 61b in the stacking direction except for both end ones of the exhaust-heat refrigerant tubes 75 in the stacking direction.

The combined heat exchanger 61 includes, as shown in FIGS. 3 and 4, side plates 77 made of metal and disposed on opposite end parts in the stacking direction of the cycle refrigerant tubes 72, the exhaust-heat refrigerant tubes 75 and the heat-exchange fins 61b. The side plates 77 are reinforcement members that improve strength of the combined heat exchanger 61 as a whole.

Each component of the above-described combined heat exchanger 61 is formed of the same kind of metal (aluminum alloy in this embodiment) having excellent heat conductivity. The combined heat exchanger 61 is manufactured by integrating these components by brazing.

Next, the duct 5 will be described. The duct 5 forms a heated-air passage in which the heated air heated by exhaust heat of the in-vehicle devices 50 to 53 is collected and guided from the in-vehicle devices 50 to 53 toward the air passages of the combined heat exchanger 61 where the heat-exchange fins 61b are provided. The duct 5 is formed of resin which is an insulator.

The in-vehicle devices 50 to 53 and a circulation blower 55 are arranged in the heated-air passage in the duct 5. In the present embodiment, a battery 50, a charging generator 51, a power control unit 52, and the vehicle-running electric motor 53 are arranged as the in-vehicle devices. That is, the in-vehicle devices according to the present embodiment are electric in-vehicle devices that are mounted on the electric vehicle, operated by being supplied with electric power, and generate heat during operation.

The battery 50 is a secondary battery capable of charging and discharging. In the present embodiment, a lithium ion battery is used as the battery 50. The battery 50 supplies electric power stored therein to the electric in-vehicle devices such as the vehicle-running electric motor 53.

In the battery 50 of this type, at low temperature, the chemical reaction does not easily proceed, and it is difficult to obtain sufficient performance regarding charging and discharging. On the other hand, deterioration of the battery 50 easily proceeds at high temperature. Therefore, in the present embodiment, a usable temperature range of the battery 50 is set from 10 to 40 degrees Celsius as a temperature range in which the battery 50 can exhibit sufficient performance. Therefore, an upper limit in the usable temperature range of the battery 50 of the present embodiment is set at 40 degrees Celsius.

The charging generator 51 is a charging device that stores generated electric power in the battery 50. A usable temperature range is set also for the charging generator 51, in which sufficient performance can be exhibited. An upper limit in the usable temperature range of the charging generator 51 is set at a value higher than the upper limit of the usable temperature range of the battery 50.

The power control unit 52 is a power distribution device that manages distribution of electric power supplied from the battery 50 to various electric in-vehicle devices. A usable temperature range is set also for the power control unit 52, in which sufficient performance can be exhibited. An upper limit in the usable temperature range of the power control unit 52 is set at a value higher than the upper limit of the usable temperature range of the charging generator 51.

The vehicle-running electric motor 53 outputs a driving force for vehicle running. A usable temperature range is set also for the vehicle-running electric motor 53, in which sufficient performance can be exhibited. An upper limit in the usable temperature range of the vehicle-running electric motor 53 is set at a value higher than the upper limit of the usable temperature range of the power control unit 52.

The circulation blower 55 draws the heated air heated by the in-vehicle devices 50 to 53 and blows the heated air toward the air passages of the combined heat exchanger 61. The circulation blower 55 is an electric blower that is controlled in rotation speed (i.e., blowing capacity) by a control voltage output from the controller 90.

The duct 5 has multiple suction ports 56a to 56d for sucking airs heated by the in-vehicle devices 50 to 53, respectively. The suction ports 56a to 56d have different opening areas and ventilation resistances according to amounts of heat generated by the corresponding in-vehicle devices 50 to 53. Therefore, amounts of the airs sucked in through the respective suction ports 56a to 56d are different.

Next, the heat insulating housing 4 will be described. The heat insulating housing 4 is a housing that forms an internal space that houses the in-vehicle devices 50 to 53, and at least a part of the combined heat exchanger 61. The heat insulating housing 4 has a heat insulating structure that reduces heat transfer between inside and outside thereof. More specifically, the heat insulating housing 4 is made of a resin having excellent heat insulating properties. Further, the heat insulating housing 4 has a certain degree of hermeticity so that the outside air does not enter the internal space or air in the internal space does not leak to the outside.

The heat insulating housing 4 houses, in addition to the in-vehicle devices 50 to 53, as shown in FIG. 1, the duct 5, the circulation blower 55, some components of the heat pump cycle 2 and some components of the exhaust-heat refrigerant circuit 3 in the internal space of the heat insulating housing 4. On the other hand, the indoor condenser 12, the air-conditioning outdoor heat exchanger 20, and the indoor evaporator 23 in the heat pump cycle 2, and the waste-heat outdoor heat exchanger 63 in the exhaust-heat refrigerant circuit 3 are located outside the heat insulating housing 4.

Therefore, the circulation blower 55 sucks air in the internal space of the heat insulating housing 4 into the heated-air passage of the duct 5 through the suction ports 56a to 56d, and blows out the heated air flowing out of the air passages of the combined heat exchanger 61 into the internal space of the heat insulating housing 4. That is, the circulation blower 55 circulates the air within the internal space of the heat insulating housing 4 as shown by white thin broken arrows in FIG. 1.

Next, the indoor air conditioning unit 30 will be described. The indoor air conditioning unit 30 provides an air passage for blowing the vent air which has been adjusted in temperature by the heat pump cycle 2 to an appropriate place in a vehicle compartment in the vehicular heat management system 1. The indoor air conditioning unit 30 accommodates the air-conditioning blower 32, the indoor evaporator 23, the indoor condenser 12 and the like in an air passage provided inside the casing 31 forming an outer shell of the indoor air conditioning unit 30.

The casing 31 provides an air passage for the vent air to be blown into the vehicle compartment, and is formed of a resin having a certain degree of elasticity and excellent in strength (specifically, polypropylene). An inside-outside air switch device 33 is disposed on a most upstream side of the casing 31 in flow of the vent air. The inside-outside air switch device 33 switches and introduces the inside air (air inside the vehicle compartment) and the outside air (air outside the vehicle compartment) into the casing 31.

The inside-outside air switch device 33 includes an inside-outside air switch door that continuously adjusts an opening area of an inside-air introduction port for introducing the inside air into the casing 31 and an opening area of an outside-air introduction port for introducing the outside air. Thus, the inside-outside air switch device 33 can change an introduction ratio between an introduction amount of the inside air and an introduction amount of the outside air. The inside-outside air switch door is driven by an electric actuator for the inside-outside air switch door. Operation of the electric actuator is controlled in accordance with a control signal output from the controller 90.

The air-conditioning blower 32 is disposed downstream of the inside-outside air switch device 33 in the vent air flow. The air-conditioning blower 32 functions to blow the air drawn through the inside-outside air switch device 33 toward the vehicle compartment. The air-conditioning blower 32 is an electric blower that drives a centrifugal multi-blade fan with an electric motor. The number of revolutions (that is, the blowing capacity) of the air-conditioning blower 32 is controlled according to a control voltage output from the controller 90.

The indoor evaporator 23 and the indoor condenser 12 are disposed in this order downstream of the air-conditioning blower 32 in flow of the vent air. In other words, the indoor evaporator 23 is disposed upstream of the indoor condenser 12 in flow of the vent air. The casing 31 has therein a cool air bypass passage 35 that allows the vent air that has passed through the indoor evaporator 23 to bypass the indoor condenser 12 and flow downstream.

An air mixing door 34 is disposed downstream of the indoor evaporator 23 in flow of the vent air and upstream of the indoor condenser 12 in flow of the vent air. The air mixing door 34 regulates the vent air after passing through the indoor evaporator 23 and adjusts an air volume ratio between an air volume passing through the indoor condenser 12 and an air volume passing through the cool air bypass passage 35.

The air mixing door 34 is driven by an electric actuator for driving the air mixing door. Operation of the electric actuator is controlled in accordance with a control signal output from the controller 90.

A mixing space 36 is disposed downstream of the indoor condenser 12 in flow of the vent air and mixes the vent air heated by the indoor condenser 12 and the vent air passing through the cool air bypass passage 35 without being heated by the indoor condenser 12. Further, opening holes are provided in a most downstream portion of the casing 31 in flow of the vent air and blows the vent air (air conditioning wind) mixed in the mixing space 36 into the vehicle compartment.

The opening holes include a face opening hole, a foot opening hole, and a defroster opening hole (any of them is not shown). The face opening hole is an opening hole for blowing the air conditioning wind toward an upper body of an occupant in the vehicle compartment. The foot opening hole is an opening hole for blowing the air conditioning wind toward a foot of the occupant. The defroster opening hole is an opening hole for blowing the air conditioning wind toward an inner surface of a vehicle front window glass.

The face opening hole, the foot opening hole, and the defroster opening hole are respectively connected to a face blowing port, a foot blowing port, and a defroster blowing port (both, not shown) provided in the vehicle compartment through a duct defining an air passage.

Therefore, the air mixing door 34 adjusts the air volume ratio between the air volume passing through the indoor condenser 12 and the air volume passing through the cool air bypass passage 35, thereby adjusting a temperature of the air conditioning wind mixed in the mixing space 36. As a result, the air mixing door 34 also adjusts the temperature of the vent air (air conditioning wind) blown from each of the blowing ports into the vehicle compartment.

A face door for adjusting the opening area of the face opening hole, a foot door for adjusting the opening area of the foot opening hole, and a defroster door (all not shown) for adjusting the opening area of the defroster opening hole are disposed on the upstream side of the face opening hole, the foot opening hole, and the defroster opening hole in the ventilation air flow, respectively.

The face door, the foot door, and the defroster door configure a blowing mode switching device for switching a blowing port through which the air conditioning wind is blown out to another. The face door, the foot door, and the defroster door are connected to an electric actuator for driving the blowing port mode door through a link mechanism or the like, and are rotationally operated in conjunction with each other. Operation of the electric actuator is controlled in accordance with a control signal output from the controller 90.

Figure 11:
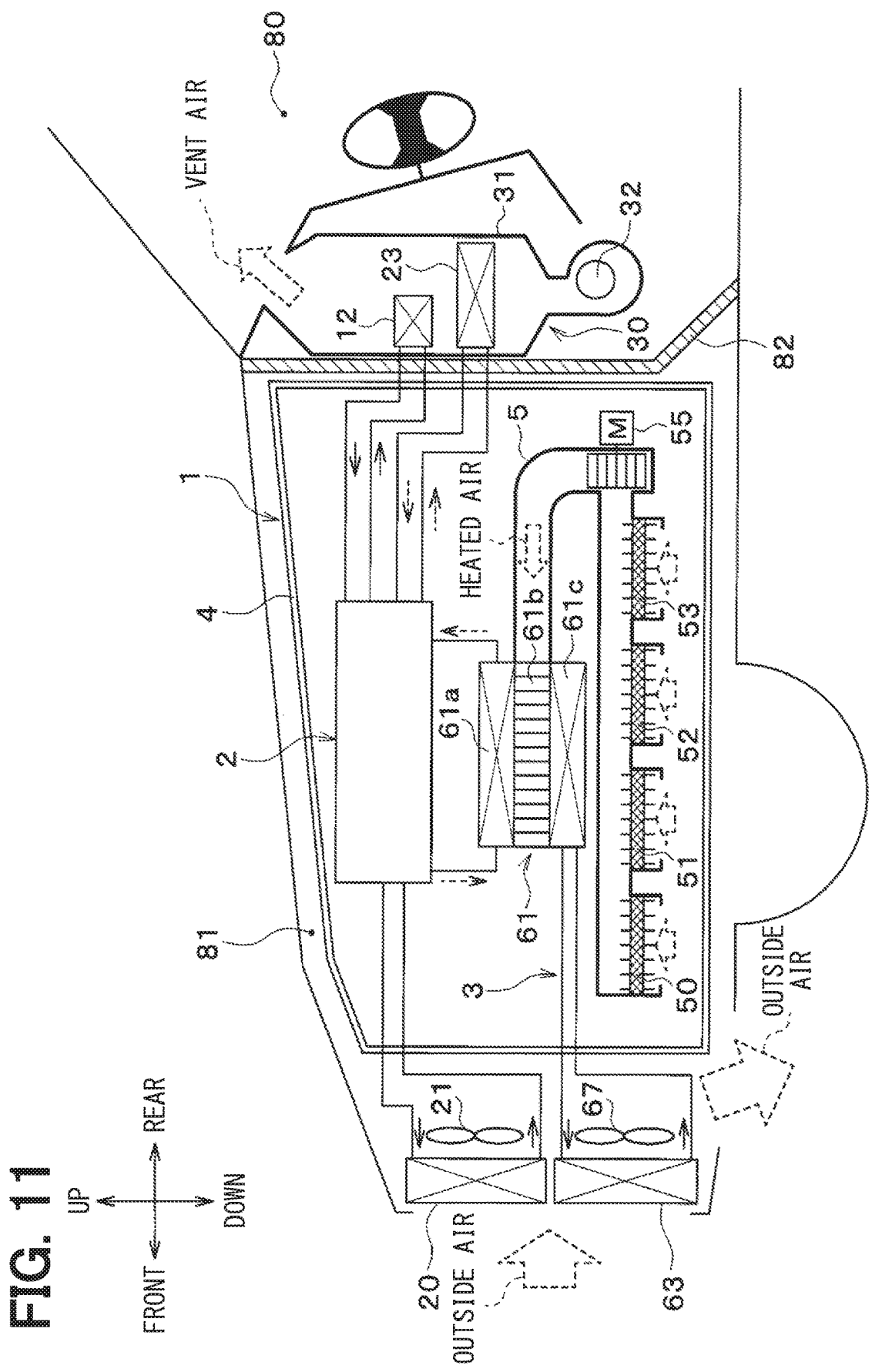
FIG. 11 is an explanatory diagram illustrating an arrangement of the vehicular heat management system according to at least one embodiment.

Next, an arrangement of the vehicular heat management system 1 mounted on the electric vehicle will be described with reference to FIG. 11. In FIG. 11, some components of the heat pump cycle 2, the exhaust-heat refrigerant circuit 3 and the indoor air conditioning unit 30 are not shown for clarity.

As shown in FIG. 11, in the electric vehicle of the present embodiment, a driving device compartment 81 is provided in front of the vehicle compartment 80. The driving device compartment 81 is a space in which at least a part of a driving device (e.g., a vehicle-running electric motor 53) that outputs a driving force for running the vehicle is disposed.

The vehicle compartment 80 and the driving device compartment 81 are separated by a partition wall 82. The partition wall 82 corresponds to a soundproof and fireproof partition member, called a dash panel or a firewall, in a normal engine vehicle that obtains driving force for vehicle running from an internal combustion engine (engine).

The heat insulating housing 4 is disposed in the driving device compartment 81. Therefore, the in-vehicle devices 50 to 53, the duct 5, the circulation blower 55, some components of the heat pump cycle 2 and some components of the exhaust-heat refrigerant circuit 3 housed in the heat insulating housing 4 are also disposed in the driving device compartment 81.

The air-conditioning outdoor heat exchanger 20 in the heat pump cycle 2 and the waste-heat outdoor heat exchanger 63 in the exhaust-heat refrigerant circuit 3 are located inside the driving device compartment 81 and in a vehicular front part outside the heat insulating housing 4. Therefore, in the electric vehicle of the present embodiment, traveling wind (i.e., the outside air) can be sent to the air-conditioning outdoor heat exchanger 20 and the waste-heat outdoor heat exchanger 63 when the vehicle is running.

The air-conditioning outdoor heat exchanger 20 and the waste-heat outdoor heat exchanger 63 are arranged in parallel with respect to the flow direction of the outside air. FIG. 11 illustrates an example in which the air-conditioning outdoor heat exchanger 20 and the waste-heat outdoor heat exchanger 63 are arranged in the up-down direction, but of course, the air-conditioning outdoor heat exchanger 20 and the waste-heat outdoor heat exchanger 63 may be arranged in a right-left direction.

The indoor air conditioning unit 30 is disposed inside an instrument panel at the front of the vehicle compartment 80. Hence, the indoor condenser 12, the indoor evaporator 23, and the like of the heat pump cycle 2, which are housed in the casing 31 of the indoor air conditioning unit 30 are also arranged in the vehicle compartment 80.

Further, in-vehicle devices that generate less heat than the in-vehicle devices 50 to 53, and other vehicle components (any of them is not shown) are arranged inside the driving device compartment 81 or the heat insulating housing 4.

Next, an electric controller of the vehicular heat management system 1 will be described with reference to FIG. 12. The controller 90 includes a known microcomputer including CPU, ROM and RAM, and peripheral circuits. The controller 90 performs various calculations and processes based on control programs stored in the ROM, and controls the operation of various controlling-object devices connected to an output side of the controller 90.

Figure 12:
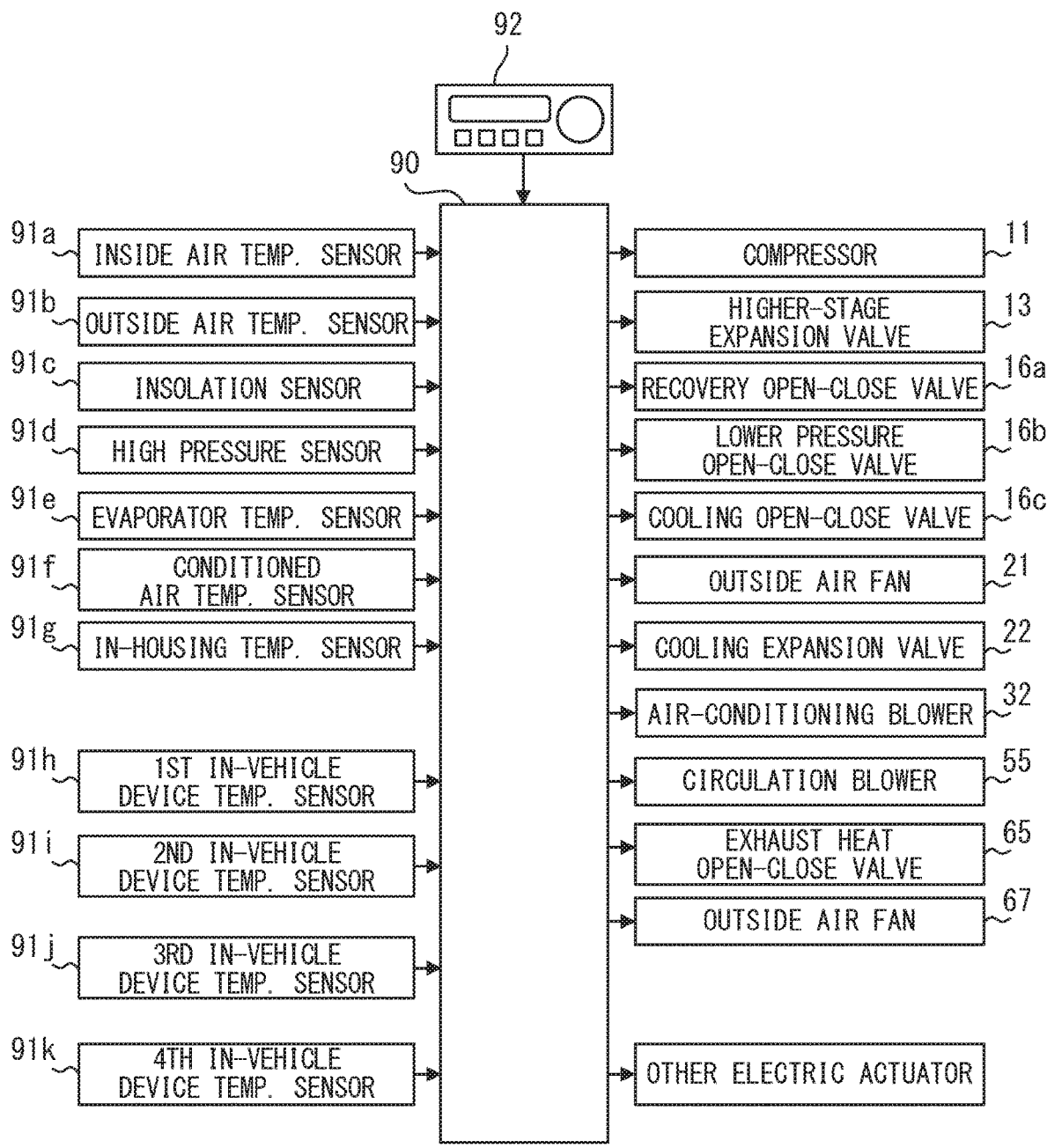
FIG. 12 is a block diagram illustrating an electric controller of the vehicular heat management system according to at least one embodiment.

As shown in FIG. 12, an input side of the controller 90 is connected with a control sensor group that includes an inside air temperature sensor 91$a$, an outside air temperature sensor 91$b$, an insolation sensor 91$c$, a high pressure sensor 91$d$, an evaporator temperature sensor 91$e$, a conditioned air temperature sensor 91$f$, an in-housing temperature sensor 91$g$, and first to fourth in-vehicle temperature sensors 91$h$ to 91$k$. Detection signals of the control sensor group are input to the controller 90.

The inside air temperature sensor 91$a$ is an inside air temperature detector that detects an interior temperature Tr (inside air temperature) of the vehicle compartment. The outside air temperature sensor 91$b$ is an outside air temperature detector that detects an exterior temperature Tam (outside air temperature) of the vehicle compartment. The insolation sensor 91$c$ is an insolation amount detector that detects an insolation amount As entering the vehicle compartment. The high pressure sensor 91$d$ is a refrigerant pressure detector that detects a higher-pressure cycle refrigerant pressure Pd that is a pressure of the cycle refrigerant in a flow channel from a discharge port side of the compressor 11 to an inlet side of the cooling expansion valve 22 or an inlet side of the higher-stage expansion valve 13.

The evaporator temperature sensor 91$e$ is an evaporator temperature detector that detects a refrigerant evaporation temperature (evaporator temperature) Tefin of the cycle refrigerant in the indoor evaporator 23. The conditioned air temperature sensor 91$f$ is a conditioned-air temperature detector that detects a vent air temperature TAV of the vent air sent from the mixing space 36 to the vehicle compartment.

The in-housing temperature sensor 91$g$ is an in-housing temperature detector that detects an in-housing temperature Tins of air in the internal space of the heat insulating housing 4. The in-housing temperature sensor 91$g$ may include multiple temperature sensors that detect temperatures at multiple locations in the internal space, and an average value of detected values of the multiple temperature sensors may be used as the in-housing temperature Tins.

The first in-vehicle device temperature sensor 91$h$ is a first in-vehicle device temperature detector that detects a first in-vehicle device temperature Tve1 of the battery 50. The second in-vehicle device temperature sensor 91$i$ is a second in-vehicle device temperature detector that detects a second in-vehicle device temperature Tve2 of the charging generator 51. The third in-vehicle device temperature sensor 91$j$ is a third in-vehicle device temperature detector that detects a third in-vehicle device temperature Tve3 of the power control unit 52. The fourth in-vehicle device temperature sensor 91$k$ is a fourth in-vehicle device temperature detector that detects a fourth in-vehicle device temperature Tve4 of the vehicle-running electric motor 53.

Each of the first to fourth in-vehicle device temperature sensors 91$h$ to 91$k$ may include multiple temperature sensors for detecting temperatures of the corresponding in-vehicle device, similarly to the in-housing temperature sensor 91$g$. Average values of the detection values of the multiple temperature sensors may be used as the first to fourth in-vehicle device temperatures Tve1 to Tve4, respectively.

Furthermore, the input side of the controller 90 is connected to an operation panel 92 located near the instrument panel in the front part of the vehicle compartment. The operation panel 92 includes various operation switches, and operation signals output from the operation switches are input to the controller 90.

The various operation switches of the operation panel 92 include an air-conditioning operation switch, an air volume setting switch and a temperature setting switch. The air-conditioning operation switch is an air-conditioning operation requesting portion for an occupant to request to perform air conditioning of the vehicle compartment. The air volume setting switch is an input portion for the occupant to manually set an air volume of the air-conditioning blower 32. The temperature setting switch is a temperature setting portion for setting a set temperature Tset of the vehicle compartment.

The controller 90 is integrally constituted by controllers that control operations of the various controlling-object devices connected to the output side of the controller 90. That is, configurations (hardware and software) of the controller 90, which control operations of the respective controlling-object devices, are the controllers controlling the operations of the corresponding controlling-object devices.

For example, a part (specifically, hardware and software) of the controller 90 that controls the operation of the compressor 11 of the heat pump cycle 2 is a compressor controller. Of course, these controllers may be controllers separated from one another.

Next, an operation of the vehicular heat management system 1 of the present embodiment in the above configurations will be described. As described above, the vehicular heat management system 1 performs a function of air-conditioning the vehicle compartment in the electric vehicle and a function of releasing exhaust heat to outside air from the various in-vehicle devices 50 to 53 that generate heat during operation. That is, the controller 90 of the vehicular heat management system 1 controls operations of various controlling-object devices so as to adjust the temperature in the vehicle compartment to a desired temperature for the occupant and maintain the temperatures of the in-vehicle devices 50 to 53 within their usable temperature ranges.

Figure 13:
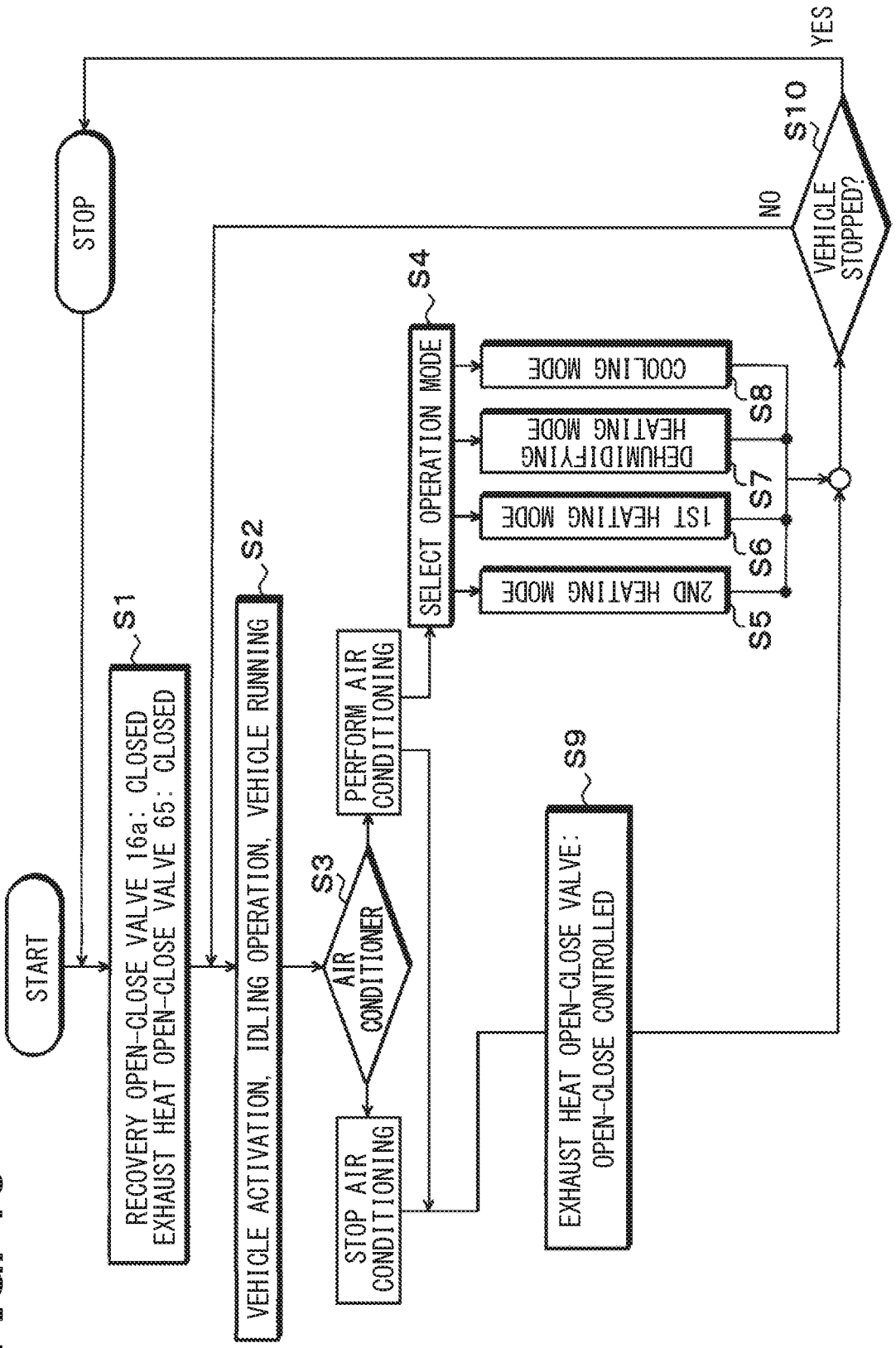
FIG. 13 is an explanatory diagram showing an outline of a control flow of the vehicular heat management system according to at least one embodiment.

FIG. 13 shows an outline of a control flow executed by the controller 90. In this control flow, when an entire system of the vehicle is activated (started), for initialization, the recovery open-close valve 16a of the heat pump cycle 2 is closed, and the exhaust-heat open-close valve 65 of the exhaust-heat refrigerant circuit 3 is closed (at step S1 in FIG. 13).

Subsequently, a current operating state of the vehicle, for example, whether the vehicle is at time of activation, time of idling, or time of running, is determined (at step S2 in FIG. 13). Such determination of the operating state of the vehicle is performed based on detection signals of the control sensor group connected to the controller 90. Next, it is determined whether an air-conditioning operation is performed (at step S3 in FIG. 13). In the present embodiment, when the air-conditioning operation switch on the operation panel 92 is turned on (ON), it is determined that the air-conditioning operation is performed.

When it is determined at step S3 that the air-conditioning operation is performed, a control for performing air conditioning in the vehicle compartment is executed. In this control, an operation mode for air conditioning is selected (at step S4 in FIG. 13), and for example, an operation of the heat pump cycle 2 is controlled according to the selected operation mode (at steps S5 to S8 in FIG. 13).

Further, in this control flow, regardless of the determination result of step S3, a control for release of exhaust heat of the in-vehicle devices 50 to 53 to the outside air is performed. In this control, an opening-and-closing control of the exhaust-heat open-close valve 65 of the exhaust-heat refrigerant circuit 3 is performed so as to maintain the temperatures of the in-vehicle devices 50 to 53 within their respective usable temperature ranges (at step S9 in FIG. 13).

Until the entire vehicle system is stopped, the process returns to step S2, and the same control flow is repeated again. When the entire vehicle system is stopped, the vehicular heat management system 1 is also stopped (at step S10 in FIG. 13).

Next, controls for performing air conditioning in the vehicle compartment, which are performed at steps S4 to S8 in FIG. 13, will be described in detail.

In the controls, the controller 90 calculates a target blowing temperature TAO of the vent air sent to the vehicle compartment based on detection signals from the control sensor group and operation signals from the operation panel 92. The target blowing temperature TAO is calculated by the following formula F1.

$$TAO = Kset \times Tset - Kr \times Tr - Kam \times Tam - Ks \times As + C \quad (F1)$$

Tset is a set temperature set by the temperature setting switch. Tr is the inside air temperature detected by the inside air temperature sensor 91a. Tam is the outside air temperature detected by the outside air temperature sensor 91b. Ts is a solar radiation amount detected by the insolation sensor 91c. Kset, Kr, Kam, and Ks are control gains, and C is a constant for correction.

Further, the controller 90 switches the operation mode based on the target blowing temperature TAO, the detection signals and the operation signals. A detailed operation in each operation mode will be described below.

(a) Cooling Mode

In the cooling mode, the controller 90 controls the higher-stage expansion valve 13 to be in a fully closed state and controls the cooling expansion valve 22 to be in a throttled state to exert a pressure reducing action. Further, the controller 90 closes the recovery open-close valve 16a, opens the lower-pressure open-close valve 16b, and closes the cooling open-close valve 16c.

Accordingly, in the heat pump cycle 2 in the cooling mode, a cycle is formed in which the cycle refrigerant circulates in an order: the discharge port 11c of the compressor 11 (→the indoor condenser 12→the higher-stage expansion valve 13)→the gas-liquid separator 14→the lower-pressure open-close valve 16b→the air-conditioning outdoor heat exchanger 20→the cooling expansion valve 22→the indoor evaporator 23→the accumulator 24→the suction port 11a of the compressor 11.

In the cycle configuration, the controller 90 determines control signals or the like output to the various controlling-object devices connected to the output side of the controller 90, and the controller 90 controls the operation of the various controlling-object devices.

For example, the controller 90 determines a control signal output to the compressor 11 such that the refrigerant evaporation temperature Tefin detected by the evaporator temperature sensor 91e becomes equal to a target evaporation temperature TEO. The target evaporation temperature TEO is determined based on the target blowing temperature TAO with reference to a control map for the cooling mode stored in advance in the controller 90.

Specifically, in the control map, the target evaporation temperature TEO increases with increase in the target blowing temperature TAO so that the vent air temperature TAV detected by the conditioned air temperature sensor 91f approaches the target blowing temperature TAO. Further, the target evaporation temperature TEO is determined to be within a range in which frosting of the indoor evaporator 23 can be reduced (specifically, 1 degree Celsius or more).

The controller 90 determines a control voltage output to the air-conditioning blower 32 based on the target blowing temperature TAO with reference to a control map which is stored in advance in the controller 90. More specifically, in the control map, an air blowing volume of the air-conditioning blower 32 is maximized in an extremely low temperature range (maximum cooling range) in target blowing temperature TAO and an extremely high temperature range (maximum heating range) in target blowing temperature TAO. The air blowing volume is decreased as the target blowing temperature TAO approaches an intermediate temperature range.

The controller 90 determines a control signal output to the cooling expansion valve 22 such that a degree of subcooling of the refrigerant flowing into the cooling expansion valve 22 approaches a target degree of subcooling. The target degree of subcooling is determined such that a coefficient of performance (COP) of the cycle approaches a maximum value.

The controller 90 also determines a control signal output to the electric actuator for driving the air mixing door such that the cool air bypass passage 35 is fully opened and a vent-air passage of the indoor condenser 12 is closed. The controller 90 also appropriately determines control signals output to other various controlling-object devices. At the same time, the control signals and the like are corrected according to the operation state of the vehicle determined at step S2 described above.

The controller 90 outputs the control signals and the like determined as described above to the various controlling-object devices. Thereafter, a control routine is repeated at a predetermined control cycle until a stop of air-conditioning operation is required. In the control routine, for example, the above-described detection signals and the operation signals are read in→the target blowing temperature TAO is calculated→the control signals and the like output to the various controlling-object devices are determined→the control signals and the like are output. Such repetition of the control routine is similarly performed in other operation modes.

Thus, in the heat pump cycle 2 in the cooling mode, a vapor compression refrigeration cycle is formed in which the air-conditioning outdoor heat exchanger 20 functions as a condenser and the indoor evaporator 23 functions as an evaporator. The cycle refrigerant can absorb heat from the vent air via evaporation in the indoor evaporator 23 and can release the absorbed heat to the outside air in the air-conditioning outdoor heat exchanger 20. Accordingly, the vent air can be cooled.

Therefore, in the cooling mode, the vent air can be cooled in the indoor evaporator 23 and blown into the vehicle compartment, and thereby the vehicle compartment can be cooled.

In the heat pump cycle 2 in the cooling mode, the refrigerant circuit is switched such that the cycle refrigerant does not flow into the recovery heat exchange portion 61a of the combined heat exchanger 61. Therefore, the combined heat exchanger 61 performs neither heat exchange between the cycle refrigerant and the heated air nor heat exchange between the cycle refrigerant and the exhaust-heat refrigerant. Therefore, the cooling mode can be executed without influences of the operation state of the circulation blower 55 and an open/close state of the exhaust-heat open-close valve 65.

(b) Dehumidifying Heating Mode

In the dehumidifying heating mode, the controller 90 controls the higher-stage expansion valve 13 to be in a throttle state and controls the cooling expansion valve 22 to be a throttled state. Further, the controller 90 closes the recovery open-close valve 16a, opens the lower-pressure open-close valve 16b, and closes the cooling open-close valve 16c.

Accordingly, in the heat pump cycle 2 in the dehumidifying heating mode, a cycle is formed in which the cycle refrigerant circulates in an order: the discharge port 11c of the compressor 11→the indoor condenser 12→the higher-stage expansion valve 13→the gas-liquid separator 14→the lower-pressure open-close valve 16b→the air-conditioning outdoor heat exchanger 20→the cooling expansion valve 22→the indoor evaporator 23→the accumulator 24→the suction port 11a of the compressor 11.

In the cycle configuration, the controller 90 determines control signals or the like output to the various controlling-object devices connected to the output side of the controller 90, and the controller 90 controls the operation of the various controlling-object devices.

For example, the controller 90 determines a control signal output to the compressor 11 so that the higher-pressure cycle refrigerant pressure Pd detected by the high pressure sensor 91d becomes equal to a target high-pressure PCO. The target high-pressure PCO is determined based on the target blowing temperature TAO with reference to a control map for the heating mode stored in advance in the controller 90.

More specifically, in the control map, the target high-pressure PCO increases with increase in the target blowing temperature TAO so that the vent air temperature TAV approaches the target blowing temperature TAO.

Similarly to the cooling mode, the controller 90 determines a control voltage output to the air-conditioning blower 32.

The controller 90 controls operations of the higher-stage expansion valve 13 and the cooling expansion valve 22 based on the target blowing temperature TAO and the like with reference to a control map for the dehumidifying heating mode stored in advance in the controller 90 such that a COP approaches a maximum value, similarly to the cooling mode. More specifically, the air conditioning controller reduces a degree of throttling of the higher-stage expansion valve 13 and increases a degree of throttling of the cooling expansion valve 22 as the target blowing temperature TAO increases.

The controller 90 determines a control signal output to the electric actuator for driving the air mixing door such that the cool air bypass passage 35 is closed and the vent-air passage of the indoor condenser 12 is fully open. The controller 90 also appropriately determines control signals output to other various controlling-object devices.

Thus, in the heat pump cycle 2 in the dehumidifying heating mode, a vapor compression refrigeration cycle is formed in which the indoor condenser 12 functions as a condenser and the indoor evaporator 23 functions as an evaporator.

Further, when a saturation temperature of the cycle refrigerant in the air-conditioning outdoor heat exchanger 20 is higher than the outside air temperature Tam, the air-conditioning outdoor heat exchanger 20 functions as a condenser. On the other hand, when the saturation temperature of the cycle refrigerant in the air-conditioning outdoor heat exchanger 20 is lower than the outside air temperature Tam, the air-conditioning outdoor heat exchanger 20 functions as an evaporator.

When the saturation temperature of the cycle refrigerant in the air-conditioning outdoor heat exchanger 20 is higher than the outside air temperature Tam, the saturation temperature of the cycle refrigerant in the air-conditioning outdoor heat exchanger 20 is decreased with increase in the target blowing temperature TAO. Accordingly, an amount of heat released from the cycle refrigerant in the air-conditioning outdoor heat exchanger 20 can be reduced, and an amount of heat released from the cycle refrigerant in the indoor condenser 12 can be increased. As a result, a capacity for heating the vent air can be improved.

When the saturation temperature of the cycle refrigerant in the air-conditioning outdoor heat exchanger 20 is lower than the outside air temperature Tam, the saturation temperature of the cycle refrigerant in the air-conditioning outdoor heat exchanger 20 is decreased with increase in the target blowing temperature TAO. Accordingly, an amount of heat absorbed to the cycle refrigerant in the air-conditioning outdoor heat exchanger 20 can be increased, and an amount of heat released from the cycle refrigerant in the indoor condenser 12 can be increased. As a result, the capacity for heating the vent air can be improved.

In the dehumidifying heating mode, the vent air is cooled and dehumidified in the indoor evaporator 23, reheated in the indoor condenser 12, and then blown into the vehicle compartment. Accordingly, dehumidification and heating in the vehicle compartment can be performed. Further, in the heat pump cycle 2 of the dehumidifying heating mode, the capacity of the indoor condenser 12 for heating the vent air can be adjusted by adjusting the degrees of throttling of the higher-stage expansion valve 13 and the cooling expansion valve 22.

In the heat pump cycle 2 in the dehumidifying heating mode, the refrigerant circuit is switched such that the cycle refrigerant does not flow into the recovery heat exchange portion 61a of the combined heat exchanger 61. Therefore, the combined heat exchanger 61 performs neither heat exchange between the cycle refrigerant and the heated air nor heat exchange between the cycle refrigerant and the exhaust-heat refrigerant. Therefore, the dehumidifying heating mode can be executed without influences of the operation state of the circulation blower 55 and an open/close state of the exhaust-heat open-close valve 65.

(c) First Heating Mode

In the first heating mode, the controller 90 controls the higher-stage expansion valve 13 to be in a throttle state and controls the cooling expansion valve 22 to be a fully open state. Further, the controller 90 closes the recovery open-close valve 16a, opens the lower-pressure open-close valve 16b, and opens the cooling open-close valve 16c.

Accordingly, in the heat pump cycle 2 in the first heating mode, a cycle is formed in which the cycle refrigerant circulates in an order: the discharge port 11c of the compressor 11→the indoor condenser 12→the higher-stage expansion valve 13→the gas-liquid separator 14→the lower-pressure open-close valve 16b→the air-conditioning outdoor heat exchanger 20→the cooling open-close valve 16c→the accumulator 24→the suction port 11a of the compressor 11.

In the cycle configuration, the controller 90 determines control signals or the like output to the various controlling-object devices connected to the output side of the controller 90, and the controller 90 controls the operation of the various controlling-object devices.

For example, the controller 90 determines a control signal output to the compressor 11 and a control voltage output to the air-conditioning blower 32, as in the dehumidifying heating mode. The controller 90 determines a control signal output to the higher-stage expansion valve 13 such that a degree of subcooling of the refrigerant flowing into the higher-stage expansion valve 13 approaches a target degree of subcooling. The target degree of subcooling is determined such that the COP of the cycle approaches a maximum value.

The controller 90 determines a control signal output to the electric actuator for driving the air mixing door, similarly to the dehumidifying heating mode, such that the cool air bypass passage 35 is closed and the vent-air passage of the indoor condenser 12 is fully open. The controller 90 also appropriately determines control signals output to other various controlling-object devices.

Thus, in the heat pump cycle 2 in the first heating mode, a vapor compression refrigeration cycle is formed in which the indoor condenser 12 functions as a condenser and the air-conditioning outdoor heat exchanger 20 functions as an evaporator. The cycle refrigerant can absorb heat from the outside air via evaporation in the air-conditioning outdoor heat exchanger 20 and can release the absorbed heat to the vent air in the indoor condenser 12. Accordingly, the vent air can be heated.

Therefore, in the first heating mode, the vent air can be heated in the indoor condenser 12 and blown into the vehicle compartment, and thereby the vehicle compartment can be heated.

In the heat pump cycle 2 in the first heating mode, the refrigerant circuit is switched such that the cycle refrigerant does not flow into the recovery heat exchange portion 61a of the combined heat exchanger 61. Therefore, the combined heat exchanger 61 performs neither heat exchange between the cycle refrigerant and the heated air nor heat exchange between the cycle refrigerant and the exhaust-heat refrigerant. Therefore, the first heating mode can be executed without influences of the operation state of the circulation blower 55 and an open/close state of the exhaust-heat open-close valve 65.

(d) Second Heating Mode

The second heating mode is an operation mode in which the vent air is heated by a higher heating capacity than the first heating mode. In the second heating mode, the controller 90 operates the circulation blower 55 disposed in the heated-air passage in the duct 5 at a predetermined standard blowing capacity.

In the second heating mode, the controller 90 controls the higher-stage expansion valve 13 to be in a throttle state and controls the cooling expansion valve 22 to be a fully open state. Further, the controller 90 opens the recovery open-close valve 16a, closes the lower-pressure open-close valve 16b, and opens the cooling open-close valve 16c.

Accordingly, in the heat pump cycle 2 in the second heating mode, a cycle is formed in which the cycle refrigerant circulates in an order: the discharge port 11c of the compressor 11→the indoor condenser 12→the higher-stage expansion valve 13→the gas-liquid separator 14→the intermediate-pressure fixed throttle 17b and the recovery expansion valve 60→the recovery open-close valve 16a→the recovery heat exchange portion 61a of the combined heat exchanger 61→the intermediate pressure port 11b of the compressor 11, and at the same time the cycle refrigerant circulates in an order: the gas-liquid separator 14→lower-stage fixed throttle 17a→the air-conditioning outdoor heat exchanger 20→the cooling open-close valve 16c→the accumulator 24→the suction port 11a of the compressor 11.

In the cycle configuration, the controller 90 determines control signals or the like output to the various controlling-object devices connected to the output side of the controller 90, and the controller 90 controls the operation of the various controlling-object devices.

For example, the controller 90 determines a control signal output to the compressor 11, a control voltage output to the air-conditioning blower 32, and a control signal output to the higher-stage expansion valve 13, as in the dehumidifying heating mode.

The controller 90 determines a control signal output to the electric actuator for driving the air mixing door, similarly to the first heating mode, such that the cool air bypass passage 35 is closed and the vent-air passage of the indoor condenser 12 is fully open. The controller 90 also appropriately determines control signals output to other various controlling-object devices.

In the second heating mode, since the recovery open-close valve 16a is open, the cycle refrigerant flows into the recovery heat exchange portion 61a of the combined heat exchanger 61. Further, the cycle refrigerant flowing out of the recovery heat exchange portion 61a flows out toward the intermediate pressure port 11b of the compressor 11. Therefore, in the heat pump cycle 2 in the second heating mode, a gas injection cycle is formed. The state of the refrigerant changes as shown in a schematic Mollier diagram of FIG. 14.

More specifically, the cycle refrigerant discharged from the compressor 11 (point a in FIG. 14) flows into the indoor condenser 12. In the second heating mode, since the air mixing door 34 fully opens the vent-air passage of the indoor condenser 12, the cycle refrigerant flowing in the indoor condenser 12 exchanges heat with the vent air blown sent from the air-conditioning blower 32 and then releases heat and condenses (point a→point b in FIG. 14). Accordingly, the vent air is heated.

The condensation temperature of the cycle refrigerant in the indoor condenser 12 may rise to about 80 degrees Celsius. Further, a heating capacity Qh for heating the vent air in the second operation mode can be defined as an enthalpy difference obtained by subtracting an enthalpy of the refrigerant at point b from an enthalpy of the refrigerant at point a in FIG. 14.

Figure 14:
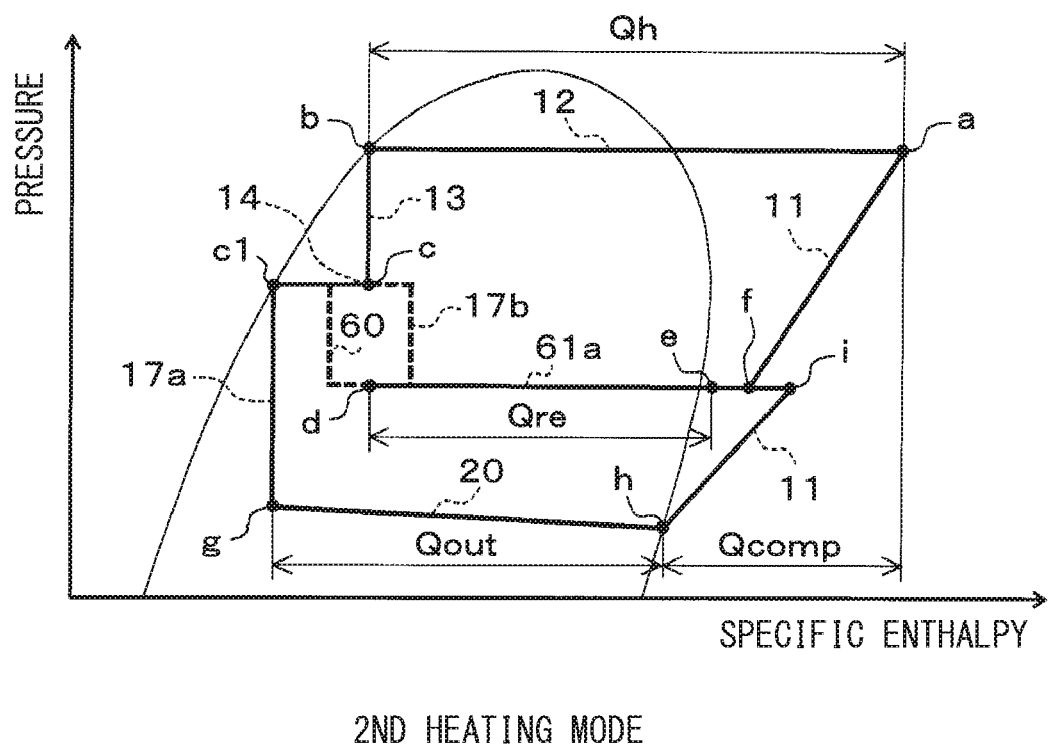
FIG. 14 is a schematic Mollier diagram illustrating a change in state of refrigerant in the heat pump cycle in a second heating mode, according to at least one embodiment.

The cycle refrigerant condensed in the indoor condenser 12 flows into the higher-stage expansion valve 13, and is decompressed to be an intermediate pressure refrigerant (point b→point c in FIG. 14).

The cycle refrigerant flowing out of the higher-stage expansion valve 13 flows into the gas-liquid separator 14 and is separated into liquid and gas. The cycle refrigerant in liquid phase flowing out of the first liquid-phase outflow port 14c of the gas-liquid separator 14 is decompressed by the recovery expansion valve 60. The degree of throttling of the recovery expansion valve 60 is adjusted such that a degree of superheat of the cycle refrigerant on an outlet side of the recovery heat exchange portion 61a approaches a reference degree of superheat (point e in FIG. 14).

The cycle refrigerant in gas phase flowing out of the gas-phase outflow port 14b of the gas-liquid separator 14 is decompressed by the intermediate-pressure fixed throttle 17b. As a result, the cycle refrigerant flowing out of the gas-phase outflow port 14b has the same pressure as the refrigerant flowing out of the recovery expansion valve 60.

The cycle refrigerant flowing out of the recovery expansion valve 60 and the cycle refrigerant flowing out of the intermediate-pressure fixed throttle 17b join at the junction 15c to become a gas-liquid two-phase state having a relatively low vapor quality (point din FIG. 14).

The dashed lines in FIG. 14 schematically shows decompression of the cycle refrigerant in liquid phase flowing out of the first liquid-phase outflow port 14c of the gas-liquid separator 14 and decompression of the cycle refrigerant in gas phase flowing out of the gas-phase outflow port 14b. Therefore, the actual refrigerant is not decompressed along the dashed lines.

The cycle refrigerant flowing out of the junction 15c flows into the recovery heat exchange portion 61a. A pressure of the cycle refrigerant flowing through the recovery heat exchange portion 61a has been reduced by a pressure reducing action of the intermediate-pressure fixed throttle 17b and the recovery expansion valve 60 to be lower than the saturation pressure of the cycle refrigerant that corresponds to a temperature of the heated air. That is, the intermediate-pressure fixed throttle 17b and the recovery expansion valve 60 of the present embodiment constitute a recovery pressure reducer.

Therefore, the cycle refrigerant flowing in the recovery heat exchange portion 61a absorbs heat from the heated air sent from the circulation blower 55 and evaporates to become a gaseous refrigerant having a degree of superheat. (point d→point e in FIG. 14)

The evaporation temperature of the cycle refrigerant in the recovery heat exchange portion 61a is about 20 to 30 degrees Celsius. An exhaust-heat recovery heat quantity Qre that the cycle refrigerant has absorbed from the heated air in the recovery heat exchange portion 61a can be defined as an enthalpy difference obtained by subtracting an enthalpy of the refrigerant at point d from an enthalpy of the refrigerant at point e in FIG. 14.

The cycle refrigerant flowing out of the recovery heat exchange portion 61a is sucked into the intermediate pressure port 11b of the compressor 11. The cycle refrigerant sucked from the intermediate pressure port 11b of the compressor 11 merges with an intermediate pressure refrigerant discharged from the lower-stage compression mechanism of the compressor 11 (point f in FIG. 14), and then compressed in the higher-stage compression mechanism (point f→point a in FIG. 14).

On the other hand, the cycle refrigerant in liquid phase flowing out of the second liquid-phase outflow port 14d of the gas-liquid separator 14 (point c1 in FIG. 14) is decompressed by the lower-stage fixed throttle 17a to become a low-pressure refrigerant (point c1→point g in FIG. 14).

The cycle refrigerant flowing out of the lower-stage fixed throttle 17a flows into the air-conditioning outdoor heat exchanger 20. The cycle refrigerant flowing into the air-conditioning outdoor heat exchanger 20 absorbs heat from the outside air and evaporates (point g→point h in FIG. 14).

The evaporation temperature of the cycle refrigerant in the air-conditioning outdoor heat exchanger 20 is falls to 2 degrees Celsius or less. An outside-air absorbed heat quantity Qout that the cycle refrigerant has absorbed from the outside air in the air-conditioning outdoor heat exchanger 20 can be defined as an enthalpy difference obtained by subtracting an enthalpy of the refrigerant at point g from an enthalpy of the refrigerant at point h in FIG. 14.

The cycle refrigerant flowing out of the air-conditioning outdoor heat exchanger 20 enters the accumulator 24 to separate it into gas and liquid. The cycle refrigerant in gas phase separated by the accumulator 24 is drawn into the suction port 11a of the compressor 11. The refrigerant sucked from the suction port 11a of the compressor 11 is compressed by the lower-stage compression mechanism (point h→point i in FIG. 14), and then merges with the refrigerant flowing in from the intermediate pressure port 11b (point fin FIG. 14).

Therefore, in the second heating mode, the vent air can be heated in the indoor condenser 12 and blown into the vehicle compartment, and thereby the vehicle compartment can be heated.

Further, in the second heating mode, since a gas injection cycle is formed, the COP of the cycle can be improved. In addition, in the second heating mode, the vent air can be heated by heat sources: not only the heat that the cycle refrigerant has absorbed from the outside air in the air-conditioning outdoor heat exchanger 20 but also the heat that the cycle refrigerant has absorbed from the heated air in the recovery heat exchange portion 61a. Therefore, the capacity for heating the vent air can be improved more than the first heating mode.

Next, controls for releasing exhaust heats of the in-vehicle devices 50 to 53 to the outside air, which are performed at step S9 in FIG. 13, will be described in detail.

The controller 90 controls opening and closing of the exhaust-heat open-close valve 65 and an operation of the circulation blower 55 in the exhaust-heat refrigerant circuit 3 based on the detection signals of the control sensor group.

More specifically, the controller 90 opens the exhaust-heat open-close valve 65 and operates the circulation blower 55 at the predetermined standard blowing capacity when at least one of the first to fourth in-vehicle device temperatures Tve1 to Tve4 detected by the first to fourth in-vehicle device temperature sensors $91h$ to $91k$ is higher than a reference upper limit temperature set within a usable temperature range of a corresponding in-vehicle device 50 to 53.

Further, the controller 90 closes the exhaust-heat open-close valve 65 when at least one of the first to fourth in-vehicle device temperatures Tve1 to Tve4 is lower than a reference lower limit temperature set within a usable temperature range of a corresponding in-vehicle device 50 to 53. The circulation blower 55 may be continuously operated from activation of the entire system of the vehicle. Therefore, it is unnecessary to stop the circulation blower 55 when the exhaust-heat open-close valve 65 is closed.

Then, when the controller 90 opens the exhaust-heat open-close valve 65 and activates the circulation blower 55, air in the internal space of the heat insulating housing 4 is sucked into the heated-air passage of the duct 5 through the multiple suction ports 56a to 56d of the duct 5. At this time, the air sucked from each of the suction ports 56a to 56d becomes the heated air by absorbing heat from each of the in-vehicle devices 50 to 53. Accordingly, each of the in-vehicle devices 50 to 53 is cooled.

The heated air flows through the heated-air passage of the duct 5 and is guided to the air passages formed between the cycle refrigerant tubes 72 and the exhaust-heat refrigerant tubes 75 of the combined heat exchanger 61. When the heated air flows through the air passages of the combined heat exchanger 61, the heated air exchanges heat with the exhaust-heat refrigerant in the exhaust-heat exchange portion 61c of the combined heat exchanger 61. Hence, the exhaust-heat refrigerant absorbs heat from the heated air and evaporates, and thereby the heated air is cooled.

In the second heating mode described above, when the heated air flows through the air passages of the combined heat exchanger 61, the heated air exchanges heat also with the cycle refrigerant in the recovery heat exchange portion 61a of the combined heat exchanger 61. Therefore, in the second heating mode, the cycle refrigerant absorbs heat from the heated air, and thereby the heated air is effectively cooled.

The cooled heated air is discharged from the air passages of the combined heat exchanger 61 into the internal space of the heat insulating housing 4. The air discharged into the internal space circulates within the internal space and then is sucked again into each of the suction ports 56a to 56d.

On the other hand, the exhaust-heat refrigerant vaporized and reduced in density in the exhaust-heat exchange portion 61c flows into the waste-heat outdoor heat exchanger 63 through the gas-phase refrigerant pipe 62 because the exhaust-heat open-close valve 65 is open. The refrigerant in gas phase flowing in the waste-heat outdoor heat exchanger 63 exchanges heat with the outside air and condenses. The exhaust-heat refrigerant, which has been condensed and increased in density, flows through the liquid-phase refrigerant pipe 64 disposed below the gas-phase refrigerant pipe 62, and then flows into the exhaust-heat exchange portion 61c again.

Therefore, when the controller 90 opens the exhaust-heat open-close valve 65 and operates the circulation blower 55, gravity circulation of the exhaust-heat refrigerant can be achieved in the exhaust-heat refrigerant circuit 3. Thus, thermosiphon can be formed, in which heat on a high-temperature side can be efficiently transferred to a low-temperature side by utilizing phase change of the exhaust-heat refrigerant. As a result, the exhaust heats of the in-vehicle devices 50 to 53 can be released to the outside air.

Further, since the controller 90 intermittently operates the thermosiphon by intermittently operating the exhaust-heat open-close valve 65, the temperatures of the in-vehicle devices 50 to 53 can be maintained within the respective usable temperature ranges.

Since the vehicular heat management system 1 of the present embodiment operates as described above, it is possible to obtain the following excellent effects.

That is, according to the vehicular heat management system 1 of the present embodiment, since the heat pump cycle 2 includes the recovery heat exchange portion 61a, the exhaust heats of the in-vehicle devices 50 to 53 can be used as heat sources, in the second heating mode, for heating the vent air that is a heat-exchanging-object fluid. Therefore, high heating capacity (that is, high air-heating performance) can be obtained in the second heating mode.

More specifically, in a general heat pump cycle that does not have the recovery heat exchange portion 61a, only the heat absorbed from the outside air (corresponding to Qout in FIG. 14) and the heat generated by compression of the compressor 11 (corresponding to Qcomp in FIG. 14) can be used as heat sources for heating the vent air. This is the same even in a cycle forming a gas injection cycle.

On the other hand, in the heat pump cycle 2 of the present embodiment, the heat absorbed from the heated air in the recovery heat exchange portion 61a (Qre in FIG. 14) can be used as the heat sources for heating the vent air in addition to the heat absorbed from the outside air in the air-conditioning outdoor heat exchanger 20 (Qout in FIG. 14) and the heat generated by compression of the compressor 11 (Qcomp in FIG. 14)

In this case, the heat absorbed by the cycle refrigerant from the outside air (Qout in FIG. 14) and the heat absorbed from the heated air (Qre in FIG. 14) can be used as independent heat sources that do not cancel each other.

That is, a heating capacity Qh (i.e., air-heating capacity) for heating the vent air in the second heating mode of the heat pump cycle 2 of the present embodiment can be represented by the following equation F2.

$$Qh = Q\text{out} + Q\text{re} + Q\text{comp} \tag{F2}$$

Therefore, according to the vehicular heat management system 1 of the present embodiment, the exhaust heats of the in-vehicle devices 50 to 53 can be effectively used as heat sources, in the second heating mode, for heating the vent air that is heat-exchanging-object fluid. As a result, a high heating capacity can be obtained.

Therefore, according to the study by the present inventors, the vehicular heat management system 1 of the present embodiment is confirmed to be capable of achieving sufficient heating of the vehicle compartment even under extremely-low outside-air temperature in winter season (for example, under an operating condition in which the outside air temperature is about −15 degrees Celsius).

Further, according to the vehicular heat management system 1 of the present embodiment, since the exhaust-heat refrigerant circuit 3 includes the exhaust-heat exchange portion 61c, the exhaust heats of the in-vehicle devices 50 to 53 can be released to the outside air in a case where the exhaust heats does not need to be used as the heat sources for heating the vent air.

Further, the recovery heat exchange portion 61a and the exhaust-heat exchange portion 61c are integrally formed as the combined heat exchanger 61 capable of transferring heat between the cycle refrigerant and the exhaust-heat refrigerant. Therefore, when heating the vent air, the exhaust heat stored in the exhaust-heat refrigerant can also be used as a heat source without loss of heat.

According to the vehicular heat management system 1 of the present embodiment, the exhaust heats of the in-vehicle devices 50 to 53 can be effectively used for heating the vent air. Thus, electric energy consumed for the air conditioning of the vehicle compartment can be reduced. Therefore, application of the vehicular heat management system 1 of the present embodiment to an electric vehicle can extend its range per charge.

Furthermore, the combined heat exchanger 61 of the present embodiment includes heat-exchange fins 61b joined to both the cycle refrigerant tubes 72 of the recovery heat exchange portion 61a and the exhaust-heat refrigerant tubes 75 of the exhaust-heat exchange portion 61c. Therefore, heat transfer between the cycle refrigerant and the exhaust-heat refrigerant can be realized by a simple configuration.

Further, in the vehicular heat management system 1 of the present embodiment, the in-vehicle devices 50 to 53, the combined heat exchanger 61, and other components are arranged in the internal space of the heat insulating housing 4 having a heat insulating structure.

Therefore, the exhaust heats of the in-vehicle devices 50 to 53 available for heating the vent air can be prevented from being released to an outside of the heat insulating housing 4. Therefore, the exhaust heats of the in-vehicle devices 50 to 53 can be efficiently recovered for heating the vent air in the recovery heat exchange portion 61a. On the other hand, since unnecessary exhaust heat is released to the outside of the heat insulating housing 4, the released exhaust heat can prevented from entering again the internal space of the heat insulating housing 4.

Further, the evaporation temperature of the cycle refrigerant in the recovery heat exchange portion 61a during the second heating mode is about 20 to 30 degrees Celsius. Thus, the temperature of the heated air cooled in the recovery heat exchange portion 61a is also almost the same as that of the cycle refrigerant. Therefore, the air cooled in the recovery heat exchange portion 61a is circulated in the heat insulating housing 4 and used for cooling the in-vehicle devices 50 to 53. Hence, the in-vehicle devices 50 to 53 can be cooled mildly.

More specifically, the air of about 20 to 30 degrees Celsius cooled in the recovery heat exchange portion 61a is used for cooling the in-vehicle devices 50 to 53. Thus, the temperatures of the in-vehicle devices 50 to 53 can be prevented from falling below their usable temperature ranges. Therefore, a sudden temperature change (so-called heat shock) and dew condensation in the in-vehicle devices 50 to 53 can be prevented, and thereby a longer life, higher performance, and higher output of the in-vehicle devices 50 to 53 can be achieved.

Since the in-vehicle devices 50 to 53, the combined heat exchanger 61, and other components are arranged in the internal space of the heat insulating housing 4 having hermeticity, the in-vehicle devices 50 to 53, the combined heat exchanger 61 and the other components can be prevented from being exposed to water. Further, the in-vehicle devices that generates noise and vibration are disposed in the internal space of the heat insulating housing 4, their noise and vibration can be prevented from transmitting to an occupant in the vehicle compartment.

The vehicular heat management system 1 of the present embodiment includes the duct 5 that is arranged in the internal space of the heat insulating housing 4 and forms the heated-air passage through which heated air flows. The in-vehicle devices 50 to 53 are arranged in the heated-air passage. The heated air heated by the in-vehicle devices 50 to 53 can be collected and guided to the air passages of the combined heat exchanger 61. Thus, the exhaust heats of the in-vehicle devices 50 to 53 can be further efficiently recovered.

The duct 5 has the multiple suction ports 56a to 56d for sucking airs heated by the exhaust heats of the in-vehicle devices 50 to 53, respectively. The opening areas or ventilation resistances of the suction ports 56a to 56d may be differentiated according to heat quantities generated by the respective in-vehicle device 50 to 53. Hence, the temperatures of the in-vehicle devices 50 to 53 can be easily adjusted within their usable temperature ranges.

In the vehicular heat management system 1 of the present embodiment, the air-conditioning outdoor heat exchanger 20 and the waste-heat outdoor heat exchanger 63 are arranged inside the driving device compartment 81 and outside the heat insulating housing 4. Thus, in the heat pump cycle 2, the cycle refrigerant can reliably exchange heat with the outside air in the air-conditioning outdoor heat exchanger 20. In the exhaust-heat refrigerant circuit 3, the exhaust-heat refrigerant can surely exchange heat with the outside air in the waste-heat outdoor heat exchanger 63.

The air-conditioning outdoor heat exchanger 20 and the waste-heat outdoor heat exchanger 63 are arranged in the driving device compartment 81. Thus, the air-conditioning outdoor heat exchanger 20 and the waste-heat outdoor heat exchanger 63 can be disposed at positions relatively close to the in-vehicle devices 50 to 53. Therefore, increase in size of the vehicular heat management system 1 as a whole can be reduced.

In the vehicular heat management system 1 of the present embodiment, the air-conditioning outdoor heat exchanger 20 and the waste-heat outdoor heat exchanger 63 are arranged in parallel with respect to the flow direction of the outside air. Thus, a heat release amount from the cycle refrigerant in the air-conditioning outdoor heat exchanger 20 and a heat release amount from the exhaust-heat refrigerant in the waste-heat outdoor heat exchanger 63 can be individually and appropriately adjusted by adjusting a heat exchange area of each of these heat exchangers, Further, in the heat pump cycle 2 of the present embodiment, the cycle refrigerant flowing into the recovery heat exchange portion 61a is in liquid phase or gas-liquid two-phase state by pressure reducing actions of the intermediate-pressure fixed throttle 17b and the recovery expansion valve 60. The pressure of the cycle refrigerant flowing through the recovery heat exchange portion 61a is lower than the saturation pressure of the cycle refrigerant that corresponds to a temperature of the heated air.

Accordingly, it is possible to reliably evaporate the cycle refrigerant in the recovery heat exchange portion 61a. Therefore, the cycle refrigerant can efficiently absorb heat of the heated air by evaporative latent heat of the cycle refrigerant.

Further, the cycle refrigerant flowing into the intermediate pressure port 11b of the compressor 11 becomes gas phase having a relatively low degree of superheat by the pressure reducing action of the recovery expansion valve 60. Accordingly, decrease in density of the cycle refrigerant flowing into the intermediate pressure port 11b can be reduced, and thus an effect of improving the compression efficiency of the compressor 11 due to the gas injection cycle can be sufficiently obtained.

The heat pump cycle 2 of the present embodiment includes the recovery open-close valve 16a as a refrigerant circuit switch, and thus can switch between the refrigerant circuit of the first heating mode and the refrigerant circuit of the second heating mode as necessary. Therefore, in the vehicular heat management system 1 of the present embodiment, the exhaust heats of the in-vehicle devices 50 to 53 can be used for heating the vent air as necessary.

The recovery open-close valve 16a is disposed in the refrigerant passage through which the cycle refrigerant in liquid phase or gas-liquid two-phase flows. Thus, it is unnecessary to employ an open-close valve having a large passage cross sectional area for reducing pressure loss, such as an open-close valve disposed in a refrigerant passage through which a gas-phase fluid flows. Therefore, the size of the recovery open-close valve 16a can be reduced, and the overall size of the vehicular heat management system 1 can be reduced.

Further, the exhaust-heat refrigerant circuit 3 of the present embodiment forms the thermosiphon. Therefore, efficient heat transfer can be performed by using the evaporative latent heat of the exhaust-heat refrigerant. Further, in the exhaust-heat refrigerant circuit 3, the refrigerant can be circulated without requiring a water pump, unlike a heat medium circuit that circulates cooling water or the like. Therefore, the size of the exhaust-heat refrigerant circuit 3 can be reduced, and the overall size of the vehicular heat management system 1 can be reduced.

In addition, the exhaust-heat refrigerant circuit 3 of the present embodiment has the exhaust-heat open-close valve 65 as a refrigerant circulation shutter. Thus, the liquid-phase refrigerant pipe 64 can be opened and closed as necessary. Therefore, in the vehicular heat management system 1 of the present embodiment, the exhaust heats of the in-vehicle devices 50 to 53 can be released to the outside air as necessary.

The exhaust-heat open-close valve 65 is disposed in the liquid-phase refrigerant pipe 64 through which the exhaust-heat refrigerant in liquid phase flows. Thus, it is unnecessary to employ an open-close valve having a large passage cross sectional area for reducing pressure loss, such as an open-close valve disposed in a refrigerant passage through which an exhaust-heat refrigerant in gas phase flows. Therefore, the size of the exhaust-heat open-close valve 65 can be reduced, and the overall size of the vehicular heat management system 1 can be reduced.

In the recovery heat exchange portion 61a of the combined heat exchanger 61 of the present embodiment, the cycle refrigerant flows from the lower side to the upper side in the downstream passage portions 72d of the cycle refrigerant tubes 72. In addition, the downstream passage portion 72d is disposed windward of the upstream passage portion 72c in flow of the heated air.

Therefore, in the downstream passage portion 72d, the cycle refrigerant can be efficiently evaporated by performing heat exchange with the upstream heated air having a relatively high temperature. Then, the cycle refrigerant which has evaporated and decreased in density flows from the lower side to the upper side. Thus, retention of the cycle refrigerant in the cycle refrigerant tubes 72 can be reduced.

Further, in the cycle refrigerant tubes 72, the refrigerant passages are formed in two rows, and the flow direction of the cycle refrigerant is U-turned. The passage cross-sectional area of the cycle refrigerant tubes 72 can be reduced as compared with a case where the refrigerant passages is formed in one row. Thus, a flow rate of the cycle refrigerant and a heat exchange capacity can be increased, and retention of the refrigeration oil in the recovery heat exchange portion 61a can be reduced.

In the exhaust-heat exchange portion 61c of the combined heat exchanger 61 of the present embodiment, the exhaust-heat refrigerant flows from the lower side to the upper side in the exhaust-heat refrigerant tubes 75 without turning the flow direction of the exhaust-heat refrigerant.

Hence, reduction in cross-sectional passage area of the exhaust-heat refrigerant tubes 75 can be reduced, and a pressure loss generated in the exhaust-heat refrigerant flowing through the exhaust-heat refrigerant tubes 75 can be reduced. Therefore, even in the thermosiphon in which the exhaust-heat refrigerant naturally circulates, the exhaust-heat refrigerant can be sufficiently circulated without reduction in circulation flow rate of the exhaust-heat refrigerant.

Second Embodiment

Figure 15:
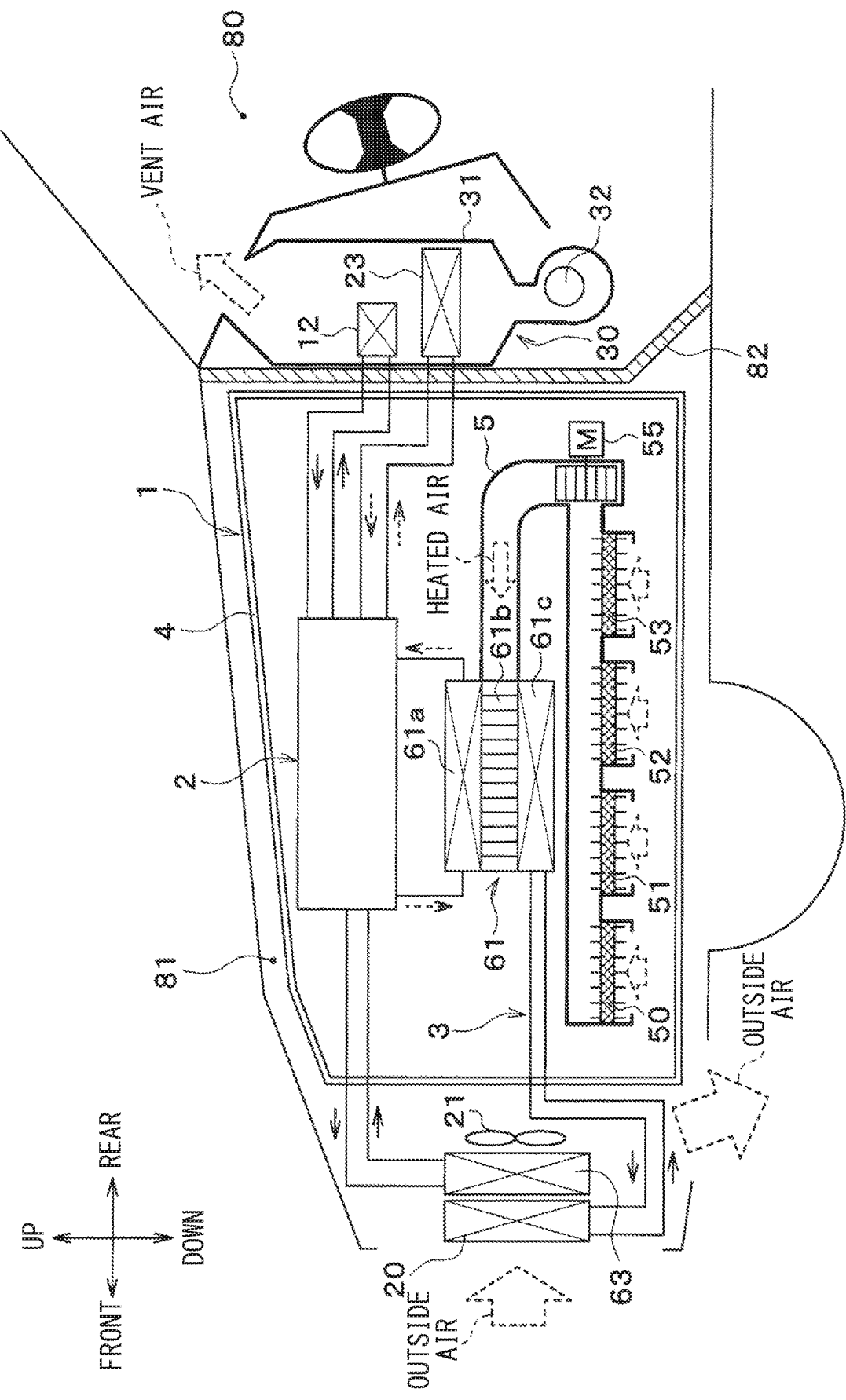
FIG. 15 is an explanatory diagram illustrating an arrangement of a vehicular heat management system according to at least one embodiment.

In a present embodiment, an example will be described in which the configuration of the vehicular heat management system 1 mounted on an electric vehicle is changed from the first embodiment, as shown in FIG. 15. FIG. 15 is a drawing corresponding to FIG. 11 described in the first embodiment. In FIG. 15, the same or equivalent parts as those of the first embodiment are denoted by the same reference numerals. This also applies to the following drawings.

More specifically, in the present embodiment, the outside-air fan 67 is omitted, the air-conditioning outdoor heat exchanger 20 and the waste-heat outdoor heat exchanger 63 are arranged in series with respect to the flow direction of the outside air. Then, the outside air flows in an order: the waste-heat outdoor heat exchanger 63→the air-conditioning outdoor heat exchanger 20.

The other configurations and operations of the vehicular heat management system 1 are the same as those of the first embodiment. Even when the vehicular heat management system 1 is arranged as in the present embodiment, the same effects as those of the first embodiment can be obtained.

Furthermore, in the present embodiment, since the outside-air fan 67 is eliminated, the space in the driving device compartment 81 can be effectively utilized.

Further, in the present embodiment, it is described as an example that the waste-heat outdoor heat exchanger 63 is arranged upstream of the air-conditioning outdoor heat exchanger 20 in flow of the outside air. However, the air-conditioning outdoor heat exchanger 20 may be arranged upstream of the waste-heat outdoor heat exchanger 63 in flow of the outside air. An outdoor heat exchanger in which a lower one of the cycle refrigerant and the exhaust-heat refrigerant in temperature range flows may be arranged upstream of another outdoor heat exchanger in flow of the outside air.

Third Embodiment

Figure 16:
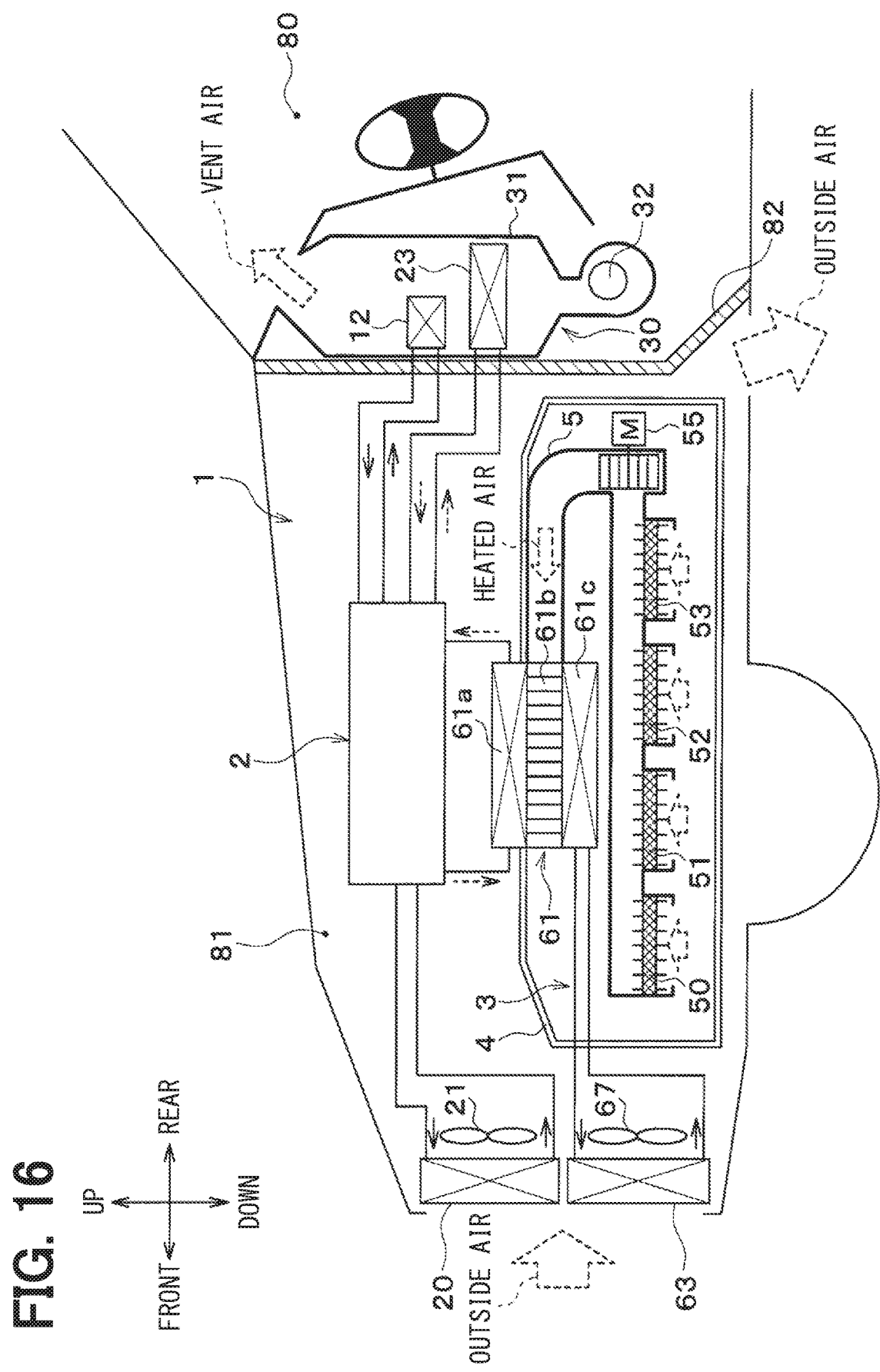
FIG. 16 is an explanatory diagram illustrating an arrangement of a vehicular heat management system according to at least one embodiment.

In a present embodiment, an example will be described in which the configuration of the vehicular heat management system 1 mounted on an electric vehicle is changed from the first embodiment, as shown in FIG. 16.

More specifically, in the present embodiment, the internal space of the heat insulating housing 4 houses the exhaust-heat exchange portion 61c and at least the air passages of the heat pump cycle 2 where the heat-exchange fins 61b of the combined heat exchanger 61 are arranged. Further, other components of the heat pump cycle 2 are arranged outside the heat insulating housing 4.

The other configurations and operations of the vehicular heat management system 1 are the same as those of the first embodiment. Even when the vehicular heat management system 1 is arranged as in the present embodiment, the same effects as those of the first embodiment can be obtained.

Furthermore, in the present embodiment, since the number of components of the heat pump cycle 2 housed in the internal space of the heat insulating housing 4 is reduced, the heat insulating housing 4 can be reduced in volume. That is, the heat insulating housing 4 can be reduced in size. Therefore, the space inside the driving device compartment 81 can be effectively utilized. For example, each vehicle component can be arranged in the driving device compartment 81 such that the outside air flowing from the front side of the vehicle can flow through the driving device compartment 81.

In the present embodiment, an example in which a part of the combined heat exchanger 61 is housed in the internal space of the heat insulating housing 4 is described. However, of course, an entire part of the combined heat exchanger 61 may be housed in the internal space of the heat insulating housing 4. Further, other components of the heat pump cycle 2 may be housed in the internal space of the heat insulating housing 4 as long as the heat insulating housing 4 is not enlarged.

Fourth Embodiment

Figure 17:
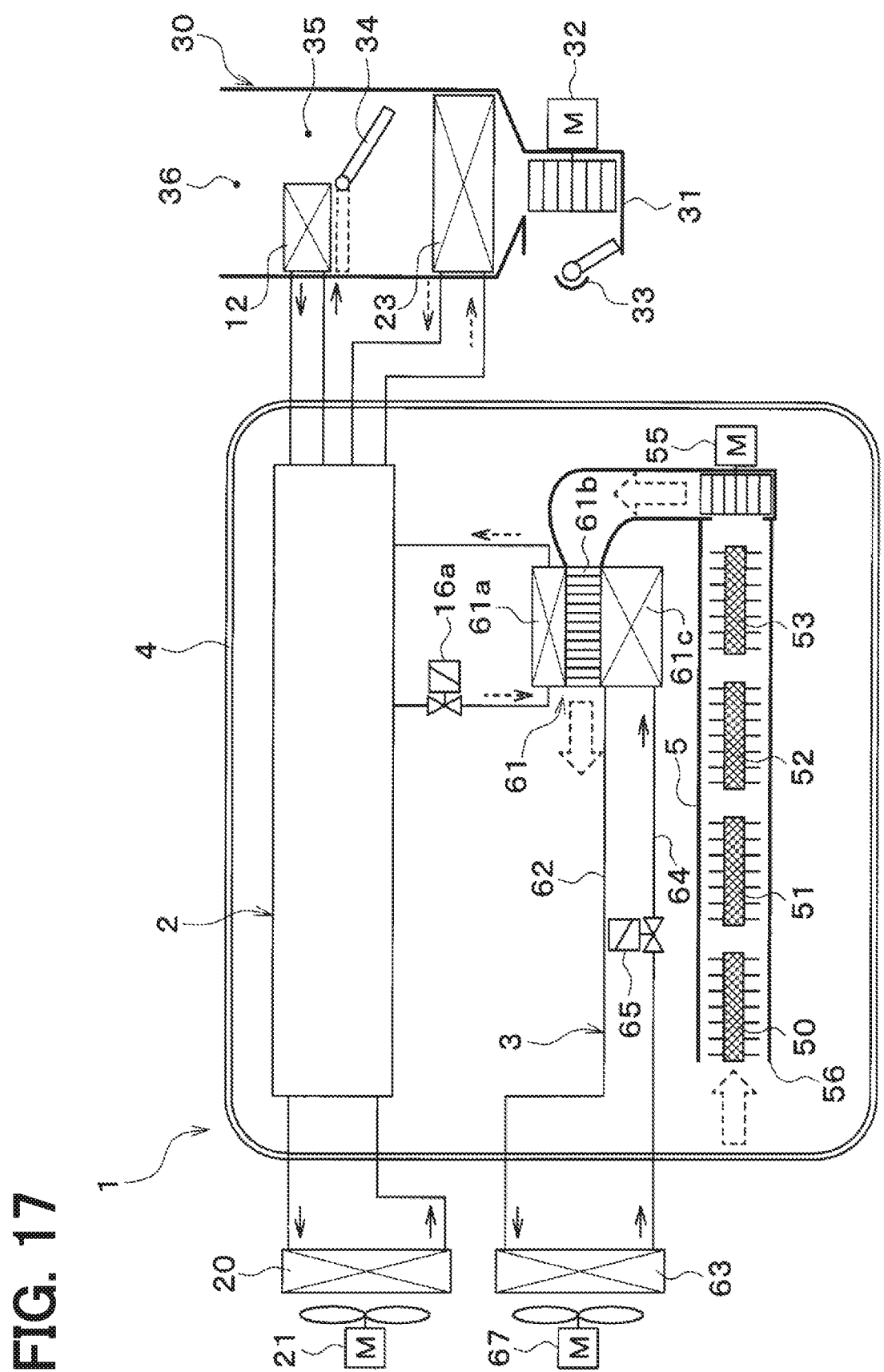
FIG. 17 is a diagram illustrating an entire configuration of a vehicular heat management system according to at least one embodiment.

In the present embodiment, an example will be described, in which, as shown in FIG. 17, the configuration of the duct 5 and the arrangement of the in-vehicle devices 50 to 53 disposed in the heated-air passage of the duct 5 are different from those of the first embodiment. FIG. 17 is a drawing corresponding to FIG. 1 described in the first embodiment.

More specifically, the duct 5 of the present embodiment has one suction port 56 for sucking airs to be heated by the in-vehicle devices 50 to 53. Further, the in-vehicle devices 50 to 53 are arranged such that a distance from the suction port 56 to each of the in-vehicle devices 50 to 53 in ascending order of the highest temperature of the usable temperature range.

In the present embodiment, the in-vehicle devices are arranged near the suction port 56 in an order: a battery 50→a charging generator 51→a power control unit 52→a vehicle-running electric motor 53. Therefore, air sucked from the suction port 56 absorbs exhaust heat in the order: the battery 50→the charging generator 51→the power control unit 52→the vehicle-running electric motor 53.

The other configurations and operations of the vehicular heat management system 1 are the same as those of the first embodiment. Even when the vehicular heat management system 1 employs the duct 5 of the present embodiment, the same effects as those of the first embodiment can be obtained.

Furthermore, even if the duct 5 having only one suction port 56 is employed as in the present embodiment, the in-vehicle devices can be cooled sequentially by low temperature air in ascending order of the highest temperature of their usable temperature range. Therefore, the temperatures of the in-vehicle devices 50 to 53 can be maintained within their respective usable temperature ranges.

Fifth Embodiment

Figure 18:
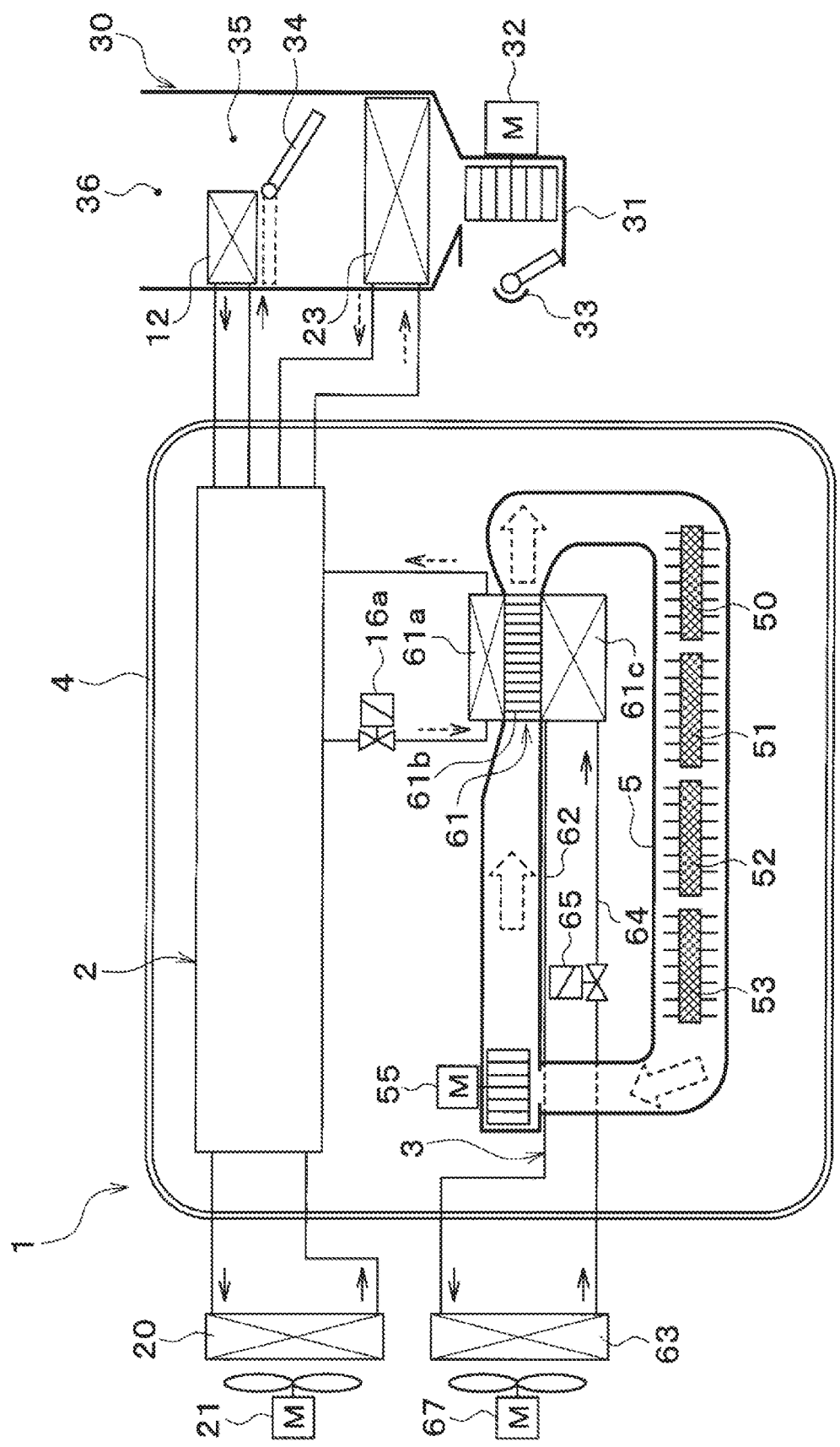
FIG. 18 is a diagram illustrating an entire configuration of a vehicular heat management system according to at least one embodiment.

In the present embodiment, as shown in FIG. 18, an example in which the configuration of the duct 5 is changed from that of the fourth embodiment will be described.

Specifically, the heated-air passage of the duct 5 of the present embodiment is a circulation passage. More specifically, in the heated-air passage of the present embodiment, the air passages of the combined heat exchanger 61 is connected to a downstream side of the circulation blower 55 in air flow. Similarly to the fourth embodiment, the in-vehicle devices 50 to 53 are positioned downstream of the air passages of the combined heat exchanger 61 in air flow and arranged sequentially in ascending order of the highest temperature of the usable temperature range.

The downstream side of the in-vehicle devices 50 to 53 in the heated-air passage is directly connected to the suction side of the circulation blower 55. Therefore, the air circulating in the heated-air passage of the duct 5 does not leak into the internal space of the heat insulating housing 4. Further, air in the internal space of the heat insulating housing 4 does not flow into the heated-air passage of the duct 5.

The other configurations and operations of the vehicular heat management system 1 are the same as those of the fourth embodiment. Even when the vehicular heat management system 1 employs the duct 5 of the present embodiment, the same effects as those of the first embodiment can be obtained.

Furthermore, even if the duct 5 having such circulation heated-air passage is employed as in the present embodiment, the in-vehicle devices can be cooled sequentially by low temperature air cooled by the combined heat exchanger 61 in ascending order of the highest temperature of their usable temperature range, similarly to the fourth embodiment. Therefore, the temperatures of the in-vehicle devices 50 to 53 can be maintained within their respective usable temperature ranges.

In the present embodiment, a duct having a heat insulating structure may be used as the duct 5. Accordingly, release of the exhaust heats of the in-vehicle devices 50 to 53 to the outside air can be reduced more effectively. Then, the exhaust heats of the in-vehicle devices 50 to 53 can be used for heating the vent air.

Sixth Embodiment

Figure 19:
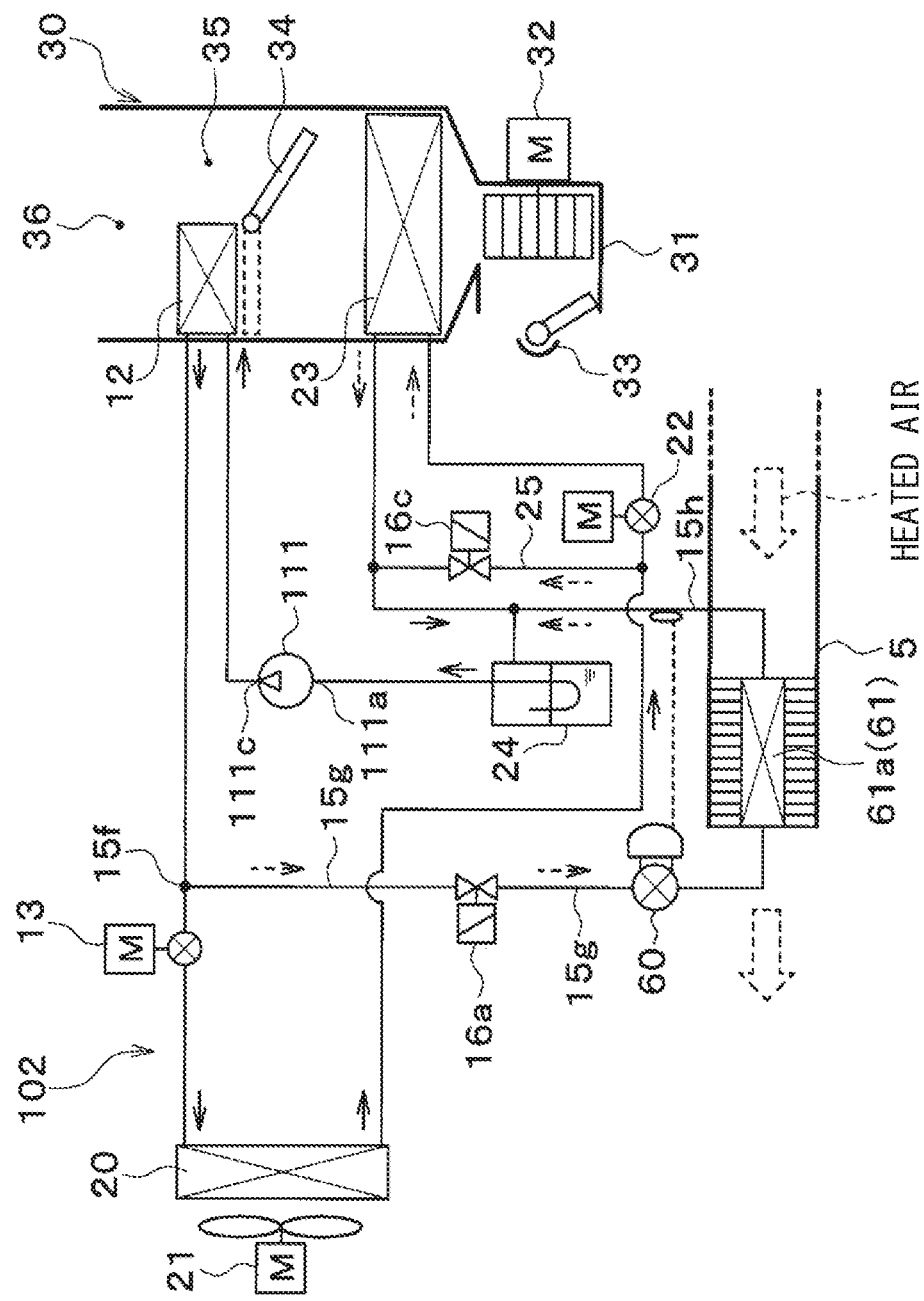
FIG. 19 is a diagram illustrating an entire configuration of a heat pump cycle according to at least one embodiment.

In the present embodiment, an example in which a heat pump cycle 102 shown in FIG. 19 is alternatively used in the first embodiment will be described. The heat pump cycle 102 can switch a refrigerant circuit in accordance with air-conditioning operation mode, similarly to the heat pump cycle 2 described in the first embodiment.

In the heat pump cycle 102, a gas injection cycle is not formed. A single-stage electric compressor is used as a compressor 111 that compresses and discharges cycle refrigerant in the heat pump cycle 102. The operation of the compressor 111 is controlled by a control signal output from a controller 90.

A discharge port 111c of the compressor 111 is connected to a refrigerant inlet side of an indoor condenser 12. A refrigerant outlet side of the indoor condenser 12 is connected to a bifurcation 15f. The bifurcation 15f branches a flow of the refrigerant flowing out of the indoor condenser 12. The bifurcation 15f has the same three-way joint structure as the junction 15c described in the first embodiment. In the bifurcation 15f, one of the three inflow/outflow ports is used as a refrigerant inflow port, and the other two is used as a refrigerant outflow port.

One of the refrigerant outflow ports of the bifurcation 15f is connected to a refrigerant inlet side of an air-conditioning outdoor heat exchanger 20 through a higher-stage expansion valve 13. A refrigerant outlet side of the air-conditioning outdoor heat exchanger 20 is connected to a refrigerant inlet side of the indoor evaporator 23 through the cooling expansion valve 22. A refrigerant outlet side of the indoor evaporator 23 is connected to an inlet side of an accumulator 24. A gas-phase refrigerant outlet of the accumulator 24 is connected to a suction port 111a of the compressor 11.

The refrigerant outlet side of the air-conditioning outdoor heat exchanger 20 is connected to an evaporator bypass passage 25 through which the cycle refrigerant flowing out of the air-conditioning outdoor heat exchanger 20 bypasses the cooling expansion valve 22 and the indoor evaporator 23 and flows toward the inlet side of the accumulator 24. A cooling open-close valve 16c is disposed in the evaporator bypass passage 25.

Another of the refrigerant outflow ports of the bifurcation 15f is connected to an inlet-side branch refrigerant passage 15g. A recovery open-close valve 16a and a recovery expansion valve 60 are disposed in the inlet-side branch refrigerant passage 15g. In this present embodiment, as shown in FIG. 19, the recovery open-close valve 16a and the recovery expansion valve 60 are arranged in this order in a refrigerant flow direction in the branch refrigerant passage 15g, but inversely the recovery expansion valve 60 and the recovery open-close valve 16a may be arranged in this order.

The recovery expansion valve 60 changes its degree of throttling such that a superheat degree of the cycle refrigerant on an outlet side of a recovery heat exchange portion 61a of the combined heat exchanger 61 approaches a predetermined reference superheat degree. An outlet side of the inlet-side branch refrigerant passage 15g is connected to a refrigerant inlet side of the recovery heat exchange portion 61a. Further, a refrigerant outlet of the recovery heat exchange portion 61a is connected to the inlet side of the accumulator 24 through an outlet-side branch refrigerant passage 15h.

In the heat pump cycle 102, for example, the gas-liquid separator 14, the lower-pressure open-close valve 16b and the lower-stage fixed throttle 17a are omitted. Other configurations of the heat pump cycle 102 are the same as those of the heat pump cycle 2 described in the first embodiment.

Next, an operation of the vehicular heat management system 1 of the present embodiment in the above configurations will be described. First, a control for performing air conditioning in a vehicle compartment, executed by the controller 90 of the present embodiment, will be described. The controller 90 switches the operation mode based on the target blowing temperature TAO, the detection signals and the operation signals, similarly to the first embodiment. A detailed operation in each operation mode will be described below.

(a) Cooling Mode

In the cooling mode, the controller 90 controls the higher-stage expansion valve 13 to be in a fully closed state and controls the cooling expansion valve 22 to be in a throttled state to exert a pressure reducing action. Further, the controller 90 closes the recovery open-close valve 16a and closes the cooling open-close valve 16c.

Accordingly, in the heat pump cycle 102 in the cooling mode, a cycle is formed in which the cycle refrigerant circulates in an order: the discharge port 111c of the compressor 111 (→the indoor condenser 12→the higher-stage expansion valve 13)→the air-conditioning outdoor heat exchanger 20→the cooling expansion valve 22→the indoor evaporator 23→the accumulator 24→the suction port 111a of the compressor 111.

In the cycle configuration, similarly to the first embodiment, the controller 90 determines control signals or the like output to the various controlling-object devices connected to the output side of the controller 90, and the controller 90 controls the operation of the various controlling-object devices.

Therefore, in the cooling mode of the present embodiment, similarly to the first embodiment, the vent air cooled by the indoor evaporator 23 flows into the vehicle compartment, and thereby the vehicle compartment can be cooled.

(b) Dehumidifying Heating Mode

In the dehumidifying heating mode, the controller 90 controls the higher-stage expansion valve 13 to be in a throttle state and controls the cooling expansion valve 22 to be a throttled state. Further, the controller 90 closes the recovery open-close valve 16a and closes the cooling open-close valve 16c.

Accordingly, in the heat pump cycle 102 in the dehumidifying heating mode, a cycle is formed in which the cycle refrigerant circulates in an order: the discharge port 111c of the compressor 111→the indoor condenser 12→the higher-stage expansion valve 13→the air-conditioning outdoor heat exchanger 20→the cooling expansion valve 22→the indoor evaporator 23→the accumulator 24→the suction port 111a of the compressor 111.

In the cycle configuration, similarly to the first embodiment, the controller 90 determines control signals or the like output to the various controlling-object devices connected to the output side of the controller 90, and the controller 90 controls the operation of the various controlling-object devices.

In the dehumidifying heating mode of the present embodiment, similarly to the first embodiment, the vent air is cooled and dehumidified in the indoor evaporator 23, reheated in the indoor condenser 12, and then blown into the vehicle compartment. Accordingly, dehumidification and heating in the vehicle compartment can be performed.

(c) First Heating Mode

In the first heating mode, the controller 90 controls the higher-stage expansion valve 13 to be in a throttle state and controls the cooling expansion valve 22 to be a fully open state. Further, the controller 90 closes the recovery open-close valve 16a and opens the cooling open-close valve 16c.

Accordingly, in the heat pump cycle 102 in the first heating mode, a cycle is formed in which the cycle refrigerant circulates in an order: the discharge port 111c of the compressor 111→the indoor condenser 12→the higher-stage expansion valve 13→the air-conditioning outdoor heat exchanger 20→the cooling open-close valve 16c→the accumulator 24→the suction port 111a of the compressor 111.

In the cycle configuration, similarly to the first embodiment, the controller 90 determines control signals or the like output to the various controlling-object devices connected to the output side of the controller 90, and the controller 90 controls the operation of the various controlling-object devices.

Therefore, in the first heating mode of the present embodiment, similarly to the first embodiment, the vent air heated by the indoor condenser 12 flows into the vehicle compartment, and thereby the vehicle compartment can be heated.

(d) Second Heating Mode

In the second heating mode, the controller 90 operates the circulation blower 55 disposed in the heated-air passage in the duct 5 at a predetermined standard blowing capacity. In the second heating mode, the controller 90 controls the higher-stage expansion valve 13 to be in a throttle state and controls the cooling expansion valve 22 to be a fully open state. Further, the controller 90 opens the recovery open-close valve 16a and opens the cooling open-close valve 16i c.

Accordingly, in the heat pump cycle 102 in the second heating mode, a cycle is formed in which the cycle refrigerant circulates in an order: the discharge port 111c of the compressor 111→the indoor condenser 12→the bifurcation 15f→the higher-stage expansion valve 13→the air-conditioning outdoor heat exchanger 20→the cooling open-close valve 16c→the accumulator 24→the suction port 111a of the compressor 111, and at the same time the cycle refrigerant circulates in an order: the bifurcation 15f→the recovery open-close valve 16a→the recovery expansion valve 60→the recovery heat exchange portion 61a of the combined heat exchanger 61→the accumulator 24→the suction port 111a of the compressor 111.

That is, a vapor compression refrigeration cycle is formed in which the air-conditioning outdoor heat exchanger 20 and the recovery heat exchange portion 61a are connected in parallel with respect to the flow of the cycle refrigerant.

In the cycle configuration, similarly to the first embodiment, the controller 90 determines control signals or the like output to the various controlling-object devices connected to the output side of the controller 90, and the controller 90 controls the operation of the various controlling-object devices.

Therefore, in the first heating mode of the present embodiment, the vent air can be heated in the indoor condenser 12 and blown into the vehicle compartment, and thereby the vehicle compartment can be heated.

In addition, in the second heating mode, the air-conditioning outdoor heat exchanger 20 and the recovery heat exchange portion 61a are connected in parallel. Thus, the vent air can be heated by heat sources: the heat absorbed by the cycle refrigerant from the outside air in the air-conditioning outdoor heat exchanger 20 and the heat absorbed by the cycle refrigerant from the heated air in the recovery heat exchange portion 61a. Therefore, the capacity for heating the vent air can be improved more than the first heating mode.

The other configurations and operations of the vehicular heat management system 1 are the same as those of the first embodiment. Therefore, even in the vehicular heat management system 1 including the heat pump cycle 102, similarly to the first embodiment, the exhaust heats of the in-vehicle devices 50 to 53 can be effectively used for heating the vent air.

Seventh Embodiment

Figure 20:
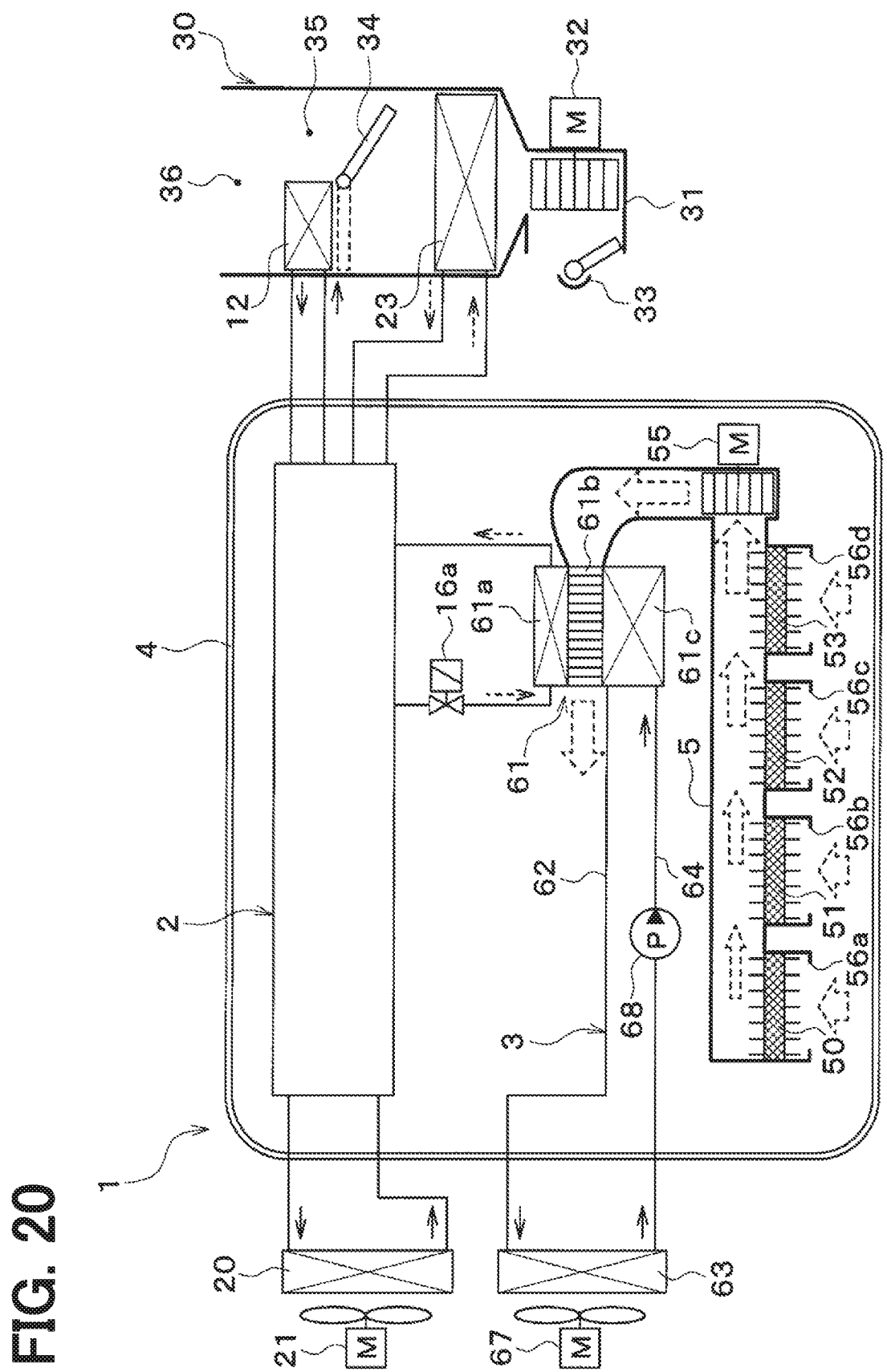
FIG. 20 is a diagram illustrating an entire configuration of a vehicular heat management system according to at least one embodiment.

In the present embodiment, as shown in FIG. 20, an example in which the configuration of the exhaust-heat refrigerant circuit 3 is changed from that of the first embodiment will be described. Specifically, in the present embodiment, an exhaust-heat refrigerant pump 68 is used in place of the exhaust-heat open-close valve 65.

The exhaust-heat refrigerant pump 68 is an electric pump disposed in the liquid-phase refrigerant pipe 64 and discharges the exhaust-heat refrigerant in liquid phase flowing out of the waste-heat outdoor heat exchanger 63 toward the exhaust-heat exchange portion 61c of the combined heat exchanger 61. The number of revolutions (i.e., discharge capacity) of the exhaust-heat refrigerant pump 68 is controlled according to a control voltage output from the controller 90.

Further, the exhaust-heat refrigerant pump 68 has a function of blocking inflow of the exhaust-heat refrigerant thereinto when the exhaust-heat refrigerant pump 68 is stopped. Therefore, the exhaust-heat refrigerant pump 68 also has a function as a refrigerant circulation shutter that interrupts the circulation of the exhaust-heat refrigerant.

The controller 90 of the present embodiment operates the exhaust-heat refrigerant pump 68 when the exhaust heats of the in-vehicle devices 50 to 53 are released to the outside air in the waste-heat outdoor heat exchanger 63.

When the controller 90 operates the exhaust-heat refrigerant pump 68, the exhaust-heat refrigerant condensed in the waste-heat outdoor heat exchanger 63 is pumped to the exhaust-heat exchange portion 61c. The exhaust-heat refrigerant flowing into the exhaust-heat exchange portion 61c absorbs heat from the heated air and evaporates. The other configurations and operations of the vehicular heat management system 1 are the same as those of the first embodiment. Even when the vehicular heat management system 1 employs the exhaust-heat refrigerant circuit 3 of the present embodiment, the same effects as those of the first embodiment can be obtained.

In the exhaust-heat refrigerant circuit 3 of the present embodiment, the exhaust-heat refrigerant pump 68 is disposed in the liquid-phase refrigerant pipe 64. Accordingly, the exhaust-heat refrigerant pump 68 can reliably pump the exhaust-heat refrigerant in liquid phase to the exhaust-heat exchange portion 61c without sucking the exhaust-heat refrigerant in gas phase. Further, the pumping capacity of the exhaust-heat refrigerant pump 68 may be changed in accordance with the heat quantities generated by the in-vehicle devices 50 to 53, and thereby the in-vehicle devices 50 to 53 can be more appropriately cooled.

Eighth Embodiment

Figure 21:
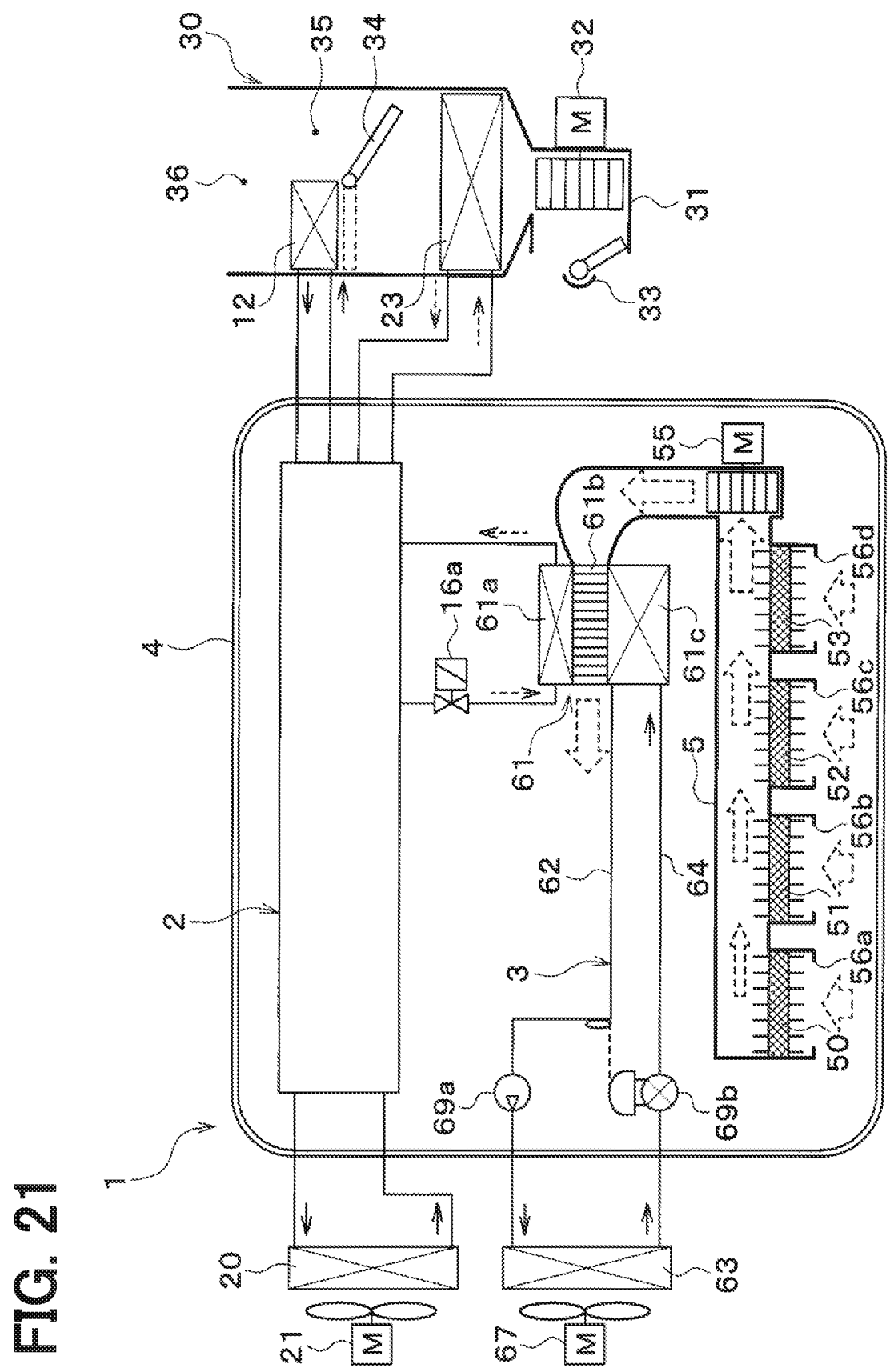
FIG. 21 is a diagram illustrating an entire configuration of a vehicular heat management system according to at least one embodiment.

In the present embodiment, as shown in FIG. 21, an example in which the configuration of the exhaust-heat refrigerant circuit 3 is changed from that of the first embodiment will be described. Specifically, in the present embodiment, an exhaust-heat compressor 69a and an exhaust-heat expansion valve 69b are used in place of the exhaust-heat open-close valve 65.

The exhaust-heat compressor 69a is an electric compressor disposed in the gas-phase refrigerant pipe 62 and compresses and discharges the exhaust-heat refrigerant in gas phase flowing out of the exhaust-heat exchange portion 61c. A basic configuration of the exhaust-heat compressor 69a is similar to that of the compressor 111 described in the sixth embodiment.

The exhaust-heat compressor 69a has a function of blocking inflow of the exhaust-heat refrigerant thereinto when the exhaust-heat compressor 69a is stopped. Therefore, the exhaust-heat compressor 69a also has a function as a refrigerant circulation shutter that interrupts the circulation of the exhaust-heat refrigerant.

The exhaust-heat expansion valve 69b is a thermostatic expansion valve that is disposed in the liquid-phase refrigerant pipe 64 and decompresses the exhaust-heat refrigerant in liquid phase flowing out of the waste-heat outdoor heat exchanger 63. A basic configuration of the exhaust-heat expansion valve 69b is the same as that of the recovery expansion valve 60. The exhaust-heat expansion valve 69b changes its degree of throttling such that a superheat degree of the exhaust-heat refrigerant on an outlet side of an exhaust-heat exchange portion 61c of the combined heat exchanger 61 approaches a predetermined reference superheat degree.

In other words, in the exhaust-heat refrigerant circuit 3 of the present embodiment, a vapor compression refrigeration cycle is formed in which the exhaust-heat refrigerant evaporates and absorbs heat from the heated air in the exhaust-heat exchange portion 61c while the exhaust-heat refrigerant releases the absorbed heat to the outside air and condenses in the waste-heat outdoor heat exchanger 63. The controller 90 of the present embodiment operates the exhaust-heat compressor 69a when the exhaust heats of the in-vehicle devices 50 to 53 are released to the outside air in the waste-heat outdoor heat exchanger 63.

When the controller 90 operates the exhaust-heat compressor 69a, the exhaust-heat compressor 69a sucks the exhaust-heat refrigerant in gas phase flowing out of the exhaust-heat exchange portion 61c and compresses and discharges the exhaust-heat refrigerant. The refrigerant discharged from the exhaust-heat compressor 69a releases heat and condenses via heat exchange with the outside air in the waste-heat outdoor heat exchanger 63.

The exhaust-heat refrigerant in liquid phase condensed in the waste-heat outdoor heat exchanger 63 is decompressed by the exhaust-heat expansion valve 69b. The degree of throttling of the exhaust-heat expansion valve 69b is adjusted such that a superheat degree of the exhaust-heat refrigerant on the outlet side of the exhaust-heat exchange portion 61c of the combined heat exchanger 61 approaches the reference superheat degree. The exhaust-heat refrigerant reduced in pressure by the exhaust-heat expansion valve 69b flows into the exhaust-heat exchange portion 61c.

The refrigerant flowing into the exhaust-heat exchange portion 61c absorbs heat from the heated air and evaporates. The exhaust-heat refrigerant in gas phase flowing out of the exhaust-heat exchange portion 61c is sucked again into and compressed in the exhaust-heat compressor 69a. The other configurations and operations of the vehicular heat management system 1 are the same as those of the first embodiment. Even when the vehicular heat management system 1 employs the exhaust-heat refrigerant circuit 3 of the present embodiment, the same effects as those of the first embodiment can be obtained.

Further, in the exhaust-heat refrigerant circuit 3 of the present embodiment, the vapor compression refrigeration cycle is formed, and the exhaust-heat exchange portion 61c functions as an evaporator. Therefore, the in-vehicle devices 50 to 53 can be cooled. Further, a pumping capacity of the exhaust-heat compressor 69a may be changed in accordance with the heat quantities generated by the in-vehicle devices 50 to 53, and thereby the in-vehicle devices 50 to 53 can be more appropriately cooled.

Ninth Embodiment

Figure 22:
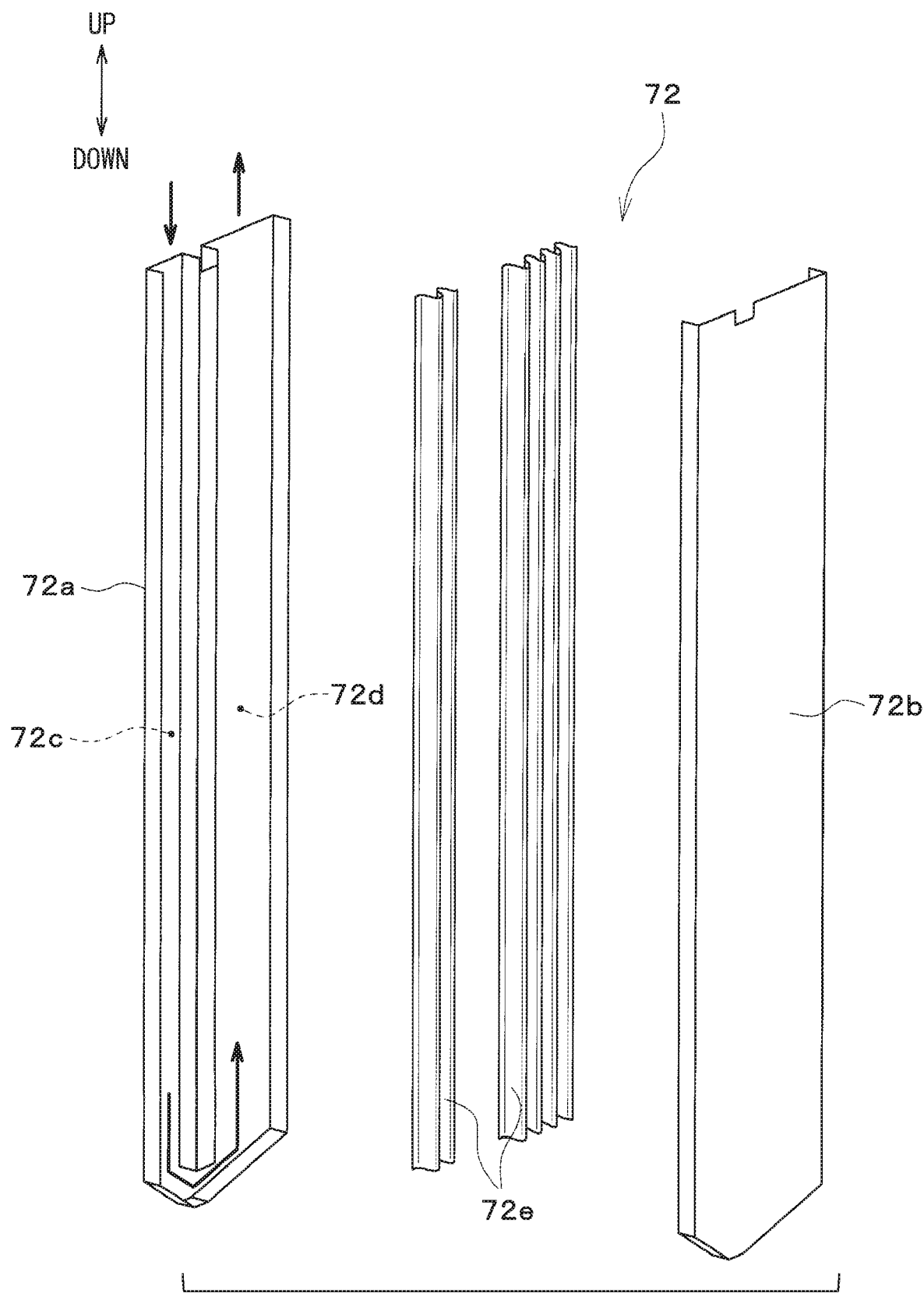
FIG. 22 is an enlarged exploded perspective view illustrating a cycle refrigerant tube of a combined heat exchanger according to at least one embodiment.

In a present embodiment, as shown in FIG. 22, an example in which the configuration of the cycle refrigerant tubes 72 of the combined heat exchanger 61 is changed from that of the first embodiment will be described. FIG. 22 is a drawing corresponding to FIG. 6 described in the first embodiment.

In the cycle refrigerant tube 72 of the present embodiment, a passage cross-sectional area of a downstream passage portion 72d is larger than a passage cross-sectional area of an upstream passage portion 72c. That is, the passage cross-sectional area of the refrigerant passage in the cycle refrigerant tubes 72 of the present embodiment increases in a downstream direction of refrigerant flow.

The other configurations and operations of the vehicular heat management system 1 are the same as those of the first embodiment. Even when the vehicular heat management system 1 employs the combined heat exchanger 61 of the present embodiment, the same effects as those of the first embodiment can be obtained.

Further, in the combined heat exchanger 61 of the present embodiment, the passage cross-sectional area of the cycle refrigerant tubes 72 increases in the downstream direction of refrigerant flow. Accordingly, a pressure loss generated when the evaporated cycle refrigerant flows through the cycle refrigerant tubes 72 can be reduced.

Tenth Embodiment

Figure 23:
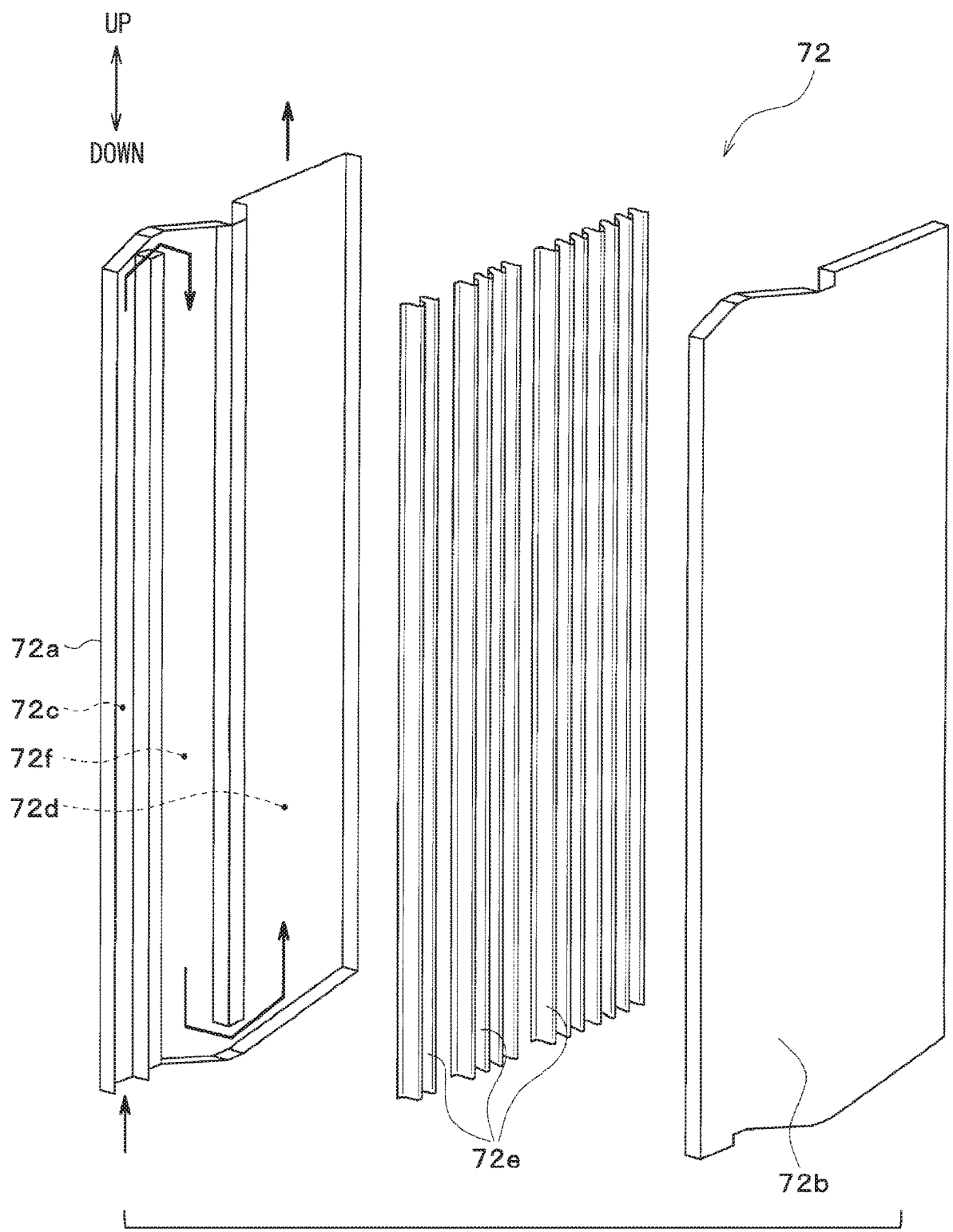
FIG. 23 is an enlarged exploded perspective view illustrating a cycle refrigerant tube of a combined heat exchanger according to at least one embodiment.

In a present embodiment, as shown in FIG. 23, an example in which the configuration of the cycle refrigerant tubes 72 of the combined heat exchanger 61 is changed from that of the first embodiment will be described. The cycle refrigerant tube 72 of the present embodiment has therein refrigerant passages extending in an up-down direction and having a flat cross-section. The refrigerant passages are arranged in three rows with respect to the flow direction of the heated air.

More specifically, in the cycle refrigerant tube 72 of the present embodiment, the cycle refrigerant flows from the lower side to the upper side in the upstream passage portion 72c. Further, an intermediate passage portion 72f is provided in which the cycle refrigerant flowing out of the upstream passage portion 72c flows from the upper side to the lower side. In the downstream passage portion 72d, the cycle refrigerant flowing out of the intermediate passage portion 72f flows from the lower side to the upper side.

In other words, in the cycle refrigerant tube 72 of the present embodiment, the flow direction of the cycle refrigerant is turned twice like an N-shape.

The passage cross-sectional area of the intermediate passage portion 72f is larger than the passage cross-sectional area of the upstream passage portion 72c. The passage cross-sectional area of the downstream passage portion 72d is larger than the passage cross-sectional area of the intermediate passage portion 72f. That is, the passage cross-sectional area of the refrigerant passage in the cycle refrigerant tubes 72 of the present embodiment increases in a downstream direction of refrigerant flow.

The other configurations and operations of the vehicular heat management system 1 are the same as those of the first embodiment. Even when the vehicular heat management system 1 employs the combined heat exchanger 61 of the present embodiment, the same effects as those of the first embodiment can be obtained.

Also in the combined heat exchanger 61 of the present embodiment, similarly to the ninth embodiment, a pressure loss generated when the evaporated cycle refrigerant flows through the cycle refrigerant tubes 72 can be reduced. Further, the heat exchange capacity can be further improved by increasing the flow rate of the cycle refrigerant.

Eleventh Embodiment

In the present embodiment, an example in which a path configuration of the recovery heat exchange portion 61a is changed from that of the first embodiment will be described. Here, the path in the heat exchanger can be defined as a refrigerant flow path formed by a group of tubes through which refrigerant flows in the same direction from a predetermined space to another space formed in the heat exchanger.

For example, in a tank-and-tube heat exchanger, the path corresponds to a refrigerant flow path formed by a group of tubes through which refrigerant flows in the same direction from the same distribution space to the same collective space formed in a tank. Therefore, as the number of tubes forming the path increases, a total passage cross-sectional area of the path increases.

In the combined heat exchanger 61 of the present embodiment, one longitudinal end of a leeward cycle refrigerant tank 70 described in the first embodiment has a refrigerant inlet 70a into which the cycle refrigerant flowing out of the recovery open-close valve 16a flows. Another longitudinal end of the leeward cycle refrigerant tank 70 has a refrigerant outlet 70b from which the cycle refrigerant flows toward the intermediate pressure port 11b of the compressor 11.

Further, a separator 70c is disposed inside the leeward cycle refrigerant tank 70. The separator 70c divides an internal space of the leeward cycle refrigerant tank 70 into an inlet internal space 70d communicating with the refrigerant inlet 70a and an outlet internal space 70e communicating with the refrigerant outlet 70b.

Thus, in the recovery heat exchange portion 61a of the present embodiment, as shown in FIG. 24, a group of the cycle refrigerant tubes 72 connected to the inlet internal space 70d forms an inlet path 721 in which the refrigerant flows in the same direction from the inlet internal space 70d to an internal space of the windward cycle refrigerant tank 71.

Further, as shown in FIG. 24, another group of the cycle refrigerant tubes 72 connected to the outlet internal space 70e forms an outlet path 722 in which the refrigerant flows in the same direction from the internal space of the windward cycle refrigerant tank 71 to the outlet internal space 70e. That is, the cycle refrigerant tubes 72 of the present embodiment form the two paths.

The separator 70c of the present embodiment is positioned such that the inlet internal space 70d is smaller than the outlet internal space 70e. More specifically, the separator 70c is positioned such that a volume of the inlet internal space 70d occupies about 30% to 33% of the internal space of the leeward cycle refrigerant tank 70.

Therefore, the number of the cycle refrigerant tubes 72 connected to and communicating with the outlet internal space 70e and forming the outlet path 722 is larger than the number of the cycle refrigerant tubes 72 connected to and communicating with the inlet internal space 70d and forming the inlet path 721.

As a result, a total passage cross-sectional area of the cycle refrigerant tubes 72 forming the outlet path 722 is larger than a total passage cross-sectional area of the cycle refrigerant tubes 72 forming the inlet path 721. That is, the total passage cross-sectional area of the cycle refrigerant tubes 72 forming the paths increases in the downstream direction of refrigerant flow.

The other configurations and operations of the vehicular heat management system 1 are the same as those of the first embodiment. Even when the vehicular heat management system 1 employs the combined heat exchanger 61 of the present embodiment, the same effects as those of the first embodiment can be obtained.

Further, in the combined heat exchanger 61 of the present embodiment, the total passage cross-sectional area of the cycle refrigerant tubes 72 increases in the downstream direction of refrigerant flow. Accordingly, similarly to the tenth embodiment, a pressure loss generated when the evaporated cycle refrigerant flows through the cycle refrigerant tubes 72 can be reduced.

Other Embodiments

The present disclosure is not limited to the embodiments described above, and various modifications can be made as follows within a scope without departing from the scope of the present disclosure.

(1) In the above-described embodiments, an example in which the vehicular heat management system 1 is applied to an electric vehicle has been described, but the application of the vehicular heat management system 1 is not limited to this. The vehicular heat management system 1 is effective when applied to a vehicle that generates less heat from a driving source for vehicle running and is more difficult to secure a heat source for air heating than a normal engine vehicle.

For example, this application is effective for a hybrid vehicle that obtains a driving force for vehicle running from both an internal combustion engine and an vehicle-running electric motor (the hybrid vehicle including a so-called plug-in hybrid vehicle that can be recharged from a commercial power supply), or for a fuel cell vehicle equipped with a fuel cell.

Further, in the above-described embodiments, the examples in which the heat-exchanging-object fluid is the vent air has been described, but the heat-exchanging-object fluid is not limited to this. For example, the heat-exchanging-object fluid may be water or the like for hot-water supply.

(2) In the above-described embodiments, the vehicular heat management system 1 in which the air-conditioning operation mode is switchable has been described, but switching of the air-conditioning operation mode for effective use of exhaust heat of the in-vehicle device is not mandatory. That is, as long as at least the second heating mode is available, the exhaust heats of the in-vehicle devices 50 to 53 can be effectively used as described above. Further, the operation mode may be switched to another operation mode other than the operation modes described in the above embodiments.

Therefore, the heat pump cycles 2 and 102 are not limited to those capable of switching the refrigerant circuit.

Further, the heat pump cycles 2 and 102 may be switched to another circuit configuration different from the circuit configurations described in the above embodiments. For example, the heat pump cycles may be one that is switchable to a refrigerant circuit forming a gas injection cycle in the cooling mode, the dehumidifying heating mode and the first heating mode. Further, the heat pump cycles may recover and utilize the exhaust heats of the in-vehicle devices 50 to 53 in the cooling mode or the dehumidifying heating mode.

(3) The respective components constituting the heat pump cycle 2, 102 are not limited to those disclosed in the embodiments described above.

In the above first embodiment, an example is described in which the two-stage electric compressor having the two compression mechanisms housed in one housing is employed as the compressor 11, but the type of compressor is not limited to the above type.

For example, the compressor 11 may be an electric compressor which houses one fixed capacity compression mechanism and one electric motor for rotating this compression mechanism inside a housing as long as the cycle refrigerant at intermediate pressure can flow into the intermediate pressure port 11b and join with refrigerant in a compression process from low pressure to high pressure.

Alternatively, two compressors are connected in series, and a suction port of a lower-stage compressor disposed on the lower stage is used as the suction port 11a, while a discharge port of the higher-stage compressor disposed on the higher stage is used as the discharge port 11c. The intermediate pressure port 11b is provided in a connection part connecting the discharge port of the lower-stage compressor and the suction port of the higher-stage compressor. Accordingly, one two-stage compressor may be produced by using the lower-stage compressor and the higher-stage compressor.

Further, in the above-described first embodiment and other embodiments, an example is described in which the lower-pressure open-close valve 16b as the refrigerant circuit switch is disposed in the fixed throttle bypass passage 18, but the refrigerant circuit switch is not limited to this.

For example, the refrigerant circuit switch may employ an electric three-way valve that switches between a refrigerant circuit in which the second liquid-phase outflow port 14d of the gas-liquid separator 14 is connected to the lower-stage fixed throttle 17a and a refrigerant circuit in which the second liquid-phase outflow port 14d is connected to the fixed throttle bypass passage 18. Further, the lower-stage fixed throttle 17a may employ a variable throttle mechanism having a fully open function similar to the higher-stage expansion valve 13, and the lower-pressure open-close valve 16b and the fixed throttle bypass passage 18 may be omitted.

In the above-described embodiments, the detailed configurations of the open-close valves such as the recovery open-close valve 16a and the exhaust-heat open-close valve 65 are not mentioned. These open-close valves may employ a so-called normally-closed electromagnetic valve that closes a refrigerant passage when not energized. Accordingly, the control at step S1 in control flow illustrated in FIG. 13 can be easily executed.

In the embodiments described above, an example is described in which the cycle refrigerant is R134a, but the refrigerant is not limited to this example. For example, HFO-based refrigerants (R1234yf, HFO-1234ze, HFO-1234zd), R600a, R410A, R404A, R32, R407C can be used. Alternatively, a mixture refrigerant in which multiple kinds of those refrigerants are mixed together may be used. The same applies to the exhaust-heat refrigerant.

Furthermore, carbon dioxide may be adopted as the refrigerant of the heat pump cycle 2, and a heat pump cycle may form a supercritical refrigeration cycle in which a pressure of the refrigerant discharged from the compressor 11 is equal to or higher than the critical pressure of the refrigerant.

(4) The respective components constituting the exhaust-heat refrigerant circuit 3 are not limited to those disclosed in the embodiments described above.

In the above-described first embodiment, the outside-air fan 21 that blows the outside air toward the air-conditioning outdoor heat exchanger 20 of the heat pump cycle 2 and the outside-air fan 67 that flows the outside air toward the waste-heat outdoor heat exchanger 63 of the exhaust-heat refrigerant circuit 3 are separated. However, as in the second embodiment, the outside air may be sent to both the outdoor heat exchangers from a common outside-air fan.

Further, in the above-described embodiment, an example is described in which the same kind of refrigerant is used for the cycle refrigerant and the exhaust-heat refrigerant, but different kinds of refrigerants may be used. For example, a heat medium such as alcohol may be used in the exhaust-heat refrigerant circuit 3 forming the thermosiphon.

(5) Detailed configuration of the combined heat exchanger 61 is not limited to that disclosed in the above embodiments.

In the above-described embodiments, an example is described in which a plate tube is employed as the cycle refrigerant tube 72 and the exhaust-heat refrigerant tube 75, but a multi-hole tube formed by extrusion or the like may be employed.

In the above-described embodiments, as illustrated in FIG. 10, the cycle refrigerant tubes 72, the exhaust-heat refrigerant tubes 75 and the heat-exchange fins 61b are regularly stacked and arranged. Accordingly, heat transfer is achieved between the cycle refrigerant and the exhaust-heat refrigerant through the heat-exchange fins 61b. However, the arrangements of the cycle refrigerant tubes 72, the exhaust-heat refrigerant tubes 75 and the heat-exchange fins 61b are not limited thereto.

For example, the heat transfer between the cycle refrigerant and the exhaust-heat refrigerant may be achieved via direct contact between the cycle refrigerant tube 72 and the exhaust-heat refrigerant tube 75 joined with each other. Then, joined bodies, in each of which the cycle refrigerant tube 72 and the exhaust-heat refrigerant tube 75 are directly joined, may be stacked and arranged at intervals, and the heat-exchange fin 61b may be arranged between adjacent joined bodies.

More specifically, the cycle refrigerant tubes 72, the exhaust-heat refrigerant tubes 75, and the heat-exchange fins 61b may be regularly and periodically stacked and arranged in an order: . . . the heat-exchange fin 61b→the cycle refrigerant tube 7→the exhaust-heat refrigerant tube 75 . . . , or in an order: . . . the heat-exchange fin 61b→the exhaust-heat refrigerant tube 75→the cycle refrigerant tube 72 . . . , except for both ends in the stacking direction.

(6) Detailed configuration of the duct 5 is not limited to that disclosed in the embodiments described above.

In the above-described embodiments, an example is described in which one circulation blower 55 is arranged in the heated-air passage of the duct 5, but multiple circulation blowers 55 may be arranged. For example, in the duct 5 having the multiple suction ports 56a to 56d as in the first embodiment, a dedicated circulation blower 55 may be arranged in each of the suction ports 56a to 56d in order to adjust an amount of air sucked into each of the suction ports 56a to 56d.

(7) In the above-described embodiments, an example is described in which the battery 50, the charging generator 51, the power control unit 52, and the vehicle-running electric motor 53 are employed as the in-vehicle devices, but the in-vehicle devices are not limited thereto. For example, the in-vehicle devices are not limited to those different in generated heat quantity, and may employ in-vehicle devices equivalent to each other in generated heat quantity or employ in-vehicle devices equivalent to each other in usable temperature range.

Further, in the above-described embodiments, an example is described in which the usable temperature ranges are set such that the in-vehicle devices 50 to 53 can deliver sufficient performance, but the setting of the usable temperature ranges is not limited to this. For example, the usable temperature ranges may be set with priority on ensuring the stability of the in-vehicle devices 50 to 53.

(8) The components described in each of the above embodiments may be appropriately combined to the extent practicable.

For example, in the vehicular heat management system 1 of the third to fifth embodiments, the air-conditioning outdoor heat exchanger 20 and the waste-heat outdoor heat exchanger 63 may be arranged in series with respect to the flow direction of the outside air as in the second embodiment.

For example, the heat pump cycle 102 described in the sixth embodiment may be applied to the vehicular heat management systems 1 of the second to fifth embodiments.

For example, the exhaust-heat refrigerant circuit 3 described in the seventh and eighth embodiments may be applied to the vehicular heat management systems 1 of the second to sixth embodiments.

For example, the combined heat exchangers 61 described in the ninth to eleventh embodiments may be applied to the vehicular heat management systems 1 of the second to eighth embodiments.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A vehicular heat management system comprising:
   a heat pump cycle capable of heating a heat-exchanging-object fluid by using exhaust heat from an in-vehicle device as a heat source that radiates heat during operation; and
   an exhaust-heat refrigerant circuit for releasing the exhaust heat to outside air through an exhaust-heat refrigerant, wherein
   the heat pump cycle includes a recovery heat exchange portion for performing heat exchange between air heated by the exhaust heat and a cycle refrigerant circulating in the heat pump cycle,
   the exhaust-heat refrigerant circuit includes an exhaust-heat exchange portion for performing heat exchange between the heated air and the exhaust-heat refrigerant,
   the recovery heat exchange portion and the exhaust-heat exchange portion are integrally formed as a combined heat exchanger capable of transferring heat between the cycle refrigerant and the exhaust-heat refrigerant,
   the combined heat exchanger includes a heat-exchange fin for promoting the heat exchange between the heated air and the cycle refrigerant and for promoting the heat exchange between the heated air and the exhaust-heat refrigerant, and
   the heat-exchange fin is in contact with both the recovery heat exchange portion and the exhaust-heat exchange portion to transfer heat between the cycle refrigerant and the exhaust-heat refrigerant.

2. The vehicular heat management system according to claim 1, wherein the in-vehicle device and at least a part of the combined heat exchanger are arranged in an internal space of a heat insulating housing.

3. The vehicular heat management system according to claim 2, further comprising a duct provided in the internal space for the heated air to flow through the duct, wherein the in-vehicle device is disposed in the duct.

4. The vehicular heat management system according to claim 3, wherein
   the in-vehicle device is one of a plurality of in-vehicle devices, and
   the duct has a plurality of suction ports configured to suck air, respectively, heated by exhaust heat from the plurality of in-vehicle devices.

5. The vehicular heat management system according to claim 2, wherein
   the heat pump cycle includes an air-conditioning outdoor heat exchanger for performing heat exchange between the cycle refrigerant and the outside air to condense the cycle refrigerant,
   the exhaust-heat refrigerant circuit includes a waste-heat outdoor heat exchanger for performing heat exchange between the exhaust-heat refrigerant and the outside air to condense the exhaust-heat refrigerant which has been vaporized in the exhaust-heat exchange portion, and
   the air-conditioning outdoor heat exchanger and the waste-heat outdoor heat exchanger are both arranged outside the heat insulating housing.

6. The vehicular heat management system according to claim 5, wherein the air-conditioning outdoor heat exchanger and the waste-heat outdoor heat exchanger are arranged such that, during operation of the vehicular heat management system, the flow direction of outside air through the air-conditioning outdoor heat exchanger is parallel to the flow direction of outside air through the waste-heat outdoor heat exchanger without being overlapped in an outside-air introduction direction in which the outside air is introduced into a vehicle.

7. The vehicular heat management system according to claim 1, wherein
   the cycle refrigerant flowing into the recovery heat exchange portion is in liquid phase or gas-liquid two-phase, and
   the heat pump cycle includes a valve for reducing a pressure of the cycle refrigerant flowing to the recovery heat exchange portion to be lower than a saturation pressure of the cycle refrigerant that corresponds to a temperature of the heated air.

8. The vehicular heat management system according to claim 1, wherein
   the recovery heat exchange portion has a cycle refrigerant tube through which the cycle refrigerant flows,
   the cycle refrigerant tube has a downstream passage portion forming a most downstream portion of a refrigerant passage inside the cycle refrigerant tube such that the cycle refrigerant flows from a lower side to an upper side of the downstream passage portion, and
   at least a part of the downstream passage portion is disposed windward of another portion of the refrigerant passage.

9. The vehicular heat management system according to claim 8, wherein a passage cross-sectional area of the refrigerant passage in each of the cycle refrigerant tubes increases in a downstream direction of refrigerant flow.

10. The vehicular heat management system according to claim 8, wherein
    the cycle refrigerant tube is one of a plurality of cycle refrigerant tubes,
    a path is defined as a refrigerant flow path formed by a tube group of the plurality of cycle refrigerant tubes through which refrigerant flows in the same direction from a predetermined space to another space formed in the recovery heat exchange portion, the path is one of a plurality of paths formed by the plurality of cycle refrigerant tubes, and a total passage cross-sectional area of the cycle refrigerant tubes forming the paths increases in a downstream direction of refrigerant flow.

11. The vehicular heat management system according to claim 1, wherein the exhaust-heat exchange portion has an exhaust-heat refrigerant tube through which the exhaust-heat refrigerant flows, and the exhaust-heat refrigerant tube is arranged so that the exhaust-heat refrigerant flows from a lower side to an upper side of the exhaust-heat exchange portion.

12. The vehicular heat management system according to claim 1, wherein the heat pump cycle includes a refrigerant circuit switch for switching between a refrigerant circuit through which the cycle refrigerant flows into the recovery heat exchange portion and a refrigerant circuit through which the cycle refrigerant does not flow into the recovery heat exchange portion.

13. The vehicular heat management system according to claim 1, wherein the exhaust-heat refrigerant circuit has a refrigerant circulation shutter for shutting off circulation of the exhaust-heat refrigerant.

14. A vehicular heat management system comprising:

a heat pump cycle capable of heating a heat-exchanging-object fluid by using exhaust heat from an in-vehicle device as a heat source that radiates heat during operation; and an exhaust-heat refrigerant circuit for releasing the exhaust heat to outside air through an exhaust-heat refrigerant, wherein the heat pump cycle includes a recovery heat exchange portion for performing heat exchange between air heated by the exhaust heat and a cycle refrigerant circulating in the heat pump cycle, the exhaust-heat refrigerant circuit includes an exhaust-heat exchange portion for performing heat exchange between the heated air and the exhaust-heat refrigerant, the recovery heat exchange portion and the exhaust-heat exchange portion are integrally formed as a combined heat exchanger capable of transferring heat between the cycle refrigerant and the exhaust-heat refrigerant, and the in-vehicle device and at least a part of the combined heat exchanger are arranged in an internal space of a heat insulating housing, the vehicular heat management system further comprising a duct provided in the internal space for the heated air to flow through the duct, wherein the in-vehicle device is disposed in the duct, the in-vehicle device is one of a plurality of in-vehicle devices, and the duct has a plurality of suction ports configured to suck air, respectively, heated by exhaust heat from the plurality of in-vehicle devices.

* * * * *